US006750870B2

(12) United States Patent
Olarig

(10) Patent No.: US 6,750,870 B2
(45) Date of Patent: *Jun. 15, 2004

(54) MULTI-MODE GRAPHICS ADDRESS REMAPPING TABLE FOR AN ACCELERATED GRAPHICS PORT DEVICE

(75) Inventor: Sompong P. Olarig, Pleasanton, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 380 days.

This patent is subject to a terminal disclaimer.

(21) Appl. No.: 09/730,948

(22) Filed: Dec. 6, 2000

(65) Prior Publication Data

US 2002/0093507 A1 Jul. 18, 2002

(51) Int. Cl.[7] .................................................. G09G 5/39
(52) U.S. Cl. ........................................ 345/531; 345/520
(58) Field of Search ................................ 711/206, 154, 711/2; 345/532, 520, 519, 568, 522, 543, 544, 531, 547, 537; 710/3, 107, 306

(56) References Cited

U.S. PATENT DOCUMENTS 5,999,198 A * 12/1999 Horan et al. ................ 345/531

* cited by examiner

Primary Examiner—Matthew C. Bella
Assistant Examiner—Dalip K. Singh

(57) ABSTRACT

A computer system having a core logic chipset that functions as a bridge between an Accelerated Graphics Port ("AGP") bus device such as a graphics controller, and a host processor and computer system memory wherein a Graphics Address Remapping Table ("GART table") is used by the core logic chipset to remap virtual memory addresses used by the AGP graphics controller into physical memory addresses that reside in the computer system memory. The GART table enables the AGP graphics controller to work in contiguous virtual memory address space, but actually use non-contiguous blocks or pages of physical system memory to store textures, command lists and the like. The GART table is made up of a plurality of entries, each entry comprising an address pointer to a base address of a memory page, and feature flags that may be used to customize the associated memory page. The size of the GART table entries is selectively dependent on the addressing capability of the AGP bus device and the amount of system memory allocated to the AGP bus device.

29 Claims, 71 Drawing Sheets

SINGLE-LEVEL TRANSLATION: BITS REQUIRED FOR PAGE OFFSET

| AGP MEMORY ALLOCATED | NUMBER OF BITS IN BASE ADDRESS OF DEVICE ADDRESS SPACE | NUMBER OF BITS IN PAGE OFFSET FROM BASE OF DEVICE ADDRESS SPACE | NUMBER OF BITS IN OFFSET INTO 4 KB PAGE |
|---|---|---|---|
| 32 MB | 31:25 | 24:12 | 11:0 |
| 64 MB | 31:26 | 25:12 | 11:0 |
| 128 MB | 31:27 | 26:12 | 11:0 |
| 256 MB | 31:28 | 27:12 | 11:0 |
| 512 MB | 31:29 | 28:12 | 11:0 |
| 1 GB | 31:30 | 29:12 | 11:0 |
| 2 GB | 31 | 30:12 | 11:0 |

FIGURE 10

TWO-LEVEL TRANSLATION: BITS REQUIRED FOR DIRECTORY AND PAGE OFFSET

| AGP MEMORY ALLOCATED | BASE ADDRESS OF DEVICE ADDRESS SPACE | DIRECTORY OFFSET | PAGE OFFSET FROM BASE OF DIRECTORY ENTRY | OFFSET INTO 4 KB PAGE |
|---|---|---|---|---|
| 32 MB | 31:25 | 24:22 | 21:12 | 11:0 |
| 64 MB | 31:26 | 25:22 | 21:12 | 11:0 |
| 128 MB | 31:27 | 26:22 | 21:12 | 11:0 |
| 256 MB | 31:28 | 27:22 | 21:12 | 11:0 |
| 512 MB | 31:29 | 28:22 | 21:12 | 11:0 |
| 1 GB | 31:30 | 29:22 | 21:12 | 11:0 |
| 2 GB | 31 | 30:22 | 21:12 | 11:0 |

FIGURE 12B

MAXIMUM GART TABLE SIZE VERSUS SIZE OF AGP MEMORY

| SIZE OF ALLOCATED AGP DEVICE ADDRESS SPACE | SINGLE-LEVEL ADDRESS TRANSLATION | | TWO-LEVEL ADDRESS TRANSLATION | |
|---|---|---|---|---|
| | GART TABLE SIZE (KB) | NUMBER OF GART ENTRIES (K) | GART DIRECTORY + TABLE SIZE (KB) | NUMBER OF GART ENTRIES (K) |
| 32 MB | 32 | 8 | 36 | 9 |
| 64 MB | 64 | 16 | 68 | 17 |
| 128 MB | 128 | 32 | 132 | 33 |
| 256 MB | 256 | 64 | 260 | 65 |
| 512 MB | 512 | 128 | 516 | 129 |
| 1 GB | 1024 | 256 | 1028 | 257 |
| 2 GB | 2048 | 512 | 2052 | 513 |

FIGURE 15

CHIPSET CONFIGURATION REGISTERS—HOST TO PCI BRIDGE FUNCTION

HOST TO PCI BRIDGE (FUNCTION 0)

| | | OFFSET |
|---|---|---|
| DEVICE ID | VENDOR ID | 00h |
| STATUS | COMMAND | 04h |
| CLASS CODE | REVISION ID | 08h |
| RESERVED | HEADER TYPE | LATENCY TIMER | RESERVED | 0Ch |
| BAR0—AGP DEVICE ADDRESS SPACE | * 10h |
| BAR1—AGP MEMORY MAPPED CONTROL REGISTERS POINTER | * 14h |
| RESERVED | 18h–28h |
| SUB-SYSTEM ID | SUB-VENDOR ID | 2Ch |
| RESERVED | 30h |
| RESERVED | CAPABILITIES POINTER | 34h |
| RESERVED | 38h–3Ch |
| HOST TO PCI BRIDGE CHIPSET SPECIFIC OPTION REGISTERS AND/OR RESERVED | 40h–FFh |

1702 →
1704 →

*—REGIONS INDICATE AGP SPECIFIC REGISTERS

FIGURE 17A

BAR0-AGP DEVICE ADDRESS SPACE
1702

| OFFSET | SIZE | DEFAULT VALUE |
|---|---|---|
| 10h | 32 | xx000008h |

| BIT NUMBER | TYPE | BIT DESCRIPTION |
|---|---|---|
| 31:25 | Rd/Wr | DEVICE ADDRESS SPACE ALLOCATION SIZE. THESE BITS CORRESPOND TO BITS 3:1 IN THE PCI-PCI BRIDGE (FUNCTION 1) DEVICE ADDRESS SPACE SIZE REGISTER (OFFSET 4Ch). WHEN BITS 3:1 OF THAT REGISTER ARE SET, THE READ/WRITE ATTRIBUTES IN BITS 31:25 IN THIS REGISTER ARE AUTOMATICALLY SET BY THE CHIPSET. SYSTEM BIOS MEMORY MAPPING SOFTWARE WRITES ALL 1'S TO THIS BAR REGISTER AND THEN READS BACK THE REGISTER TO DETERMINE HOW MUCH MEMORY IS REQUIRED AGP. THE TABLE BELOW INDICATES HOW THE CHIPSET SETS READ/WRITE ATTRIBUTES FOR EACH MEMORY SETTING:<br><br>BIT 31  BIT 30  BIT 29  BIT 28  BIT 27  BIT 26  BIT 25   MEMORY ALLOCATED<br>R       R       R       R       R       R       R          0 MB<br>RW      RW      RW      RW      RW      RW      RW        32 MB<br>RW      RW      RW      RW      RW      RW      R         64 MB<br>RW      RW      RW      RW      RW      R       R        128 MB<br>RW      RW      RW      RW      R       R       R        256 MB<br>RW      RW      RW      R       R       R       R        512 MB<br>RW      RW      R       R       R       R       R          1 GB<br>RW      R       R       R       R       R       R          2 GB<br><br>RW MEANS THAT THE BIT HAS READ/WRITE ATTRIBUTES. R MEANS THAT THE BIT HAS READ ONLY ATTRIBUTES AND THAT A READ WILL ALWAYS RETURN A ZERO.<br><br>NOTE THAT WHEN THE AGP VALID BIT IN THE PCI-PCI BRIDGE (FUNCTION 1) DEVICE ADDRESS SPACE SIZE REGISTER (OFFSET 4Ch) IS SET TO INVALID, BITS 31:4 WILL HAVE READ ONLY ATTRIBUTES AND WILL ALWAYS RETURN 0 WHEN READ.<br><br>ONCE A BASE ADDRESS HAS BEEN DETERMINED, BIOS FILLS IN THESE BITS TO COMPLETE THE BASE ADDRESS FOR AGP DEVICE ADDRESS SPACE.<br><br>THE DEFAULT AMOUNT OF DEVICE ADDRESS SPACE ALLOCATED IS CHIPSET SPECIFIC.<br><br>IMPLEMENTATION NOTE: IMPLEMENTATION OF THE DEVICE ADDRESS SPACE SIZE REGISTER IS OPTIONAL. IF THE CHIPSET DESIGNER OPTS NOT TO IMPLEMENT THIS REGISTER, THESE BITS SHOULD BE HARD CODED TO INDICATE THE DESIRE AMOUNT OF AGP DEVICE ADDRESS SPACE. |

FOR CONTINUATION SEE FIGURE 17Ba

FIGURE 17B

FOR CONTINUATION SEE FIG. 17B

| | | |
|---|---|---|
| 24:4 | Rd | BASE ADDRESS LOWER BITS. THESE READ-ONLY BITS ARE HARD-WIRED TO 0'S TO INDICATE DEVICE ADDRESS SPACE WILL ALWAYS BE 32 MB OR GREATER AND WILL RESIDE, AT MINIMUM, ON A 32 MB BOUNDARY |
| 3 | Rd | PREFETCHABLE. THIS BIT IS HARD-WIRED TO 1 TO INDICATE THE MEMORY IN THIS RANGE IS PREFETCHABLE. |
| 2:1 | Rd | TYPE. THESE BITS ARE HARD-WIRED TO 00 TO INDICATE THIS BASE REGISTER IS 32 BITS WIDE AND MAPPING CAN BE DONE ANYWHERE IN THE 32-BIT MEMORY SPACE. |
| 0 | Rd | MEMORY SPACE INDICATOR. THIS BIT IS HARD-WIRED TO 0 TO INDICATE THAT THIS BASE ADDRESS REGISTER MAPS INTO MEMORY SPACE. |

FIGURE 17Ba

BASE ADDRESS REGISTER 1 (BAR1)
1704

| OFFSET | SIZE | DEFAULT VALUE |
|---|---|---|
| 14h | 32 | 00000000h |

| BIT NUMBER | TYPE | BIT DESCRIPTION |
|---|---|---|
| 31:12 | Rd/Wr | BASE ADDRESS UPPER BITS. THESE BITS FORM THE UPPER PART OF BAR1. THEY DEFAULT TO 0'S AT POWER-UP AND HAVE READ/WRITE ATTRIBUTES. THEY CHANGE TO 1'S AS PART OF THE MEMORY MAPPING ALGORITHM DESCRIBED ABOVE. ONCE A BASE ADDRESS HAS BEEN DETERMINED, BIOS FILLS IN THESE BITS TO COMPLETE THE BASE ADDRESS FOR THE AGP MEMORY-MAPPED CONTROL REGISTERS. |
| 11:4 | Rd | BASE ADDRESS LOWER BITS. THESE READ-ONLY BITS ARE HARD-WIRED TO 0'S TO INDICATE THAT 4 KB WILL BE ALLOCATED TO AGP MEMORY-MAPPED CONTROL REGISTERS AND THAT THE REGISTERS WILL ALWAYS RESIDE ON A 4 KB BOUNDARY PER SUGGESTION IN PCI 2.1 SPECIFICATION (SECTION 6.2.5.1.). |
| 3 | Rd | PREFETCHABLE. THIS BIT IS HARD-WIRED TO 0 TO INDICATE THE MEMORY IN THIS RANGE IS NOT-PREFETCHABLE. |
| 2:1 | Rd | TYPE. THESE BITS ARE HARD-WIRED TO 00 TO INDICATE THAT THIS BASE REGISTER IS 32 BITS WIDE AND MAPPING CAN BE DONE ANYWHERE IN THE 32-BIT MEMORY SPACE. |
| 0 | Rd | MEMORY SPACE INDICATOR. THIS BIT IS HARD-WIRED TO 0 TO INDICATE THAT THIS BASE ADDRESS REGISTER MAPS INTO MEMORY SPACE. |

FIGURE 17C

CHIPSET CONFIGURATION REGISTERS—PCI TO PCI BRIDGE FUNCTION

| PCI TO PCI BRIDGE (FUNCTION 1) | | | | OFFSET |
|---|---|---|---|---|
| DEVICE ID | | VENDOR ID | | 00h |
| STATUS * | | COMMAND * | | 04h |
| CLASS CODE | | | REVISION ID | 08h |
| RESERVED | HEADER TYPE | LATENCY TIMER | RESERVED | 0Ch |
| RESERVED | | | | 10h–14h |
| SEC. LATENCY TIMER | SUBORDINATE BUS NUMBER | SECONDARY BUS NUMBER | PRIMARY BUS NUMBER | 18h |
| SECONDARY STATUS * | | I/O LIMIT * | I/O BASE * | 1Ch |
| MEMORY LIMIT * | | MEMORY BASE * | | 20h |
| PREFETCHABLE MEMORY LIMIT * | | PREFETCHABLE MEMORY BASE * | | 24h |
| RESERVED | | | | 28h |
| RESERVED | | | | 2Ch |
| SUB-SYSTEM ID | | SUB-VENDOR ID | | 30h |
| RESERVED | | | *CAPABILITIES POINTER | 34h |
| RESERVED | | | | 38h |
| BRIDGE CONTROL | | RESERVED | | 3Ch |
| AGP CAPABILITY IDENTIFIER * | | | | AGP CAPABILITIES POINTER |
| AGP STATUS * | | | | AGP CAPABILITIES POINTER+4 |

* = REGIONS INDICATE AGP SPECIFIC REGISTERS (FOR CONTINUATION SEE FIGURE 18Aa)

FIGURE 18A

Labels: 1806 (04h), 1808 (STATUS), 1810 (SECONDARY STATUS), 1812 (1Ch), 1814 (MEMORY LIMIT), 1816 (20h), 1818 (PREFETCHABLE MEMORY LIMIT), 1820 (*CAPABILITIES POINTER), 1822 (AGP CAPABILITY IDENTIFIER), 1824 (AGP STATUS)

| | | * AGP CAPABILITIES POINTER+8 |
| | | * AGP CAPABILITIES POINTER+12 |
| | | AGP CAPABILITIES POINTER+16–FFh |

(FOR CONTINUATION SEE FIGURE 18A)

| * | AGP COMMAND | * AGP DEVICE ADDRESS SPACE SIZE (OPTIONAL) |
| PCI TO PCI BRIDGE CHIPSET SPECIFIC OPTION REGISTERS AND/OR RESERVED | | |
| PCI TO PCI BRIDGE CHIPSET SPECIFIC OPTION REGISTERS AND/OR RESERVED | | |

1826 ← ↑ 1828

* = REGIONS INDICATE AGP SPECIFIC REGISTERS

FIGURE 18Aa

COMMAND REGISTER 1806

| OFFSET | SIZE | DEFAULT VALUE |
|---|---|---|
| 04h | 16 | 000000xxxx000000b |

| BIT NUMBER | TYPE | BIT DESCRIPTION |
|---|---|---|
| 15:10 | Rd | RESERVED. ALWAYS RETURNS 0 ON READS; WRITE OPERATIONS HAVE NO EFFECT. |
| 9 | Rd/Wr | FAST BACK TO BACK ENABLE. |
| 8 | Rd/Wr | SERR# ENABLE. THIS BIT CONTROLS THE BRIDGING OF SERR# DETECTION ON THE AGP BUS TO DRIVING SERR# ON THE PCI BUS. |
| 7 | Rd/Wr | WAIT CYCLE CONTROL. IF ADDRESS/DATA STEPPING OF PCI STREAM ACCESSES IS SUPPORTED BY THE CORE LOGIC CHIPSET ON THE AGP BUS THIS BIT IS IMPLEMENTED. |
| 6 | Rd/Wr | PARITY ERROR ENABLE.<br>1-CORE LOGIC CHIPSET TAKES NORMAL ACTION WHEN DETECTING A PARITY ERROR ON THE AGP BUS.<br>0-CORE LOGIC CHIPSET IGNORES ANY PARITY ERRORS DETECTED ON THE AGP BUS. |
| 5 | Rd/Wr | VGA PALETTE SNOOP ENABLE<br>THIS FEATURE IS NOT REQUIRED TO BE SUPPORTED BY THE PCI-TO-PCI BRIDGE WITHIN THE CORE LOGIC CHIPSET. THE LACK OF SUPPORT FOR THIS FUNCTION IS DRIVEN BY: ALL CURRENTLY AVAILABLE VGA PALETTE SNOOPING DEVICES RESIDE ON A ISA BUS WHICH IS AN ILLEGAL CONFIGURATION AS DESCRIBED IN SECTION 6.4 OF THE PCI-TO-PCI BRIDGE SPECIFICATION AND INCREASED DESIGN COMPLEXITY IN THE CORE LOGIC CHIPSET. WHEN VGA PALETTE SNOOPING IS NOT SUPPORTED THIS BIT MUST BE IMPLEMENTED AS READ ONLY AND MUST RETURN 0 WHEN READ. |
| 4 | Rd | MEMORY WRITE AND INVALIDATE ENABLE. THE AGP COMPLIANT MASTER DETERMINES WHICH PCI STREAM MEMORY WRITE COMMAND TO USE. IN A PCI-TO-PCI BRIDGE THIS BIT IS A READ ONLY BIT AND MUST RETURN 0 WHEN READ. |
| 3 | Rd | SPECIAL CYCLE ENABLE. A PCI-TO-PCI BRIDGE CANNOT RESPOND AS A TARGET TO SPECIAL CYCLE TRANSACTIONS SO THIS BIT IS DEFINED TO BE READ ONLY AND MUST RETURN 0 WHEN READ. |
| 2 | Rd/Wr | BUS MASTER ENABLE<br>1-PCI STREAM ACCESSES ON THE AGP BUS TO SYSTEM MEMORY AND THE PCI BUS ARE ENABLED.<br>0-RESPONSE TO PCI STREAM ACCESSES ON THE AGP BUS ARE DISABLED. |

FOR CONTINUATION SEE FIGURE 18Ba

FIGURE 18B

FOR CONTINUATION SEE FIGURE 18B

| | | |
|---|---|---|
| 1 | Rd/Wr | MEMORY SPACE ENABLED<br>1-HOST TO AGP BUS PCI STREAM MEMORY ACCESSES ENABLED & PCI TO AGP BUS PCI STREAM MEMORY WRITE ACCESSES ENABLED. HOST TO AGP BUS MEMORY ACCESSES ARE NOT REQUIRED TO BE VISIBLE ON THE PCI BUS.<br>0-HOST TO AGP BUS PCI I/O ACCESSES DISABLED. HOST TO AGP BUS MEMORY ACCESSES ARE REQUIRED TO BE SENT ON THE PCI BUS. |
| 0 | Rd/Wr | I/O SPACE ENABLE<br>1-HOST TO AGP BUS PCI STREAM I/O ACCESSES ENABLED. HOST TO AGP BUS I/O ACCESSES ARE NOT REQUIRED TO BE VISIBLE ON THE PCI BUS.<br>0-HOST TO AGP BUS PCI STREAM I/O ACCESSES DISABLED. HOST TO AGP BUS I/O ACCESSES ARE REQUIRED TO BE SENT TO THE PCI BUS. |

FIGURE 18Ba

STATUS REGISTER 1808

| OFFSET | SIZE | DEFAULT VALUE |
|---|---|---|
| 06h | 16 | 00000XX0X0X00000b |

| BIT NUMBER | SIZE | BIT DESCRIPTION |
|---|---|---|
| 15 | Rd/Wr | DETECTED PARITY ERROR ON PCI BUS. |
| 14 | Rd/Wr | RECEIVED SYSTEM ERROR ON PCI BUS. |
| 13 | Rd/Wr | RECEIVED MASTER ABORT ON PCI BUS. |
| 12 | Rd/Wr | RECEIVED TARGET ABORT ON PCI BUS. |
| 11 | Rd/Wr | SIGNALED TARGET ABORT ON PCI BUS. |
| 9:10 | Rd | DEVSEL# TIMING ON PCI BUS. |
| 8 | Rd/Wr | DATA PARITY DETECTED ON PCI BUS. |
| 7 | Rd | FAST BACK-TO-BACK CAPABLE. |
| 6 | Rd | USER DEFINABLE FEATURES (UDF) SUPPORTED. |
| 5 | Rd | 66 MHZ CAPABLE. THIS BIT IS SET IF THE CORE LOGIC CHIPSET SUPPORTS TRUE PCI 66MHZ TIMING ON ITS PCI BUS, THE PRIMARY BUS OF THE PCI TO PCI BRIDGE. READS AS 0 TO INDICATE THAT THE PRIMARY INTERFACE OPERATES AT A MAXIMUM FREQUENCY OF 33 MHZ. |
| 4 | Rd | CAPABILITIES LIST. THIS READ-ONLY BIT INDICATES WHETHER OR NOT THIS DEVICE IMPLEMENTS THE POINTER FOR A NEW CAPABILITIES LINKED LIST AT OFFSET 34h. A VALUE OF ZERO INDICATES THAT NO NEW CAPABILITIES LINKED LIST IS AVAILABLE. A VALUE OF ONE INDICATES THAT THE VALUE READ AT OFFSET 34h IS A POINTER IN CONFIGURATION SPACE TO A LINKED LIST OF NEW CAPABILITIES.<br><br>IMPLEMENTATION NOTE: THIS BIT MUST BE SET TO 1 IN HOST BRIDGES COMPLIANT WITH COMPAQ'S AGP IMPLEMENTATION. |
| 0:3 | Rd | RESERVED. ALWAYS RETURNS 0 ON READS; WRITE OPERATIONS HAVE NO EFFECT. |

FIGURE 18C

SECONDARY STATUS REGISTER 1810

| OFFSET | SIZE | DEFAULT VALUE |
|---|---|---|
| 1Eh | 16 | 00000XX0XXX00000b |

| BIT NUMBER | TYPE | BIT DESCRIPTION |
|---|---|---|
| 15 | Rd/Wr | DETECTED PARITY ERROR ON AGP BUS. |
| 14 | Rd/Wr | RECEIVED SYSTEM ERROR ON AGP BUS. |
| 13 | Rd/Wr | RECEIVED MASTER ABORT ON AGP BUS. |
| 12 | Rd/Wr | RECEIVED TARGET ABORT ON AGP BUS. |
| 11 | Rd/Wr | SIGNALED TARGET ABORT ON AGP BUS. |
| 10-9 | Rd | DEVSEL TIMING ON AGP BUS. |
| 8 | Rd/Wr | DATA PARITY ERROR DETECTED ON AGP BUS. |
| 7 | Rd | FAST BACK-TO-BACK CAPABLE. |
| 6 | Rd | USER DEFINABLE FEATURES SUPPORTED. |
| 5 | Rd | 66 MHZ CAPABLE. THIS BIT IS SET IF THE CORE LOGIC CHIPSET SUPPORTS TRUE PCI 66MHZ TIMING ON ITS AGP BUS, THE SECONDARY BUS OF THE PCI TO PCI BRIDGE. IF THE CORE LOGIC CHIPSET ONLY SUPPORTS THE RELAXED AGP 66MHZ BUS TIMINGS ON ITS AGP BUS THEN, THIS BIT IS CLEARED. |
| 4:0 | Rd | RESERVED. ALWAYS RETURNS 0 ON READS; WRITE OPERATIONS HAVE NO EFFECT. |

FIGURE 18D

MEMORY BASE REGISTER
1812

| OFFSET | SIZE | DEFAULT VALUE |
|---|---|---|
| 20h | 16 | 0000h |

| BIT NUMBER | TYPE | BIT DESCRIPTION |
|---|---|---|
| 15:4 | Rd/Wr | MEMORY BASE ADDRESS. DEFINES THE BASE ADDRESS OF THE NON-PREFETCHABLE ADDRESS RANGE USED BY THE AGP MASTER (GRAPHICS CONTROLLER) WHERE CONTROL REGISTERS AND FIFO-LIKE COMMUNICATION INTERFACES ARE MAPPED. BITS 15:4 ARE WRITABLE AND CORRESPOND TO ADDRESS BITS 31:20. THE LOWER 20 BITS OF THE ADDRESS ARE ASSUMED TO BE 0. THE MEMORY ADDRESS RANGE ADHERES TO 1 MB ALIGNMENT AND GRANULARITY. |
| 3:0 | Rd | RESERVED. ALWAYS RETURNS 0 ON READS; WRITE OPERATIONS HAVE NO EFFECT. |

FIGURE 18E

MEMORY LIMIT REGISTER 1814

| OFFSET | SIZE | DEFAULT VALUE |
|---|---|---|
| 22h | 16 | 0000h |

| BIT NUMBER | TYPE | BIT DESCRIPTION |
|---|---|---|
| 15:4 | Rd/Wr | MEMORY LIMIT ADDRESS. DEFINES THE TOP ADDRESS OF THE NON-PREFETCHABLE ADDRESS RANGE USED BY THE AGP MASTER (GRAPHICS CONTROLLER) WHERE CONTROL REGISTERS AND FIFO-LIKE COMMUNICATION INTERFACES ARE MAPPED. BITS 15:4 ARE WRITABLE AND CORRESPOND TO ADDRESS BITS 31:20 . THE LOWER 20 BITS OF THE ADDRESS ARE ASSUMED TO BE FFFFFh. THE MEMORY ADDRESS RANGE ADHERES TO 1 MB ALIGNMENT AND GRANULARITY. |
| 3:0 | Rd | RESERVED. ALWAYS RETURNS 0 ON READS; WRITE OPERATIONS HAVE NO EFFECT. |

FIGURE 18F

PREFETCHABLE MEMORY BASE REGISTER 1816

| OFFSET | SIZE | DEFAULT VALUE |
|---|---|---|
| 24h | 16 | 0000h |

| BIT NUMBER | TYPE | BIT DESCRIPTION |
|---|---|---|
| 15:4 | Rd/Wr | PREFETCHABLE MEMORY BASE ADDRESS. DEFINES THE BASE ADDRESS OF THE PREFETCHABLE ADDRESS RANGE USED BY THE AGP MASTER (GRAPHICS CONTROLLER) WHERE THE LINEAR FRAME BUFFER IS MAPPED TO PROVIDE PERFORMANCE IMPROVEMENTS. BITS 15:4 ARE WRITABLE AND CORRESPOND TO ADDRESS BITS 31:20. THE LOWER 20 BITS OF THE ADDRESS ARE ASSUMED TO BE 0. THE MEMORY ADDRESS RANGE ADHERES TO 1 MB ALIGNMENT AND GRANULARITY. |
| 3:0 | Rd | RESERVED. ALWAYS RETURNS 0 ON READS; WRITE OPERATIONS HAVE NO EFFECT. |

FIGURE 18G

PREFETCHABLE MEMORY LIMIT REGISTER 1818

| OFFSET | SIZE | DEFAULT VALUE |
|---|---|---|
| 26h | 16 | 0000h |

| BIT NUMBER | TYPE | BIT DESCRIPTION |
|---|---|---|
| 15:4 | Rd/Wr | PREFETCHABLE MEMORY LIMIT ADDRESS. DEFINES THE TOP ADDRESS OF THE PREFETCHABLE ADDRESS RANGE USED BY THE AGP MASTER (GRAPHICS CONTROLLER) WHERE THE LINEAR FRAME BUFFER IS MAPPED TO PROVIDE PERFORMANCE IMPROVEMENTS. BITS 15:4 ARE WRITABLE AND CORRESPOND TO ADDRESS BITS 31:20. THE LOWER 20 BITS OF THE ADDRESS ARE ASSUMEDD TO BE FFFFFh. THE MEMORY ADDRESS RANGE ADHERES TO 1 MB ALIGNMENT AND GRANULARITY. |
| 3:0 | Rd | RESERVED. ALWAYS RETURNS 0 ON READS; WRITE OPERATIONS HAVE NO EFFECT. |

FIGURE 18H

CAPABILITIES POINTER REGISTER 1820

| OFFSET | SIZE | DEFAULT VALUE |
|---|---|---|
| 34h | 8 | CAP_PTR |

| BIT NUMBER | TYPE | BIT DESCRIPTION |
|---|---|---|
| 7:0 | Rd | CAPABILITES POINTER. THIS FIELD CONTAINS A BYTE OFFSET INTO THE DEVICE'S CONFIGURATION SPACE CONTAINING THE FIRST ITEM IN THE CAPABILITIES LIST AND IS A READ ONLY REGISTER.<br><br>NOTE THAT WHEN THE AGP VALID BIT IN THE PCI-PCI BRIDGE (FUNCTION 1) DEVICE ADDRESS SPACE SIZE REGISTER (OFFSET 4CH) IS SET TO INVALID, THIS CAPABILITIES POINTER WILL BE SET BY THE CHIPSET TO POINT TO THE NEXT ITEM IN THE LINKED LIST. IF NO NEXT ITEM EXISTS, IT WILL BE SET TO NULL. |

FIGURE 18I

AGP CAPABILITY IDENTIFIER REGISTER
1822

| OFFSET | SIZE | DEFAULT VALUE |
|---|---|---|
| CAP PTR | 32 | CHIPSET SPECIFIC |

| BIT NUMBER | TYPE | BIT DESCRIPTION |
|---|---|---|
| 31:24 | Rd | RESERVED. ALWAYS RETURNS 0 ON READS; WRITE OPERATIONS HAVE NO EFFECT. |
| 23:20 | Rd | MAJOR REVISION NUMBER. MAJOR REVISION NUMBER OF AGP INTERFACE SPECIFICATION CONFORMED TO BY THIS DEVICE. |
| 19:16 | Rd | MINOR REVISION NUMBER. MINOR REVISION NUMBER OF AGP INTERFACE SPECIFICATION CONFORMED TO BY THIS DEVICE. |
| 15:8 | Rd | NEXT POINTER. POINTER TO THE NEXT ITEM IN CAPABILITIES LIST. MUST BE NULL FOR FINAL ITEM IN LIST. |
| 7:0 | Rd | CAPABILITIES IDENTIFICATION. THE VALUE 02h IN THIS FIELD IDENTIFIES THE LIST ITEM AS PERTAINING TO AGP REGISTERS. |

FIGURE 18J

AGP STATUS REGISTER
1824

| OFFSET | SIZE | DEFAULT VALUE |
|---|---|---|
| CAP_PTR + 4 | 32 | CHIPSET SPECIFIC |

| BIT NUMBER | TYPE | BIT DESCRIPTION |
|---|---|---|
| 31:24 | Rd | MAXIMUM REQUEST QUEUE DEPTH. THIS FIELD CONTAINS THE MAXIMUM NUMBER OF AGP COMMAND REQUESTS THIS DEVICE CAN MANAGE.<br><br>IMPLEMENTATION NOTE: COMPAQ RECOMMENDS A MINIMUM REQUEST QUEUE DEPTH OF 8. THIS MEANS THAT THE TOTAL NUMBER OF REQUESTS THAT CAN BE HANDLED BY THE CHIPSET AT ONE TIME IN BOTH HIGH AND LOW PRIORITY QUEUES BE SHOULD 8 AT MINIMUM. |
| 23:10 | Rd | RESERVED. ALWAYS RETURNS 0 WHEN READ. WRITE OPERATIONS HAVE NO EFFECT. |
| 9 | Rd | SIDEBAND ADDRESSING SUPPORTED. IF SET TO 0, THIS DEVICE DOES NOT SUPPORT SIDE BAND ADDRESSING. IF SET TO 1, THIS DEVICE SUPPORTS SIDE BAND ADDRESSING. THE OPERATING SYSTEM WILL LOOK FOR THE HIGHEST PERFORMANCE MODE SUPPORTED BY BOTH THE AGP MASTER AND TARGET AND ENABLE THAT MODE IN THE AGP COMMAND REGISTERS. |
| 8:2 | Rd | RESERVED. ALWAYS RETURNS 0 WHEN READ. WRITE OPERATIONS HAVE NO EFFECT. |
| 1:0 | Rd | RATES SUPPORTED. THIS FIELD INDICATES THE DATA TRANSFER RATES SUPPORTED BY THIS DEVICE. AGP COMPLIANT DEVICES MUST REPORT ALL THAT APPLY. BIT 0, WHEN SET TO 1 INDICATES 1X MODE SUPPORTED. BIT 1, WHEN SET TO 1 INDICATES 2X MODE SUPPORTED. ZERO INDICATES THE CORRESPONDING TRANSFER RATE NOT SUPPORTED.<br><br>THE OPERATING SYSTEM WILL LOOK FOR THE HIGHEST PERFORMANCE MODE SUPPORTED BY BOTH THE AGP MASTER AND TARGET AND ENABLE THAT MODE IN THE AGP COMMAND REGISTERS.<br><br>NOTE: THE RATE FIELD APPLIES TO AD AND SBA BUSSES. |

FIGURE 18K

AGP COMMAND REGISTER
1826

| OFFSET | SIZE | DEFAULT VALUE |
|---|---|---|
| CAP_PTR + 8 | 32 | CHIPSET SPECIFIC |

| BIT NUMBER | TYPE | BIT DESCRIPTION |
|---|---|---|
| 31:10 | Rd | RESERVED. ALWAYS RETURNS 0 WHEN READ. WRITE OPERATIONS HAVE NO EFFECT. |
| 9 | Rd/Wr | SIDEBAND ADDRESSING ENABLED. WHEN SET TO 1, THE BIT ENABLES SIDEBAND ADDRESSING IN THIS DEVICE. WHEN SET TO 0, THE BIT DISABLES SIDEBAND ADDRESSING. THE DEFAULT VALUE IS DISABLED (0). |
| 8 | Rd/Wr | AGP ENABLED. SETTING THIS BIT ALLOWS THE TARGET TO ACCEPT AGP OPERATIONS. WHEN CLEARED, THE TARGET IGNORES INCOMING AGP OPERATIONS. THE DEFAULT VALUE IS DISABLED (0).<br><br>NOTES-1. THE TARGET MUST BE ENABLED BEFORE THE MASTER.<br>2. AGP RESET CLEARS THE AGP ENABLE BIT. |
| 7:2 | Rd | RESERVED. ALWAYS RETURNS 0 WHEN READ. WRITE OPERATIONS HAVE NO EFFECT. |
| 1:0 | Rd/Wr | DATA RATE. ONE (AND ONLY ONE) BIT IN THIS FIELD MUST BE SET TO INDICATE THE DESIRED AGP TRANSFER RATE. THE SAME BIT MUST BE SET ON BOTH MASTER AND TARGET. BITS SHOULD BE SET TO GET THE FOLLOWING DATA RATE:<br><br>BIT 1    BIT 0    TRANSFER RATE<br>0        1        1X   (DEFAULT)<br>1        0        2X<br><br>THE DEFAULT TRANSFER RATE IS 1X. |

FIGURE 18L

AGP DEVICE ADDRESS SPACE SIZE REGISTER
1828

| OFFSET | SIZE | DEFAULT VALUE |
|---|---|---|
| CAP_PTR + 0Ch | 8 | CHIPSET SPECIFIC |

| BIT NUMBER | TYPE | BIT DESCRIPTION |
|---|---|---|
| 7:4 | Rd | RESERVED. ALWAYS RETURNS 0 WHEN READ. WRITE OPERATIONS HAVE NO EFFECT. |
| 3:1 | Rd/Wr | DEVICE ADDRESS SPACE SIZE. THESE BITS DETERMINE THE SIZE OF DEVICE ADDRESS SPACE TO BE ALLOCATED TO AGP BY SYSTEM BIOS. PRIOR TO EXECUTION OF THE SYSTEM BIOS MEMORY MAPPING SOFTWARE, SYSTEM BIOS SETS THESE BITS TO INDICATE THE AMOUNT OF AGP DEVICE ADDRESS SPACE REQUIRED. CHANGING THESE BITS AUTOMATICALLY CHANGES THE READ/WRITE ATTRIBUTES OF BITS 31:25 IN THE HOST-PCI BRIDGE (FUNCTION 0) BAR0 GART ADDRESS RANGE REGISTER, OFFSET 10H (REFERENCED ABOVE). WHEN THE SYSTEM BIOS MEMORY MAPPING SOFTWARE EXECUTES, IT WILL ALLOCATE THE CORRECT AMOUNT OF DEVICE ADDRESS SPACE.<br><br>NOTE THE SIZE OF AGP DEVICE ADDRESS SPACE IS ALWAYS GREATER THAN OR EQUAL TO THE AMOUNT OF PHYSICAL SYSTEM MEMORY ALLOCATED TO AGP. THE AMOUNT OF PHYSICAL MEMORY ALLOCATED TO AGP IS MANAGED BY THE OPERATING SYSTEM.<br><br>BIT 3　BIT 2　BIT 1　DEVICE ADDRESS SPACE SIZE<br>0　　0　　0　　32 MB<br>0　　0　　1　　64 MB<br>0　　1　　0　　128 MB<br>0　　1　　1　　256 MB<br>1　　0　　0　　512 MB<br>1　　0　　1　　1 GB<br>1　　1　　0　　2 GB<br>1　　1　　1　　RESERVED<br><br>THE DEFAULT SIZE OF DEVICE ADDRESS SPACE IS CHIPSET SPECIFIC.<br>———— FOR CONTINUATION SEE FIGURE 18Ma ———— |

FIGURE 18M

| | | |
|---|---|---|
| | | FOR CONTINUATION SEE FIGURE 18M |
| 0 | Rd | AGP VALID. WHEN THIS BIT IS SET TO 0, AGP IS NOT VALID IN THIS SYSTEM. SYSTEM BIOS DOES NOT ALLOCATE DEVICE ADDRESS SPACE FOR AGP BECAUSE BITS 31:4 IN THE HOST-PCI BRIDGE (FUNCTION 0) BAR0 GART ADDRESS RANGE REGISTER, OFFSET 10H (REFERENCED ABOVE) ARE SET TO READ ONLY. THE PCI-PCI BRIDGE (FUNCTION 1) CAPABILITIES POINTER IS SET TO POINT TO THE NEXT ITEM IN THE LINKED LIST OR NULL IF THERE IS NO OTHER ITEM.<br><br>WHEN THIS BIT IS SET TO 1, AGP IS VALID IN THIS SYSTEM. SYSTEM BIOS ALLOCATES DEVICE ADDRESS SPACE FOR AGP BASED UPON THE VALUE SET IN BITS 3:1 ABOVE.<br><br>AGP VALID IS THE DEFAULT SETTING OF THIS REGISTER. |

FIGURE 18Ma

CHIPSET MEMORY-MAPPED REGISTERS

| AGP MEMORY-MAPPED CONTROL REGISTERS | | OFFSET |
|---|---|---|
| FEATURE STATUS | FEATURE CONTROL | CAPABILITIES | REVISION ID | 00h |
| AGP GART TABLE/DIRECTORY BASE ADDRESS | | 04h |
| GART TABLE CACHE SIZE | | 08h |
| GART TABLE CACHE CONTROL | | 0Ch |
| GART TABLE CACHE ENTRY CONTROL | | 10h |
| AGP UTILIZATION, BANDWIDTH, AND LATENCY CONTROL | POSTED WRITE BUFFER CONTROL | 14h |
| RESERVED | | 18h |
| AGP BUS UTILIZATION | | 18h |
| AGP BUS BANDWIDTH | | 1Ch |
| AGP BUS LATENCY | | 20h |

*FIGURE 19A*

REVISION ID REGISTER — 1902

| OFFSET | SIZE | DEFAULT VALUE |
|---|---|---|
| 00h | 8 | 00000001b |

| BIT NUMBER | TYPE | BIT DESCRIPTION |
|---|---|---|
| 7:0 | Rd | REVISION ID. THIS REGISTER IS READ ONLY AND SPECIFIES THE REVISION NUMBER OF THE COMPAQ'S SUPPLEMENT TO THE AGP INTERFACE SPECIFICATION THIS DEVICE COMPLIES WITH. |

*FIGURE 19B*

GART CAPABILITIES REGISTER 1904

| OFFSET | SIZE | DEFAULT VALUE |
|---|---|---|
| 01h | 8 | CHIPSET SPECIFIC |

| BIT NUMBER | TYPE | BIT DESCRIPTION |
|---|---|---|
| 7:4 | Rd | RESERVED. ALWAYS RETURNS 0 WHEN READ. WRITE OPERATIONS HAVE NO EFFECT. |
| 3 | Rd | AGP BUS UTILIZATION, BANDWIDTH, AND LATENCY SUPPORTED. IF THIS BIT IS SET, THE CHIPSET IS CAPABLE OF PERFORMING AGP BUS UTILIZATION, BANDWIDTH, AND LATENCY CALCULATIONS. |
| 2 | Rd | ADDRESS TRANSLATION LEVEL SUPPORTED. THIS BIT INDICATES WHETHER SINGLE-LEVEL OR TWO-LEVEL ADDRESS TRANSLATION IS SUPPORTED BY THIS CHIPSET. WHEN THE BIT IS SET TO "0", SINGLE-LEVEL ADDRESS TRANSLATION IS SUPPORTED. WHEN THE BIT IS SET TO "1", TWO-LEVEL ADDRESS TRANSLATION SUPPORTED. HARDWARE STRAPPING MAY BE USED TO CONFIGURE THIS BIT IN CHIPSETS WHICH SUPPORT BOTH METHODS. |
| 1 | Rd | GART ENTRY LINKING SUPPORTED. WHEN THIS BIT IS SET, THE CHIPSET IS CAPABLE OF USING THE PREDEFINED LINK BIT IN EACH GART ENTRY TO DETERMINE WHETHER OR NOT TO CACHE THE NEXT CONTIGUOUS GART ENTRY. THE LINK BIT IS MAINTAINED BY THE GART MINIPORT DRIVER. |
| 0 | Rd | VALID BIT ERROR REPORTING SUPPORTED. WHEN THIS BIT IS SET, THE CHIPSET IS CAPABLE OF GENERATING AN SERR# WHEN A GRAPHICS DEVICE ATTEMPTS TO ACCESS AN INVALID PAGE IN AGP MEMORY. |

FIGURE 19C

AGP FEATURE CONTROL REGISTER
1906

| OFFSET | SIZE | DEFAULT VALUE |
|---|---|---|
| 02h | 8 | 00000000b |

| BIT NUMBER | TYPE | BIT DESCRIPTION |
|---|---|---|
| 7:4 | Rd | RESERVED. ALWAYS RETURNS 0 WHEN READ. WRITE OPERATIONS HAVE NO EFFECT. |
| 3 | Rd/Wr | GART CACHE ENABLE. WHEN THIS BIT IS SET TO 1, THE CHIPSET'S GART CACHE IS ENABLED. WHEN SET TO 0, THE GART CACHE IS DISABLED. THE DEFAULT VALUE FOR THIS BIT IS DISABLED (0). |
| 2 | Rd | RESERVED. ALWAYS RETURNS 0 WHEN READ. WRITE OPERATIONS HAVE NO EFFECT. |
| 1 | Rd/Wr | GART ENTRY LINKING ENABLE. WHEN THIS BIT IS SET, THE CHIPSET WILL USE THE PREDEFINED LINK BIT IN EACH GART ENTRY TO DETERMINE WHETHER OR NOT TO CACHE THE NEXT CONTIGUOUS GART ENTRY. THE LINK BIT IS MAINTAINED BY THE GART MINIPORT DRIVER. |
| 0 | Rd/Wr | VALID BIT ERROR REPORTING ENABLE. WHEN THIS BIT IS SET, THE CHIPSET GENERATES SERR# WHEN A GRAPHICS DEVICE ATTEMPTS TO ACCESS AN INVALID PAGE IN AGP MEMORY. |

FIGURE 19D

AGP FEATURE STATUS REGISTER 1908

| OFFSET | SIZE | DEFAULT VALUE |
|---|---|---|
| 03h | 8 | 00000000b |

| BIT NUMBER | TYPE | BIT DESCRIPTION |
|---|---|---|
| 7:1 | Rd | RESERVED. ALWAYS RETURNS 0 WHEN READ. WRITE OPERATIONS HAVE NO EFFECT. |
| 0 | Rd/Wr | VALID BIT ERROR DETECTED. WHEN THIS BIT IS SET, A VALID BIT ERROR HAS BEEN DETECTED AND SERR# HAS BEEN GENERATED. |

FIGURE 19E

GART TABLE/DIRECTORY BASE ADDRESS REGISTER 1910

| OFFSET | SIZE | DEFAULT VALUE |
|---|---|---|
| 04h | 32 | 00000000h |

| BIT NUMBER | TYPE | |
|---|---|---|
| 31:12 | Rd/Wr | GART BASE ADDRESS. THESE BITS DEFINE THE BASE ADDRESS OF THE GART TABLE/DIRECTORY, WHICH IS LOCATED IN PHYSICAL SYSTEM MEMORY. IN SYSTEMS USING SINGLE-LEVEL ADDRESS TRANSLATION, THIS REGISTER CORRESPONDS TO THE BASE ADDRESS OF THE GART TABLE. IN SYSTEMS USING TWO-LEVEL ADDRESS TRANSLATION, THIS REGISTER CORRESPONDS TO THE BASE ADDRESS OF THE GART DIRECTORY. THESE 20 BITS CORRESPOND TO THE 20 MOST SIGNIFICANT BITS (BITS 31:12) OF THE 32 BIT GART TABLE/DIRECTORY BASE ADDRESS WHICH IS ALIGNED ON A 4 KB PAGE BOUNDARY. TWENTY BITS PROVIDE 4 KB RESOLUTION. A VALUE OTHER THAN 00000h DEFINES A VALID BASE ADDRESS. |
| 11:0 | Rd | RESERVED. ALWAYS RETURNS 0 WHEN READ. WRITE OPERATIONS HAVE NO EFFECT. |

FIGURE 19F

GART DIRECTORY/TABLE CACHE SIZE REGISTER
1912

| OFFSET | SIZE | DEFAULT VALUE |
|---|---|---|
| 08h | 32 | CHIPSET SPECIFIC |

| BIT NUMBER | TYPE | BIT DESCRIPTION |
|---|---|---|
| 31:16 | Rd | MAXIMUM NUMBER OF GART DIRECTORY ENTRIES, WHICH CAN BE CACHED BY THE CORE LOGIC CHIPSET. EXAMPLE: 0080h=128 ENTRIES. THIS FIELD IS VALID ONLY IN SYSTEMS USING TWO-LEVEL ADDRESS TRANSLATION. |
| 15:0 | Rd | MAXIMUM NUMBER OF GART TABLE ENTRIES, WHICH CAN BE CACHED BY THE CORE LOGIC CHIPSET. EXAMPLE: 0080h=128 ENTRIES. |

FIGURE 19G

GART DIRECTORY/TABLE CACHE CONTROL REGISTER
1914

| OFFSET | SIZE | DEFAULT VALUE |
|---|---|---|
| 0Ch | 32 | 00000000h |

| BIT NUMBER | TYPE | BIT DESCRIPTION |
|---|---|---|
| 31:1 | Rd | RESERVED. ALWAYS RETURNS 0 WHEN READ. WRITE OPERATIONS HAVE NO EFFECT. |
| 0 | Rd/Wr | GART DIRECTORY AND TABLE CACHE INVALIDATE. IN SYSTEMS USING SINGLE-LEVEL ADDRESS TRANSLATION, WHEN THIS BIT IS SET TO 1 THE CORE LOGIC CHIPSET INVALIDATES THE ENTIRE GART TABLE CACHE. IN SYSTEMS USING TWO-LEVEL ADDRESS TRANSLATION, WHEN THIS BIT IS SET TO 1 THE CORE LOGIC CHIPSET INVALIDATES THE ENTIRE GART DIRECTORY AND GART TABLE CACHES. UPON COMPLETION OF THE INVALIDATE OPERATION, THE CORE LOGIC CHIPSET RESETS THIS BIT TO 0. THE GART MINIPORT DRIVER MUST POLL THIS BIT TO VERIFY COMPLETION OF CACHE INVALIDATION. |

FIGURE 19H

GART TABLE CACHE ENTRY CONTROL REGISTER
1916

| OFFSET | SIZE | DEFAULT VALUE |
|---|---|---|
| 10h | 32 | 00000000h |

| BIT NUMBER | TYPE | BIT DESCRIPTION |
|---|---|---|
| 31:12 | Rd/Wr | GART TABLE ENTRY OFFSET. THESE BITS DEFINE THE AGP DEVICE ADDRESS OF THE PARTICULAR GART TABLE ENTRY TO BE INVALIDATED/UPDATED. THE GART MINIPORT DRIVER DERIVES THIS DEVICE ADDRESS FROM THE LINEAR ADDRESS (LIN-TO-DEV COMMAND). WHEN A DEVICE ADDRESS IS WRITTEN TO THIS REGISTER BY THE GART MINIPORT DRIVER, THE CHIPSET INVALIDATES/UPDATES THE REFERENCED CACHE ENTRY BASED UPON THE APPROPRIATE SETTING IN THE UPDATE OR INVALIDATE BITS (BITS 1 AND 0 RESPECTIVELY). |
| 1 | Rd/Wr | GART TABLE CACHE ENTRY UPDATE. WHEN THIS BIT IS SET TO 1, THE CHIPSET UPDATES THE GART TABLE CACHE ENTRY REFERENCED BY BITS 31:12 WITH THE CURRENT ENTRY IN THE GART TABLE IN SYSTEM MEMORY. THE UPDATE FUNCTION IS PERFORMED IMMEDIATELY FOLLOWING THE WRITE TO THIS REGISTER. WHEN THE UPDATE OPERATION IS COMPLETED, THE CORE LOGIC CHIPSET RESETS THIS BIT TO 0. THE GART MINIPORT DRIVER MUST POLL THIS BIT TO VERIFY COMPLETION OF THE UPDATE OPERATION. |
| 0 | Rd/Wr | GART TABLE CACHE ENTRY INVALIDATE. WHEN THIS BIT IS SET TO 1, THE CHIPSET INVALIDATES THE GART TABLE CACHE ENTRY REFERENCED BY BITS 31:12, IF PRESENT IN THE GART TABLE CACHE. THE INVALIDATE FUNCTION IS PERFORMED IMMEDIATELY FOLLOWING THE WRITE TO THIS REGISTER. WHEN THE INVALIDATE OPERATION IS COMPLETED, THE CORE LOGIC CHIPSET RESETS THIS BIT TO 0. THE GART MINIPORT DRIVER MUST POLL THIS BIT TO VERIFY COMPLETION OF THE INVALIDATE OPERATION. |

FIGURE 19I

POSTED WRITE BUFFER CONTROL REGISTER
1918

| OFFSET | SIZE | DEFAULT VALUE |
|---|---|---|
| 14h | 8 | 00h |

| BIT NUMBER | TYPE | BIT DESCRIPTION |
|---|---|---|
| 11:1 | Rd | RESERVED. ALWAYS RETURNS 0 WHEN READ. WRITE OPERATIONS HAVE NO EFFECT. |
| 0 | Rd/Wr | FLUSH POSTED WRITE BUFFER. WHEN THIS BIT IS SET TO 1, THE CHIPSET WILL FLUSH ITS PROCESSOR TO MEMORY POSTED WRITE BUFFERS. UPON COMPLETION OF THE FLUSH, THE CHIPSET SETS THIS BIT BACK TO 0. THE GART MINIPORT DRIVER MUST POLL THIS BIT TO VERIFY COMPLETION OF FLUSH OPERATION. |

FIGURE 19J

AGP BUS UTILIZATION/BANDWIDTH/LATENCY COMMAND REGISTER
1920

| OFFSET | SIZE | DEFAULT VALUE |
|---|---|---|
| 15h | 8 | 00h |

| BIT NUMBER | TYPE | BIT DESCRIPTION |
|---|---|---|
| 7:4 | Rd | RESERVED. ALWAYS RETURNS 0 WHEN READ. WRITE OPERATIONS HAVE NO EFFECT. |
| 3 | Rd/Wr | ENABLE AGP BUS LATENCY COUNTER. WHEN THIS BIT IS SET TO 1, THE AGP BUS LATENCY COUNTER STARTS. THE COUNTER STOPS WHEN THIS BIT IS CLEARED TO ZERO. |
| 2 | Rd/Wr | ENABLE AGP BUS BANDWIDTH COUNTER. WHEN THIS BIT IS SET TO 1, THE AGP BUS BANDWIDTH COUNTER STARTS. THE COUNTER STOPS WHEN THIS BIT IS CLEARED TO ZERO. |
| 1 | Rd/Wr | ENABLE AGP BUS UTILIZATION COUNTER. WHEN THIS BIT IS SET TO 1, THE AGP BUS UTILIZATION COUNTER STARTS. THE COUNTER STOPS WHEN THIS BIT IS CLEARED TO ZERO. |
| 0 | Wr | CLEAR AGP BUS UTILIZATION COUNTERS. THE AGP BUS UTILIZATION COUNTERS ARE CLEARED TO ZERO BY WRITING A "1" TO THIS BIT. THIS IS A WRITE ONLY BIT. READS TO THIS BIT WILL RETURN 0. |

FIGURE 19K

AGP BUS UTILIZATION REGISTER
1922

| OFFSET | SIZE | DEFAULT VALUE |
|---|---|---|
| 18h | 32 | 00000000h |

| BIT NUMBER | TYPE | BIT DESCRIPTION |
|---|---|---|
| 31:0 | Rd/Wr | THIS REGISTER HOLDS THE AGP BUS UTILIZATION COUNTER VALUE WHICH IS INCREMENTED IN EVERY AGP BUS CLOCK WHEN THE AGP AD[31:0] BUS IS ACTIVE WITH EITHER ONE OF THE FOLLOWING TRANSACTIONS:<br><br>• PCI ADDRESS AND DATA PHASE-FRAME# OR IRDY# IS SAMPLED ACTIVE.<br><br>• PIPE# REQUEST ENQUEUING-PIPE# IS SAMPLED ACTIVE. NOTE IS DOES NOT OCCUR WHILE IN SBA MODE.<br><br>• AGP DATA PHASE-STARTS WHEN GNT# IS ASSERTED ACTIVE AND ST[2] EQUALS 0 AND CONTINUES UNTIL DATA TRANSFER HAS COMPLETED. NOTE THAT AGP BUS DOES NOT INDICATE END OF DATA PHASE. IT IS UP TO THE DEVICE MEASURING UTILIZATION (USUALLY CHIPSET) TO TRACK SIZES OF TRANSACTIONS.<br><br>THE COUNTER IS INITIALIZED TO ZERO WHEN BIT [0] OF THE AGP BUS UTILIZATION/BANDWIDTH/LATENCY COMMAND REGISTER IS SET TO 1. THE COUNTER STARTS WHEN BIT [1] OF THE AGP BUS UTILIZATION/ BANDWIDTH/LATENCY/ COMMAND REGISTER IS SET TO 1 AND STOPS WHEN BIT [1] IS CLEARED TO 0. |

FIGURE 19L

AGP BUS BANDWIDTH REGISTER

1924

| OFFSET | SIZE | DEFAULT VALUE |
|--------|------|---------------|
| 1Ch | 32 | 00000000h |

| BIT NUMBER | TYPE | BIT DESCRIPTION |
|------------|------|-----------------|
| 31:0 | Rd/Wr | THIS REGISTER HOLDS THE AGP BUS BANDWIDTH COUNTER VALUE WHICH IS INCREMENTED IN EVERY AGP BUS CLOCK WHEN THE AGP AD[31:0] BUS IS ACTIVE WITH EITHER ONE OF THE FOLLOWING TRANSACTIONS:<br><br>• PCI DATA PHASE—IRDY# AND TRDY# ARE SAMPLED ACTIVE.<br><br>• AGP DATA PHASE—STARTS WHEN GNT# IS ASSERTED ACTIVE AND ST[2] EQUALS 0 AND CONTINUES UNTIL DATA TRANSFER HAS COMPLETED. NOTE THAT AGP BUS DOES NOT INDICATE END OF DATA PHASE. IT IS UP TO THE DEVICE MEASURING UTILIZATION (USUALLY CHIPSET) TO TRACK SIZES OF TRANSACTIONS.<br><br>THE COUNTER IS INITIALIZED TO ZERO WHEN BIT [0] OF THE AGP BUS UTILIZATION/BANDWIDTH/LATENCY COMMAND REGISTER IS SET TO 1. THE COUNTER STARTS WHEN BIT [2] OF THE AGP BUS UTILIZATION/ BANDWIDTH/LATENCY COMMAND REGISTER IS SET TO 1 AND STOPS WHEN BIT [2] IS CLEARED TO 0. |

FIGURE 19M

AGP BUS LATENCY REGISTER 1926

| OFFSET | SIZE | DEFAULT VALUE |
|--------|------|---------------|
| 20h | 32 | 00000000h |

| BIT NUMBER | TYPE | BIT DESCRIPTION |
|------------|------|-----------------|
| 31:0 | Rd/Wr | THIS REGISTER HOLDS THE AGP BUS LATENCY COUNTER VALUE WHICH IS INCREMENTED FOR EVERY AGP BUS CLOCK THAT EXPIRES WHILE THE CHIPSET IS PROCESSING A PARTICULAR AGP READ REQUEST. THE VALUE REPRESENTS THE TIME IT TAKES TO PROCESS AN AGP TRANSACTION STARTING AT THE TIME THE READ REQUEST IS ENQUEUED AND COMPLETING WHEN THE FIRST QUAD WORD IS DATA IS RETURNED TO THE MASTER.<br><br>IMPLEMENTATION NOTE: THE CHIPSET MUST TRACK A PARTICULAR AGP READ REQUEST STARTING FROM THE TIME IT IS ENQUEUED AND ENDING WHEN THE FIRST QUAD WORD OF DATA IS RETURNED TO THE MASTER. TIME REQUIRED TO PROCESS PREVIOUSLY ENQUEUED REQUESTS IS IGNORED BY WHEN COMPUTING THIS VALUE.<br><br>THE COUNTER IS INITIALIZED TO ZERO WHEN BIT [0] OF THE AGP BUS UTILIZATION/BANDWIDTH/LATENCY COMMAND REGISTER IS SET TO 1. THE COUNTER STARTS WHEN BIT [3] OF THE AGP BUS UTILIZATION/ BANDWIDTH/LATENCY COMMAND REGISTER IS SET TO 1 AND STOPS WHEN BIT [3] IS CLEARED TO 0. |

FIGURE 19N

GRAPHICS CONTROLLER CONFIGURATION REGISTERS

| GRAPHICS CONTROLLER (FUNCTION 0) | | OFFSET |
|---|---|---|
| DEVICE ID | VENDOR ID | 00h |
| STATUS | COMMAND | 04h |
| CLASS CODE | REVISION ID | 08h |
| RESERVED | HEADER TYPE | LATENCY TIMER | RESERVED | 0Ch |
| BAR0–LOCAL FRAME BUFFER | | 10h |
| BAR1–CONTROL | | 14h |
| RESERVED | | 18h–30h |
| RESERVED | * CAPABILITIES POINTER | 34h |
| RESERVED | | 38h–3Ch |
| * AGP CAPABILITY IDENTIFIER | | CAPABILITIES POINTER |
| * AGP STATUS | | CAPABILITIES POINTER+4 |
| * AGP COMMAND | | CAPABILITIES POINTER+8 |
| GRAPHICS CONTROLLER SPECIFIC OPTION REGISTERS AND/OR RESERVED | | CAPABILITIES POINTER+12–FFh |

\* = REGIONS INDICATE AGP SPECIFIC REGISTERS

FIGURE 22A

CAPABILITIES POINTER REGISTER 2202

| OFFSET | SIZE | DEFAULT VALUE |
|---|---|---|
| 34h | 8 | 40h |

| BIT NUMBER | TYPE | BIT DESCRIPTION |
|---|---|---|
| 7:0 | Rd | CAPABILITIES POINTER. THIS FIELD CONTAINS A BYTE OFFSET INTO THE DEVICE'S CONFIGURATION SPACE CONTAINING THE FIRST ITEM IN THE CAPABILITIES LIST AND IS A READ ONLY REGISTER. |

FIGURE 22B

AGP CAPABILITY IDENTIFIER REGISTER 2204

| OFFSET | SIZE | DEFAULT VALUE |
|---|---|---|
| 40h | 32 | GRAPHICS CONTROLLER SPECIFIC |

| BIT NUMBER | TYPE | BIT DESCRIPTION |
|---|---|---|
| 31:24 | Rd | RESERVED. ALWAYS RETURNS 0 ON READS; WRITE OPERATIONS HAVE NO EFFECT. |
| 23:20 | Rd | MAJOR REVISION NUMBER. MAJOR REVISION NUMBER OF AGP INTERFACE SPECIFICATION CONFORMED TO BY THIS DEVICE. |
| 19:16 | Rd | MINOR REVISION NUMBER. MINOR REVISION NUMBER OF AGP INTERFACE SPECIFICATION CONFORMED TO BY THIS DEVICE. |
| 15:8 | Rd | NEXT POINTER. POINTER TO THE NEXT ITEM IN CAPABILITIES LIST. MUST BE NULL FOR FINAL ITEM IN LIST. |
| 7:0 | Rd | CAPABILITIES IDENTIFICATION. THE VALUE 02h IN THIS FIELD IDENTIFIES THE LIST ITEM AS PERTAINING TO AGP REGISTERS. |

FIGURE 22C

AGP STATUS REGISTER 2206

| OFFSET | SIZE | DEFAULT VALUE |
|---|---|---|
| 44h | 32 | GRAPHICS CONTROLLER SPECIFIC |

| BIT NUMBER | TYPE | BIT DESCRIPTION |
|---|---|---|
| 31:24 | Rd | MAXIMUM REQUEST QUEUE DEPTH. THIS FIELD CONTAINS THE MAXIMUM NUMBER OF AGP COMMAND REQUESTS THIS DEVICE CAN MANAGE. |
| 23:10 | Rd | RESERVED. ALWAYS RETURNS 0 WHEN READ. WRITE OPERATIONS HAVE NO EFFECT. |
| 9 | Rd | SIDEBAND ADDRESSING SUPPORTED. IF SET TO 0, THIS DEVICE DOES NOT SUPPORT SIDE BAND ADDRESSING. IF SET TO 1, THIS DEVICE SUPPORTS SIDE BAND ADDRESSING. |
| 8:2 | Rd | RESERVED. ALWAYS RETURNS 0 WHEN READ. WRITE OPERATIONS HAVE NO EFFECT. |
| 1:0 | Rd | RATES SUPPORTED. THIS FIELD INDICATES THE DATA TRANSFER RATES SUPPORTED BY THIS DEVICE. AGP COMPLIANT DEVICES MUST REPORT ALL THAT APPLY. BIT 0, WHEN SET TO 1 INDICATES 1x MODE SUPPORTED. BIT 1, WHEN SET TO 1 INDICATES 2x MODE SUPPORTED. ZERO INDICATES THE CORRESPONDING TRANSFER RATE NOT SUPPORTED. |

NOTE: THE RATE FIELD APPLIES TO AD AND SBA BUSSES.

FIGURE 22D

| OFFSET | SIZE | DEFAULT VALUE |
|---|---|---|
| 48h | 32 | GRAPHICS CONTROLLER SPECIFIC |

AGP COMMAND REGISTER 2208

| BIT NUMBER | TYPE | BIT DESCRIPTION |
|---|---|---|
| 31:24 | Rd/Wr | REQUEST QUEUE DEPTH. THIS REGISTER HOLDS THE MAXIMUM NUMBER OF PIPELINED OPERATIONS THE MASTER IS ALLOWED TO ENQUEUE IN THE TARGET. THIS VALUE MUST BE LESS THAN OR EQUAL TO THE VALUE REPORTED IN THE TARGET STATUS REGISTER'S MAXIMUM REQUEST QUEUE DEPTH FIELD. |
| 23:10 | Rd | RESERVED. ALWAYS RETURNS 0 WHEN READ. WRITE OPERATIONS HAVE NO EFFECT. |
| 9 | Rd/Wr | SIDEBAND ADDRESSING ENABLED. WHEN SET TO 1, THE BIT ENABLES SIDEBAND ADDRESSING IN THIS DEVICE. |
| 8 | Rd/Wr | AGP ENABLED. SETTING THIS BIT ALLOWS THE MASTER TO INITIATE AGP OPERATIONS. WHEN CLEARED, THE MASTER CANNOT INITIATE AGP OPERATIONS. |
| 7:3 | Rd/Wr | RESERVED. ALWAYS RETURNS 0 WHEN READ. WRITE OPERATIONS HAVE NO EFFECT. |
| 2:0 | Rd/Wr | DATA RATE. ONE (AND ONLY ONE) BIT IN THIS FIELD MUST BE SET TO INDICATE THE DESIRED AGP TRANSFER RATE. THE SAME BIT MUST BE SET ON BOTH MASTER AND TARGET. BITS SHOULD BE SET TO GET THE FOLLOWING DATA RATE:<br><br>BIT 1   BIT 0   TRANSFER RATE<br>0       1      1X   (DEFAULT)<br>1       0      2X<br><br>THE DEFAULT TRANSFER RATE IS 1X. |

FIGURE 22E

BEST, TYPICAL, AND WORST CASE LATENCIES FOR AGP

| CASE | LATENCY (CLOCKS) | ASSUMPTIONS |
|---|---|---|
| BEST | 14 | AD BUS AVAILABLE, REQUEST ALIGNED ON CACHE LINE BOUNDARY, GART CACHE HIT, PAGE HIT |
| TYPICAL | 40 | AD BUS AVAILABLE, REQUEST ALIGNED ON CACHE LINE BOUNDARY, GART CACHE HIT, PAGE MISS |
| WORST | 117 | AD BUS AVAILABLE, REQUEST ALIGNED ON CACHE LINE BOUNDARY, GART CACHE MISS, PAGE MISS |

FIGURE 23

SERVICES PROVIDED BY THE AGP MINIPORT DRIVER

| NAME OF SERVICE | FUNCTION | PROTOCOL |
|---|---|---|
| PCIMPInit | Initializes AGP registers in the master and target. | PRIRET PCIMPInit (instanceNum, handle, pRefData)<br>where:<br>instanceNum=specifies chipset instance in multi chipset configurations. Input.<br>handle=PCI handle used when calling PCI services. Input.<br>pRefData=pointer to where service writes reference Dword. Output<br>Returns: PCIRET value. |
| PCIMPReset | Calls OS to allocate memory for GART. Enables AGP in master and target. | PCIRET PCIMPReset (handle, refData, numPhysPages, invalidAddr1, invalidAddr2, pCaps)<br>where:<br>handle=PCI handle used when calling PCI services. Input.<br>refData=specifies Dword written by PCIMPInit. Input<br>numPhysPages=number of pages of system memory available for the GART. Input.<br>invalidAddr1=specifies an invalid physical address that can be used to initialize the GART. Input<br>invalid Addr2=specifies a different invalid physical address that can be used to initilize the GART. Input.<br>pCaps=pointer to where PCIMPReset writes the capabilities flag MP_FLUSHES_L2_CACHE. Output.<br>Returns: PCIRET value. |

FIGURE 25A

| SERVICES PROVIDED BY THE AGP MINIPORT DRIVER. (cont.) | | |
|---|---|---|
| PCIMPReserveEntries | Reserves available entries in the GART. | PCIRET PCIMPReserveEntries ( handle, refdata, numPages, alignMask, pMapHandle, pAGPDev, flags). <br><br> where: <br><br> handle=PCI handle used when calling PCI services. Input. <br><br> refData=specifies Dword written by PCIMPInit. Input <br><br> numPages=number of GART entries to reserve. Input <br><br> alignMask=specifies how the requested entries should be aligned in AGP device address space (device address space). **** <br><br> pMapHandle=pointer to where service writes the resulting map handle. Map handle is a linear address pointing to base of reserved entries. Output. <br><br> pAGPDev=pointer to where the service writes the AGP device address corresponding to the allocated device handle. <br><br> flags=UnCached and WriteCombining <br><br> Returns: PCIRET value. |

FIGURE 25B

| SERVICES PROVIDED BY THE AGP MINIPORT DRIVER. (cont.) | |
|---|---|
| PCIMPMapEntries | Maps physical addresses provided by the OS with their corresponding GART entries. Sets link bits as required. | void PCIMPMapEntries (handle, refdata, numPages, mapHandle, systemLin).<br><br>where:<br><br>handle=PCI handle used when calling PCI services. Input.<br><br>refData=specifies Dword written by PCIMPInit. Input<br><br>numPages=number of 4 KB pages in physical memory that need mapping. Input.<br><br>mapHandle=linear address pointing to specific GART entry. This tells driver where to map pages. Input.<br><br>systemLin=Linear address used by the processor which marks the start of the 4 KB pages. Note that the non-contiguous 4 KB pages in physical address space appear to the processor in system linear address space as contiguous. Input.<br><br>Returns: no return value. |

FIGURE 25C

| SERVICES PROVIDED BY THE AGP MINIPORT DRIVER. (cont.) | | |
|---|---|---|
| PCIMPFlushPages | Flushes L1 and L2 caches. | void PCIMPFlushPages (handle, refData, numPages, mapHandle, byteOffset, systemLin).<br><br>where:<br><br>handle=PCI handle used when calling PCI services. Input.<br><br>refData=specifies Dword written by PCIMPInit. Input<br><br>numPages=number of 4 KB pages in physical memory that need mapping. Input.<br><br>mapHandle=linear address pointing to specific GART entry. This tells driver where to map pages. Input.<br><br>byteOffset=offset in bytes from the beginning of the memory block to the start of a page. Input.<br><br>systemLin=Linear address used by the processor which marks the start of the 4 KB pages to flush. Input.<br><br>Returns: no return value. |

FIGURE 25D

SERVICES PROVIDED BY THE AGP MINIPORT DRIVER. (cont.)

| | | |
|---|---|---|
| PCIMPUnmapEntries | Unmaps the GART table entries. GART entries are still marked as valid. Maintains coherency of GART cache and link bits in GART entries. | void PCIMPUnmapEntries (handle, refData, numPages, mapHandle)<br><br>where:<br><br>handle=PCI handle used when calling PCI services. Input.<br><br>refData=specifies Dword written by PCIMPInit. Input.<br><br>numPages=number of GART table entries to free. Input.<br><br>mapHandle=index into the GART. This tells driver the first GART table entry to free. Input.<br><br>byteOffset=offset in bytes from the beginning of the memory block to the start of a page. Input.<br><br>Returns: no return value. |
| PCIMPFreeEntries | Marks a GART table entry as invalid, thus freeing the entry for future use. | void PCIMPUnmapEntries (handle, refData, numPages, mapHandle)<br><br>where:<br><br>handle=PCI handle used when calling PCI services. Input.<br><br>refData=specifies Dword written by PCIMPInit. Input.<br><br>numPages=number of GART table entries to free. Input.<br><br>mapHandle=index into the GART. This tells driver the first GART table entry to free. Input.<br><br>Returns: no return value. |

FIGURE 25E

| SERVICES PROVIDED BY THE AGP MINIPORT DRIVER. (cont.) | |
|---|---|
| PCIMPExit | Returns GART table to system memory (i.e.-deallocates GART table). | void PCIMPExit (handle, refData)<br><br>where:<br><br>handle=PCI handle used when calling PCI services. Input.<br><br>refData=specifies Dword written by PCIMPInit. Input.<br><br>Returns: no return value. |

FIGURE 25F

SERVICES AVAILABLE TO THE AGP MINIPORT DRIVER

| NAME OF SERVICE | FUNCTION | PROTOCOL |
|---|---|---|
| PCIGetVersion | Gets the operating system version number. | ULONG PCIGet Version 0<br>Returns: This service returns one of the following values:<br><br>400   Windows95<br>410   Windows97<br>500   Windows NT 5.0 |
| PCIGetHandleInfo | Gets current device and function numbers. | VOID PCIGetHandleInfo (handle, pBus, pDeviceFunction)<br>where:<br><br>handle=PCI device handle for either the master or target. This value is obtained from the preceding PCIMPInit call. Input.<br>pBus=pointer to where service writes the bus number. Output.<br>pDeviceFunction=pointer to where service writes the device function number. Returns: no return value. |
| PCIReadConf | Reads the requested Dword from the master or target's PCI configuration header. | ULONG PCIReadConf (bus, deviceFunction, offset)<br>where:<br>bus=specifies bus number obtained from call to PCIGetHandleInfo. Input.<br>deviceFunction=specifies device function number obtained from call to PCIGetHandleInfo. Input.<br>offset=offset into configuration header. Input.<br>Returns: no return value. |

FIGURE 26A

SERVICES AVAILABLE TO THE AGP MINIPORT DRIVER. (cont.)

| | | |
|---|---|---|
| PCIWriteConf. | Writes the requested Dword to the specified master or target's PCI configuration header. | void PCIWriteConf (bus, deviceFunction, offset, newValue)<br>where:<br>bus=specifies bus number obtained from call to PCIGetHandleInfo. Input.<br>deviceFunction=specifies deviceFunction number obtained from call to PCIGetHandleInfo. Input.<br>offset=offset into configuration header. Input.<br>newValue=value to be written to the specified offset. Input.<br>Returns: no return value. |
| PCIAllocate Pages | Requests OS to allocate pages for the GART table. | PVOID PCIAllocatePages (numPages, alignMask, flags)<br>where:<br>numPages=number of 4 KB pages in physical memory to be allocated. Input.<br>alignMask=specifies how the requested entries should be aligned in memory (i.e. -boundaries). Input.<br>flags=PageZeroInit and PageContig flags. Input.<br>Returns: this service returns NULL or the linear address. |
| PCIFreePages | Frees memory allocated for GART table. | void PCIFreePages (linAddress)<br>where:<br>linAddress=linear address for the base of the GART table.<br>Returns: no return value. |
| PCILinToDev | Converts linear address to device (physical) address. | ULONG PCILinToDev (linAddress)<br>where:<br>linAddress=linear address to convert to device address.<br>Returns: no return value. |

FIGURE 26B

COMPATIBLE MODE:
SINGLE-LEVEL TRANSLATION: BITS REQUIRED FOR PAGE OFFSET

| AGP MEMORY ALLOCATED | NUMBER OF BITS IN BASE ADDRESS OF DEVICE ADDRESS SPACE | NUMBER OF BITS IN PAGE OFFSET FROM BASE OF DEVICE ADDRESS SPACE | NUMBER OF BITS IN OFFSET INTO 4 KB PAGE |
|---|---|---|---|
| 32 MB | 63:25 | 24:12 | 11:0 |
| 64 MB | 63:26 | 25:12 | 11:0 |
| 128 MB | 63:27 | 26:12 | 11:0 |
| 256 MB | 63:28 | 27:12 | 11:0 |
| 512 MB | 63:29 | 28:12 | 11:0 |
| 1 GB | 63:30 | 29:12 | 11:0 |
| 2 GB | 63:31 | 30:12 | 11:0 |
| 4 GB | 63:32 | 31:12 | 11:0 |
| 8 GB | 63:34 | 32:12 | 11:0 |
| 16 GB | 63:35 | 33:12 | 11:0 |
| 32 GB | 63:36 | 34:12 | 11:0 |
| 64 GB | 63:37 | 35:12 | 11:0 |
| 128 GB | 63:38 | 36:12 | 11:0 |
| 256 GB | 63:39 | 37:12 | 11:0 |
| ... | ... | X:12 | 11:0 |
| 4X10$^{18}$ B | 63 | 62:12 | 11:0 |

FIGURE 28

COMPATIBLE MODE:
TWO-LEVEL TRANSLATION: BITS REQUIRED FOR DIRECTORY AND PAGE OFFSET

| AGP MEMORY ALLOCATED | NUMBER OF BITS IN BASE ADDRESS OF DEVICE ADDRESS SPACE | NUMBER OF BITS IN PAGE OFFSET FROM BASE OF DEVICE ADDRESS SPACE | NUMBER OF BITS IN OFFSET INTO 4 KB PAGE |
|---|---|---|---|
| 32 MB | 63:25 | 24:22 | 11:0 |
| 64 MB | 63:26 | 25:22 | 11:0 |
| 128 MB | 63:27 | 26:22 | 11:0 |
| 256 MB | 63:28 | 27:22 | 11:0 |
| 512 MB | 63:29 | 28:22 | 11:0 |
| 1 GB | 63:30 | 29:22 | 11:0 |
| 2 GB | 63:31 | 30:22 | 11:0 |
| 4 GB | 63:32 | 31:22 | 11:0 |
| 8 GB | 63:33 | 32:22 | 11:0 |
| 16 GB | 63:34 | 33:22 | 11:0 |
| 32 GB | 63:35 | 34:22 | 11:0 |
| 64 GB | 63:36 | 35:22 | 11:0 |
| 128 GB | 63:37 | 36:22 | 11:0 |
| 256 GB | 63:38 | 37:22 | 11:0 |
| ... | ... | ... | |
| $4 \times 10^{18}$ B | 63 | 62:22 | 11:0 |

FIGURE 30

MULTI-MODE GRAPHICS ADDRESS REMAPPING TABLE FOR AN ACCELERATED GRAPHICS PORT DEVICE

BACKGROUND OF THE INVENTION

1. Field of the Invention

The present invention relates to computer systems using a bus bridge(s) to interface a central processor(s), video graphics processor(s), random access memory and input-output peripherals together, and more particularly, to a multi-mode graphics address remapping table (GART) used with an accelerated graphics port device.

2. Description of the Related Art

Use of computers, especially personal computers, in business and at home is becoming more and more pervasive because the computer has become an integral tool of most information workers who work in the fields of accounting, law, engineering, insurance, services, sales and the like. Rapid technological improvements in the field of computers have opened up many new applications heretofore unavailable or too expensive for the use of older technology mainframe computers. These personal computers may be stand-alone workstations (high end individual personal computers), desk-top personal computers, portable lap-top computers and the like, or they may be linked together in a network by a "network server" which is also a personal computer which may have a few additional features specific to its purpose in the network. The network server may be used to store massive amounts of data, and may facilitate interaction of the individual workstations connected to the network for electronic mail ("E-mail"), document databases, video teleconferencing, white boarding, integrated enterprise calendar, virtual engineering design and the like. Multiple network servers may also be interconnected by local area networks ("LAN") and wide area networks ("WAN").

A significant part of the ever increasing popularity of the personal computer, besides its low cost relative to just a few years ago, is its ability to run sophisticated programs and perform many useful and new tasks. Personal computers today may be easily upgraded with new peripheral devices for added flexibility and enhanced performance. A major advance in the performance of personal computers (both workstation and network servers) has been the implementation of sophisticated peripheral devices such as video graphics adapters, local area network interfaces, SCSI bus adapters, full motion video, redundant error checking and correcting disk arrays, and the like. These sophisticated peripheral devices are capable of data transfer rates approaching the native speed of the computer system microprocessor central processing unit ("CPU"). The peripheral devices' data transfer speeds are achieved by connecting the peripheral devices to the microprocessor(s) and associated system random access memory through high speed expansion local buses. Most notably, a high speed expansion local bus standard has emerged that is microprocessor independent and has been embraced by a significant number of peripheral hardware manufacturers and software programmers. This high speed expansion bus standard is called the "Peripheral Component Interconnect" or "PCI." A more complete definition of the PCI local bus may be found in the PCI Local Bus Specification, revision 2.1; PCI/PCI Bridge Specification, revision 1.0; PCI System Design Guide, revision 1.0; PCI BIOS Specification, revision 2.1, and Engineering Change Notice ("ECN") entitled "Addition of 'New Capabilities' Structure," dated May 20, 1996; and the PCI-X Addendum to the PCI Local Bus Specification, Revision 1.0, dated Sep. 22, 1999, the disclosures of which are hereby incorporated by reference. These PCI specifications and ECN are available from the PCI Special Interest Group, P.O. Box 14070, Portland, Oreg. 97214.

A computer system has a plurality of information (data and address) buses, such as a host bus, a memory bus, at least one high speed expansion local bus such as the PCI bus, and other peripheral buses such as the Small Computer System Interface (SCSI), Extension to Industry Standard Architecture (EISA), and Industry Standard Architecture (ISA). The microprocessor(s) of the computer system communicates with main memory and with the peripherals that make up the computer system over these various buses. The microprocessor(s) communicates to the main memory over a host bus to memory bus bridge. The peripherals, depending on their data transfer speed requirements, are connected to the various buses which are connected to the microprocessor host bus through bus bridges that detect required actions, arbitrate, and translate both data and addresses between the various buses.

Increasingly sophisticated microprocessors have revolutionized the role of the personal computer by enabling complex applications software to run at mainframe computer speeds. The latest microprocessors have brought the level of technical sophistication to personal computers that, just a few years ago, was available only in mainframe and mini-computer systems. Some representative examples of these new microprocessors are the "PENTIUM" and "PENTIUM PRO" (registered trademarks of Intel Corporation). Advanced microprocessors are also manufactured by Advanced Micro Devices, Cyrix, IBM, Digital Equipment Corp., and Motorola.

These sophisticated microprocessors have, in turn, made possible running complex application programs using advanced three dimensional ("3-D") graphics for computer aided drafting and manufacturing, engineering simulations, games and the like. Increasingly complex 3-D graphics require higher speed access to ever larger amounts of graphics data stored in memory. This memory may be part of the video graphics processor system, but, preferably, would be best (lowest cost) if part of the main computer system memory. Intel Corporation has proposed a low cost but improved 3-D graphics standard called the "Accelerated Graphics Port" (AGP) initiative. With AGP 3-D, graphics data, in particular textures, may be shifted out of the graphics controller local memory to computer system memory. The computer system memory is lower in cost than the graphics controller local memory and is more easily adapted for a multitude of other uses besides storing graphics data.

The proposed Intel AGP 3-D graphics standard defines a high speed data pipeline, or "AGP bus," between the graphics controller and system memory. This AGP bus has sufficient bandwidth for the graphics controller to retrieve textures from system memory without materially affecting computer system performance for other non-graphics operations. The Intel 3-D graphics standard is a specification which provides signal, protocol, electrical, and mechanical specifications for the AGP bus and devices attached thereto. This specification is entitled "Accelerated Graphics Port Interface Specification Revision 1.0," dated Jul. 31, 1996, ("AGP1.0") the disclosure of which is hereby incorporated by reference. Enhancements to the AGP1.0 Specification are included in the "Accelerated Graphics Port Interface Specification Revision 2.0," dated May 4, 1998 ("AGP2.0"), the disclosure of which is hereby incorporated by reference. Both the AGP1.0 and AGP2.0 Specifications are available from Intel Corporation, Santa Clara, Calif.

The AGP1.0 interface specification uses the 66 MHz PCI (Revision 2.1) specification as an operational baseline, with three performance enhancements to the PCI specification which are used to optimize the AGP1.0 Specification for high performance 3-D graphics applications. These enhancements are: 1) pipelined memory read and write operations, 2) demultiplexing of address and data on the AGP bus by use of sideband signals, and 3) data transfer rates of 133 MHz for data throughput in excess of 500 megabytes per second ("MB/s"). The remaining AGP1.0 Specification does not modify the PCI specification, but rather provides a range of graphics-oriented performance enhancements for use by 3-D graphics hardware and software designers. The AGP1.0 Specification is neither meant to replace nor diminish full use of the PCI standard in the computer system. The AGP1.0 Specification creates an independent and additional high speed local bus for use by 3-D graphics devices such as a graphics controller, wherein the other input-output ("I/O") devices of the computer system may remain on any combination of the PCI, SCSI, EISA and ISA buses. The AGP1.0 Specification supports only 32-bit memory addressing.

The AGP2.0 Specification supports 64-bit memory addressing, which is beneficial for addressing memory sizes allocated to the AGP device that are larger than 2 GB. The AGP2.0 Specification also includes several other enhancements. For example, the AGP2.0 Specification supports 1) 4× transfer mode with low (1.5V voltage electrical signals that allows four data transfers per 66 MHz clock cycle, providing data throughput of up to 1 GB/second; 2) five additional sideband signals; 3) a fast write protocol; 4) new input/output buffers; and 5) new mechanical connectors.

Regardless of the version of the AGP specification, to functionally enable the AGP 3-D graphics bus, new computer system hardware and software are required. This requires new computer system core logic designed to function as a host bus/memory bus/PCI bus to AGP bus bridge meeting the AGP1.0 or AGP2.0 Specifications, and new Read Only Memory Basic Input Output System ("ROM BIOS") and Application Programming Interface ("API") software to make the AGP dependent hardware functional in the computer system. The computer system core logic must still meet the PCI and/or PCI-X standards referenced above and facilitate interfacing the PCI bus(es) to the remainder of the computer system. In addition, new AGP compatible device cards must be designed to properly interface, mechanically and electrically, with the AGP bus connector.

A major performance/cost enhancement using AGP in a computer system is accomplished by shifting texture data structures from local graphics memory to main memory. Textures are ideally suited for this shift for several reasons. Textures are generally read-only, and therefore problems of access ordering and coherency are less likely to occur. Shifting of textures serves to balance the bandwidth load between system memory and local graphics memory, since a well-cached host processor has much lower memory bandwidth requirements than does a 3-D rendering machine; texture access comprises perhaps the single largest component of rendering memory bandwidth, so avoiding loading or caching textures in local graphics memory saves not only this component of local memory bandwidth, but also the bandwidth necessary to load the texture store in the first place, and, further, this data must pass through main memory anyway as it is loaded from a mass store device. Texture size is dependent upon application quality rather than on display resolution, and therefore may require the greatest increase in memory as software applications become more advanced. Texture data is not persistent and may reside in the computer system memory only for the duration of the software application, so any system memory spent on texture storage can be returned to the free memory heap when the application concludes (unlike a graphic controller's local frame buffer which may remain in persistent use). For these reasons, shifting texture data from local graphics memory to main memory significantly reduces computer system costs when implementing 3-D graphics.

Generally, in a computer system memory architecture the graphics controller's physical address space resides above the top of system memory. The graphics controller uses this physical address space to access its local memory which holds information required to generate a graphics screen. In the AGP system, information still resides in the graphics controller's local memory (textures, alpha, z-buffer, etc.), but some data which previously resided in this local memory is moved to system memory (primarily textures, but also command lists, etc.). The address space employed by the graphics controller to access these textures becomes virtual, meaning that the physical memory corresponding to this address space doesn't actually exist above the top of memory. In reality, each of these virtual addresses corresponds to a physical address in system memory. The graphics controller sees this virtual address space, referenced hereinafter as "AGP device address space," as one contiguous block of memory, but the corresponding physical memory addresses may be allocated in 4 kilobyte ("KB"), non-contiguous pages throughout the computer system physical memory.

There are two primary AGP usage models for 3D rendering that have to do with how data are partitioned and accessed, and the resultant interface data flow characteristics. In the "DMA" model, the primary graphics memory is a local memory referred to as local frame buffer and is associated with the AGP graphics controller or "video accelerator." 3D structures are stored in system memory, but are not used (or "executed") directly from this memory; rather they are copied to primary (local) memory, to which the rendering engine's address generator (of the AGP graphics controller) makes references thereto. This implies that the traffic on the AGP bus tends to be long, sequential transfers, serving the purpose of bulk data transport from system memory to primary graphics (local) memory. This sort of access model is amenable to a linked list of physical addresses provided by software (similar to operation of a disk or network I/O device), and is generally not sensitive to a non-contiguous view of the memory space.

In the "execute" model, the video accelerator uses both the local memory and the system memory as primary graphics memory. From the accelerator's perspective, the two memory systems are logically equivalent; any data structure may be allocated in either memory, with performance optimization as the only criteria for selection. In general, structures in system memory space are not copied into the local memory prior to use by the video accelerator, but are "executed" in place. This implies that the traffic on the AGP bus tends to be short, random accesses, which are not amenable to an access model based on software resolved lists of physical addresses. Since the accelerator generates direct references into system memory, a contiguous view of that space is essential. But, since system memory is dynamically allocated in, for example, random 4,096 byte blocks of the memory, hereinafter 4 kilobyte ("KB") pages, the "execute" model provides an address mapping mechanism that maps the random 4 KB pages into a single contiguous address space.

The AGP Specification supports both the "DMA" and "execute" models. However, since a primary motivation of the AGP is to reduce growth pressure on the graphics controller's local memory (including local frame buffer memory), the "execute" model is preferred. Consistent with this preference, the AGP Specification requires a virtual-to-physical address re-mapping mechanism which ensures the graphics accelerator (AGP master) will have a contiguous view of graphics data structures dynamically allocated in the system memory. This address re-mapping applies only to a single, programmable range of the system physical address space and is common to all system agents. Addresses falling in this range are re-mapped to non-contiguous pages of physical system memory. All addresses not in this range are passed through without modification, and map directly to main system memory, or to device specific ranges, such as a PCI device's physical memory. Re-mapping is accomplished via a "Graphics Address Remapping Table" ("GART table") which is set up and maintained by a GART miniport driver software, and used by the core logic chipset to perform the re-mapping. In order to avoid compatibility issues and allow future implementation flexibility, this mechanism is specified at a software (API) level. In other words, the actual GART table format may be abstracted to the API by a hardware abstraction layer ("HAL") or miniport driver that is provided with the core logic chipset. While this API does not constrain the future partitioning of re-mapping hardware, the re-mapping function will typically be implemented in the core logic chipset.

The contiguous AGP graphics controller's device addresses are mapped (translated) into corresponding physical addresses that reside in the computer system physical memory by using the GART table which may also reside in physical memory. The GART table is used by the core logic chipset to remap AGP device addresses that can originate from either the AGP, host, or PCI buses. The GART table is managed by a software program called a "GART miniport driver." The GART miniport driver provides GART services for the computer software operating system.

What is needed to more fully and efficiently utilize the computer system and its physical memory when implementing AGP 3-D graphics requiring GART table translations is a system, method and apparatus for customizing the properties of each page of system memory associated with the GART table.

In light of the greater memory needs of increasingly complex applications, a GART table that implements greater than 32-bit addressing is desirable. The particular configuration of the GART table, including the number of bits used for addressing, would be dependent on the capabilities of the AGP device and the amount of system memory available for allocation to the AGP device.

SUMMARY OF THE INVENTION

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

In accordance with one aspect of the present invention, there is provided a computer system comprising a system processor to execute software instructions and generate graphics data, a system memory comprising a plurality of addressable storage locations in which the software instructions and the graphics data are stored, a graphics controller to generate video display data from the graphics data, and a core logic chipset coupled to the system processor, the system memory, and the graphics controller. The system further comprises a graphics address remapping table (GART) comprising a plurality of GART entries. Each of the GART entries comprises an address pointer to a corresponding addressable storage location of graphics data in the system memory. The core logic chipset uses the GART entries to remap the graphics data into a graphics device address space for use by the graphics controller in generating the video display data. Each GART entry comprises a plurality of bits, wherein the number of the bits of each entry is based on an addressing capability of the graphics controller.

In accordance with another embodiment, a core logic chipset for connecting a processor and a system memory to an accelerated graphics port (AGP) bus comprises a memory interface and control logic configured to connect to the system memory; a processor interface configured to connect to a processor; and an AGP data and control logic configured to connect to an AGP bus having an AGP device connected thereto. The AGP data and control logic is configured to use a GART comprising a plurality of GART entries, each of the plurality of GART entries comprising a plurality of bits, wherein the number of the bits of each GART entry is dependent on an addressing parameter.

In accordance with yet another embodiment of the invention, a method of creating a GART is provided. The method comprises determining an available amount of system memory, determining an amount of the available system memory to allocate to a graphics controller, and determining an addressing capability of the graphics controller. The method further comprises creating a GART to map a plurality of addressable storage locations in the system memory to a graphics address space for use by the graphics controller. The GART comprises a plurality of GART entries, each of which corresponds to one of the plurality of addressable storage locations. Each GART entry further comprises a plurality of bits, the number of which is dependent on at least one of the size of the available system memory to allocate to the graphics controller and the addressing capability of the graphics controller.

BRIEF DESCRIPTION OF THE DRAWINGS

The foregoing and other advantages of the invention will become apparent upon reading the following detailed description and upon reference to the drawings in which:

FIG. 10 is a table of bits required for page offset in a single-level translation;

FIG. 12B is a table of bits required for directory and page offset in a two-level translation;

FIG. 15 is a table of maximum GART table size versus size of AGP memory;

FIG. 17A is a schematic table of registers according to the AGP functional block diagram of FIG. 16 and an embodiment of the present invention;

FIGS. 17B, 17Ba and 17C are tables of a functional description of the bits used in the AGP registers of FIG. 17A, according to the present invention;

FIGS. 18A and 18Aa are a schematic table of registers according to the AGP functional block diagram of FIG. 16 and an embodiment of the present invention;

FIGS. 18B–18Ma are tables of a functional description of the bits used in the AGP registers of FIGS. 18A and 18Aa, according to the present invention;

FIG. 19A is a schematic table of memory-mapped registers according to the AGP functional block diagram of FIG. 16 and an embodiment of the present invention;

FIGS. 19B–19N are tables of functional descriptions of the bits used in the AGP registers of FIG. 19A, according to the present invention;

FIG. 22A is a schematic table of AGP graphics controller configuration registers according to the AGP functional block diagram of FIG. 16 and an embodiment of the present invention;

FIGS. 22B–22E are tables of functional descriptions of the bits used in the AGP registers of FIG. 16A, according to the present invention;

FIG. 23 is a table of best, typical, and worst case latencies for AGP, according to the present invention;

FIGS. 25A–25F are tables of software services provided by the GART miniport driver;

FIGS. 26A and 26B are tables of software services available to the GART miniport driverl

FIG. 28 is a table of bits used for page offset in a single-level address translation in the compatible mode;

FIG. 30 is a table of bits used for directory and page offset in a two-level translation in the compatible mode.

DETAILED DESCRIPTION OF SPECIFIC EMBODIMENTS

Figure 1:
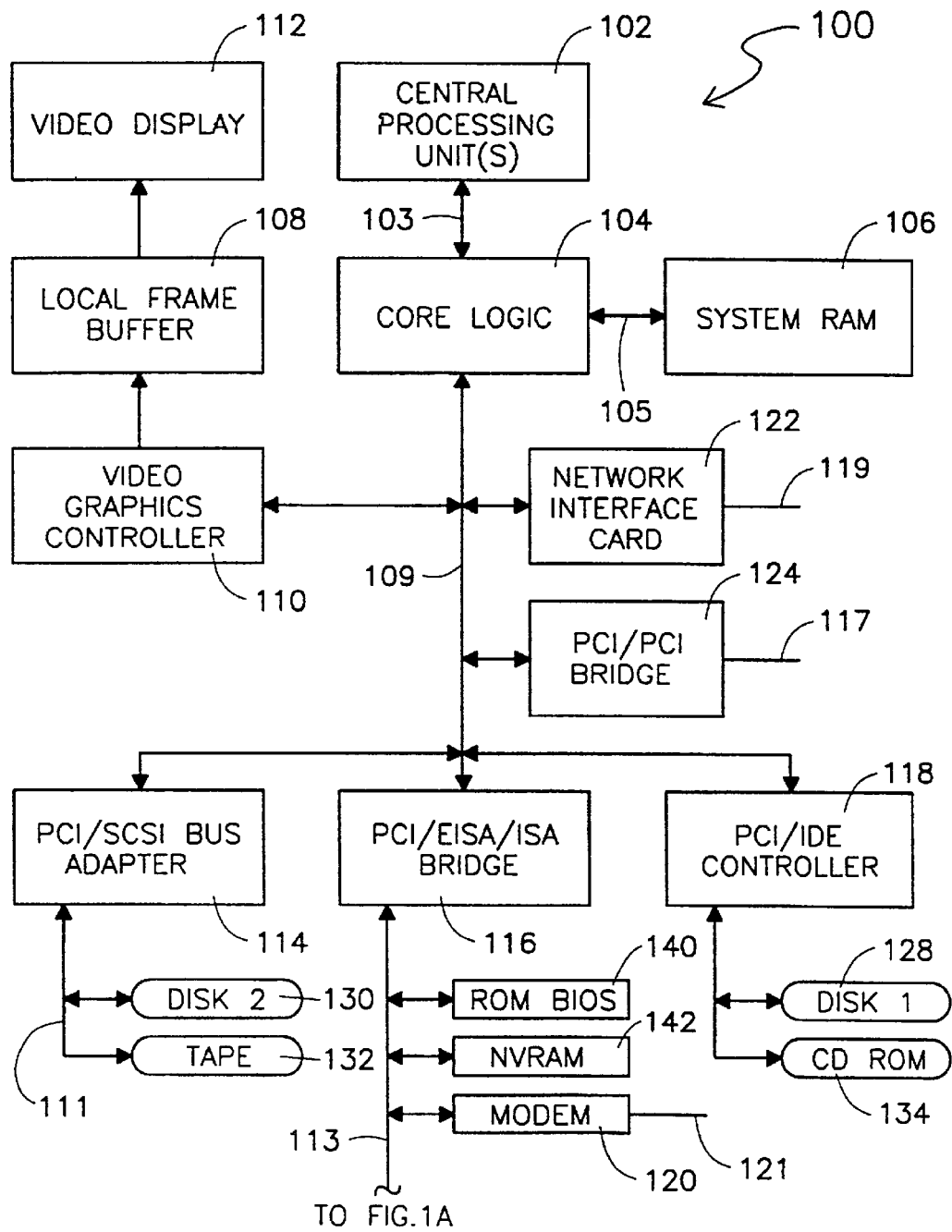
FIGS. 1 and 1A are a schematic block diagram of a prior art computer system.

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present invention provides a core logic chipset in a computer system which is capable of implementing a bridge between host processor and memory buses, an AGP bus adapted for an AGP device(s), and a PCI bus adapted for PCI devices. The AGP device may be a graphics controller which utilizes graphical data such as textures by addressing a contiguous virtual address space, hereinafter "AGP device address space," that is translated from non-contiguous memory pages located in the computer system physical memory by the core logic chipset. The core logic chipset utilizes a "Graphics Address Remapping Table" ("GART table") which may reside in a physical memory of the computer system, such as system random access memory, and may be controlled by the core logic chipset software driver(s). The function of the GART table is to remap virtual addresses referenced by the AGP device to the physical addresses of the graphics information located in the computer system physical memory. Each entry of the GART table describes a first byte address location for a page of physical memory. The page of physical memory may be 4,096 bytes (4 KB) in size. A GART table entry comprises a memory address translation pointer and software controllable feature flags (see FIGS. 13 and 13A). These feature flags may be used to customize the associated page of physical memory. API software and miniport drivers may write to and/or read from these feature flags.

For illustrative purposes, preferred embodiments of the present invention are described hereinafter for computer systems utilizing the Intel x86 microprocessor architecture and certain terms and references will be specific to those processor platforms. AGP and PCI are interface standards, however, that are hardware independent and may be utilized with any host computer designed for these interface standards. It will be appreciated by those skilled in the art of computer systems that the present invention may be adapted and applied to any computer platform utilizing the AGP and PCI interface standards.

The PCI specifications referenced above are readily available and are hereby incorporated by reference. The AGP Specifications as referenced above and incorporated herein by reference are ready available from Intel Corporation.

Further definition and enhancement of the AGP1.0 Specification is more fully defined in "Compaq's Supplement to the 'Accelerated Graphics Port Interface Specification Version 1.0'," Revision 0.8, dated Apr. 1, 1997, and is hereby incorporated by reference.

Figure 2:
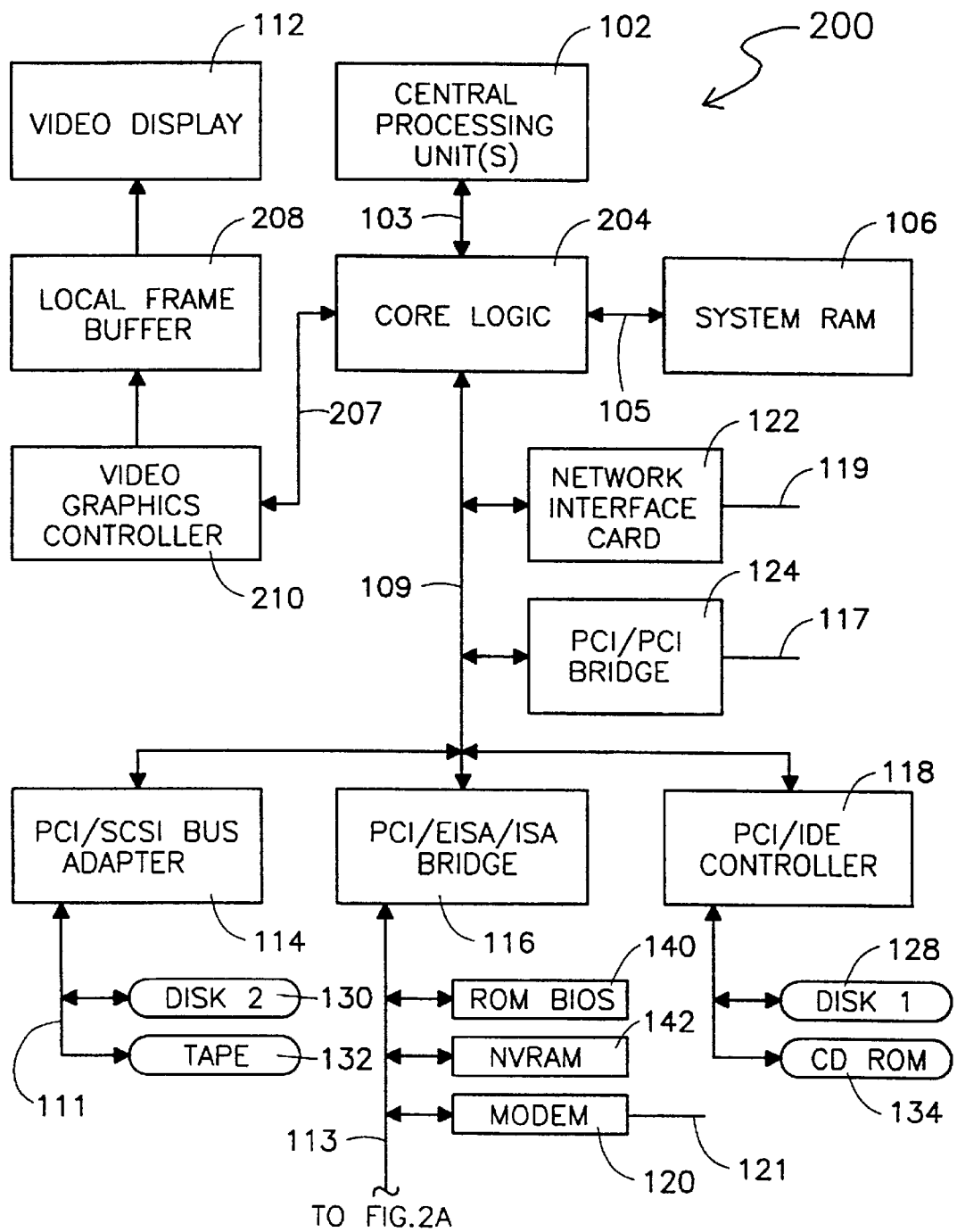
FIGS. 2 and 2A area schematic block diagram of a computer system according to the present invention.
Figure 2A:
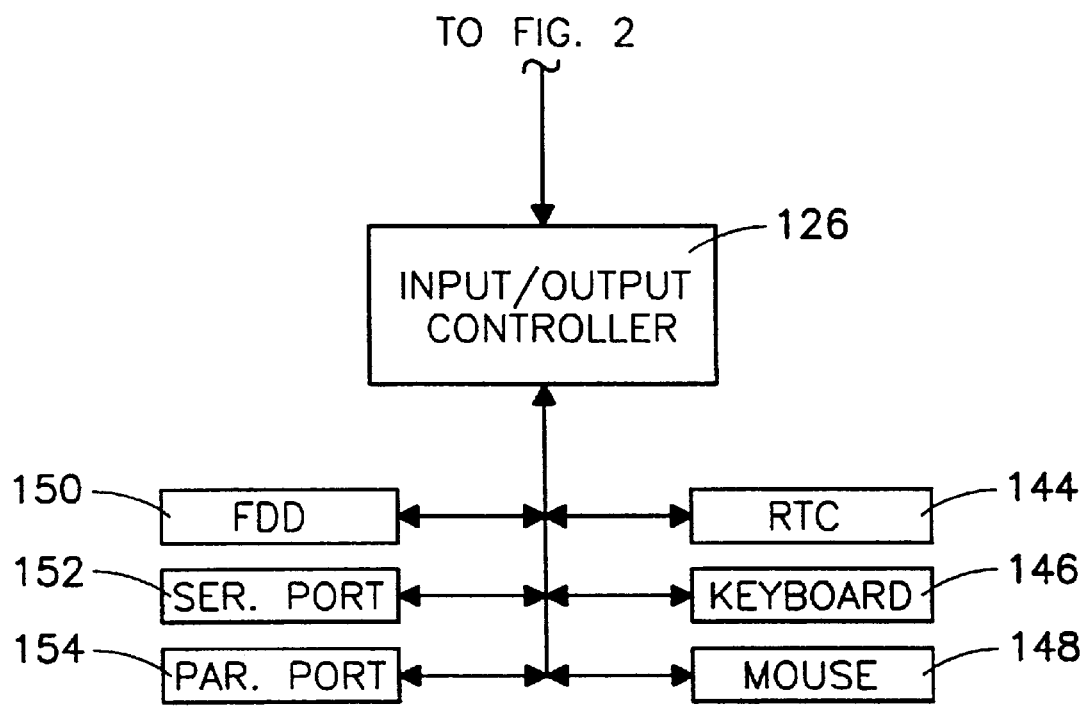

Referring now to the drawings, the details of preferred embodiments of the present invention are schematically illustrated. Like elements in the drawings will be represented by like numbers, and similar elements will be represented by like numbers with a different lower case letter suffix. Referring now to FIGS. 2 and 2A, a schematic block diagram of a computer system utilizing the present invention is illustrated. A computer system is generally indicated by the numeral 200 and comprises a central processing unit(s) ("CPU") 102, core logic 204, system random access memory ("RAM") 106, a video graphics controller 210, a local frame buffer 208, a video display 112, a PCI/SCSI bus adapter 114, a PCI/EISA/ISA bridge 116, and a PCI/IDE controller 118. Single or multilevel cache memory (not illustrated) may also be included in the computer system 200 according to the current art of microprocessor computer systems. The CPU 102 may be a plurality of CPUs 102 in a symmetric or asymmetric multi-processor configuration.

The CPU(s) 102 is connected to the core logic 204 through a host bus 103. The system RAM 106 is connected to the core logic 204 through a memory bus 105. The video graphics controller(s) 210 is connected to the core logic 204 through an AGP bus 207. The PCI/SCSI bus adapter 114, PCI/EISA/ISA bridge 116, and PCI/IDE controller 118 are connected to the core logic 204 through a primary PCI bus 109. Also connected to the PCI bus 109 are a network interface card ("NIC") 122 and a PCI/PCI bridge 124. Some of the PCI devices such as the NIC 122 and PCI/PCI bridge 124 may plug into PCI connectors on the computer system 200 motherboard (not illustrated).

Hard disk 130 and tape drive 132 are connected to the PCI/SCSI bus adapter 114 through a SCSI bus 111. The NIC 122 is connected to a local area network 119. The PCI/EISA/ISA bridge 116 connects over an EISA/ISA bus 113 to a ROM BIOS 140, non-volatile random access memory (NVRAM) 142, modem 120, and input-output controller 126. The modem 120 connects to a telephone line 121. The input-output controller 126 interfaces with a keyboard 146, real time clock (RTC) 144, mouse 148, floppy disk drive ("FDD") 150, and serial/parallel ports 152, 154. The EISA/ISA bus 113 is a slower information bus than the PCI bus 109, but it costs less to interface with the EISA/ISA bus 113.

Figure 3:
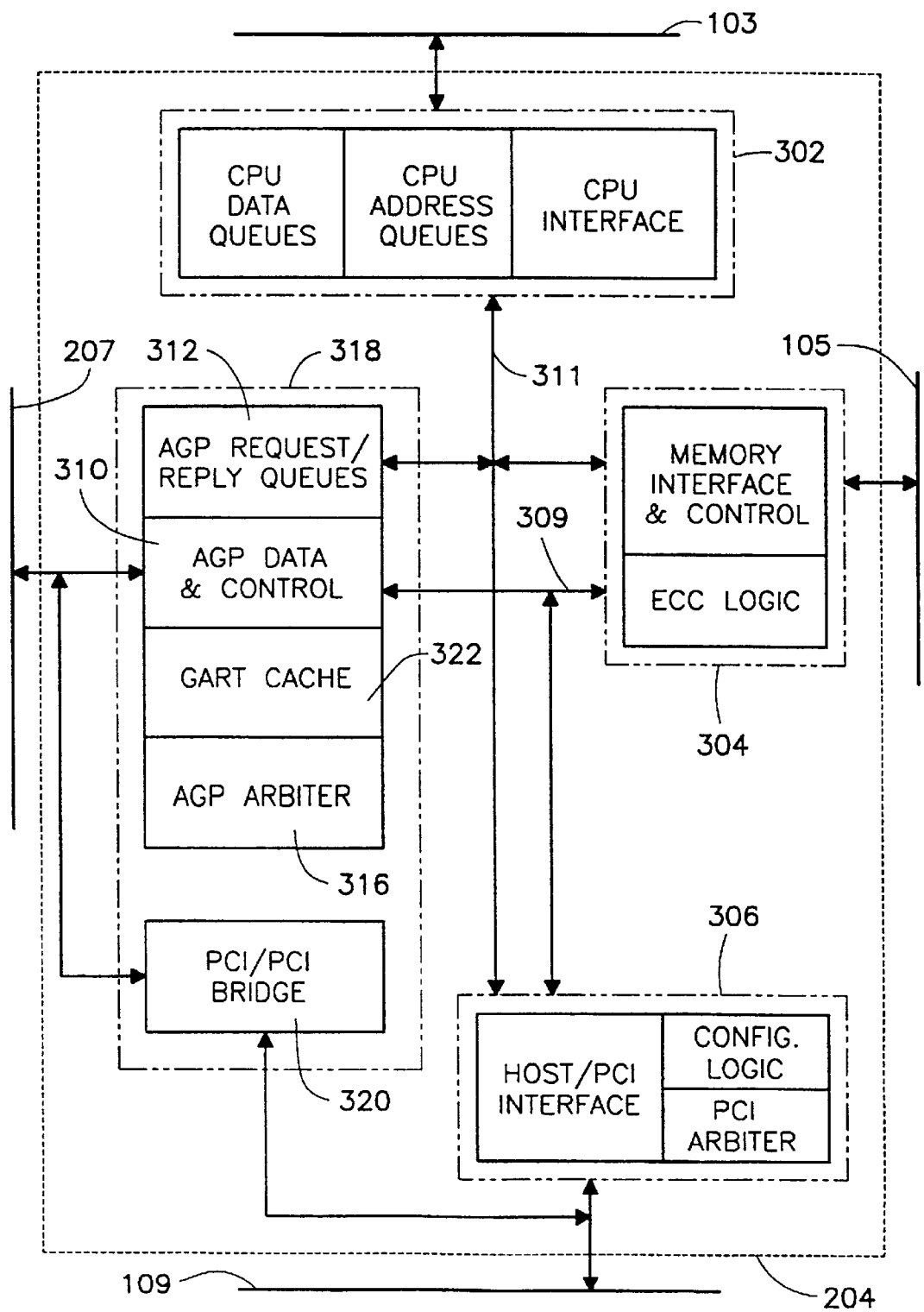
FIG. 3 is a schematic functional block diagram of an embodiment of the present invention according to the computer system illustrated in FIGS. 2 and 2A.

Referring now to FIG. 3, a schematic functional block diagram of the core logic 204 of FIGS. 2 and 2A, according to the present invention, is illustrated. The core logic 204 functionally comprises CPU host bus interface and queues 302, memory interface and control 304, host/PCI bridge 306, AGP logic 318, and PCI/PCI bridge 320. The AGP logic 318 comprises AGP arbiter 316, GART cache 322, AGP data and control 310, and AGP request/reply queues 312. The CPU host bus interface and queues 302 connect to the host bus 103 and include interface logic for all data, address and control signals associated with the CPU(s) 102 of the computer system 200. Multiple CPUs 102 and cache memory associated therewith (not illustrated) are contemplated and within the scope of the present invention.

The CPU host bus interface and queues 302 interfaces with the host/PCI bridge 306 and memory interface and control 304 over a core logic bus 311. The CPU host bus interface and queues 302 interfaces with the AGP logic 318 over the core logic bus 311. The memory interface and control 304 interfaces with the AGP logic 318 over a core logic bus 309. An advantage of having separate buses 309 and 311 is that concurrent bus operations may be performed thereover. For example, video data stored in system RAM 106, connected to the bus 105, may be transferring to the video graphics controller 210 (AGP device) on the AGP bus 207 while the CPU 102 on the host bus 103 is accessing an independent PCI device (i.e., NIC 122) on the PCI bus 109.

The host bus interface and queues 302 allows the CPU 102 to pipeline cycles and schedule snoop accesses. The memory interface and control 304 generates the control and timing signals for the computer system RAM 106 which may be synchronous dynamic RAM and the like. The memory interface and control 304 has an arbiter (not illustrated) which selects among memory accesses for CPU writes, CPU reads, PCI writes, PCI reads, AGP reads, AGP writes, and dynamic memory refresh Arbitration may be pipelined into a current memory cycle, which ensures that the next memory address is available on the memory bus 105 before the current memory cycle is complete. This results in minimum delay, if any, between memory cycles. The memory interface and control 304 also is capable of reading ahead on PCI master reads when a PCI master issues a read multiple command, as more fully described in the PCI Specification.

The host/PCI bridge 306 controls the interface to the PCI bus 109. When the CPU 102 accesses the PCI bus 109, the host/PCI bridge 306 operates as a PCI master. When a PCI device is a master on the PCI bus 109, the host/PCI bridge 306 operates as a PCI slave. The host/PCI bridge 306 contains base address registers for PCI device targets on its PCI bus 109 (not illustrated).

The AGP data and control 310, AGP arbiter 316, and AGP request/reply queues 312 interface to the AGP bus 207 and also have signal, power and ground connections (not illustrated) for implementation of signals defined in the AGP and PCI Specifications. The AGP bus 207 is adapted to connect to an AGP device(s) and/or an AGP connector(s) (not illustrated). The GART cache 322 is used to store GART table entries for reordering and retrieving random non-contiguous AGP pages 412 (FIG. 4) in the computer system memory 106 to contiguous AGP device address space 406 for use by the graphics controller 210.

The PCI/PCI bridge 320 is connected between the PCI bus 109 and the AGP bus 207. The PCI/PCI bridge 320 allows existing enumeration code in the computer system BIOS 140 to recognize and handle AGP compliant devices, such as the video graphics controller 210, residing on the AGP bus 207. The PCI/PCI bridge 320, for example, may be used in configuring the control and status registers of the AGP graphics controller 210 or the AGP logic 318 by bus enumeration during POST, both being connected to the AGP bus 207, as more fully described herein below.

The following description which references FIGS. 4–26B is provided for a particular embodiment based on the AGP1.0 and PCI Specifications which support 32-bit memory addressing only. In alternative embodiment shall be described below with reference to FIGS. 27–30, which contemplates greater than 32-bit memory address (e.g., 64-bit addressing). It should be understood, however, that many aspects of a system which support 32-bit addressing carry over to a system which supports greater than 32-bit memory addressing. Indeed, any differences in many of the components (e.g., registers, etc.) of the 32-bit addressing system described below may be readily ascertained with reference to the AGP2.0 and PCI-X Specifications. It should be understood that such components are described herein to facilitate the understanding of a system that implements the invention and that differences in the arrangement and structure of such components to support addressing greater than 32 bits is contemplated by the invention.

Figure 4:
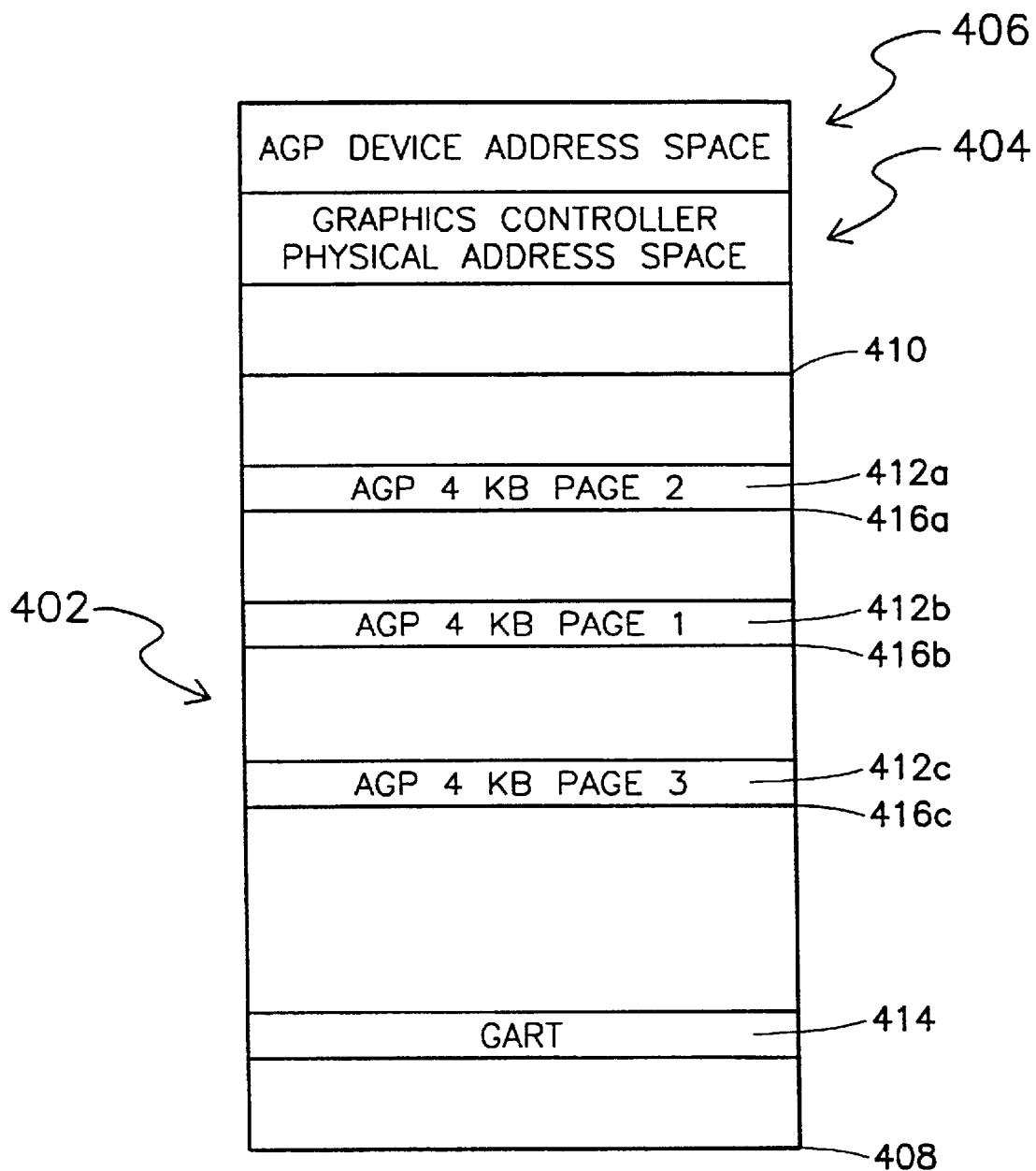
FIGS. 4, 5 and 6 are schematic diagrams of a computer system memory map, a GART table in the computer system memory and a GART table entry, respectively according to the present invention.
Figure 5:
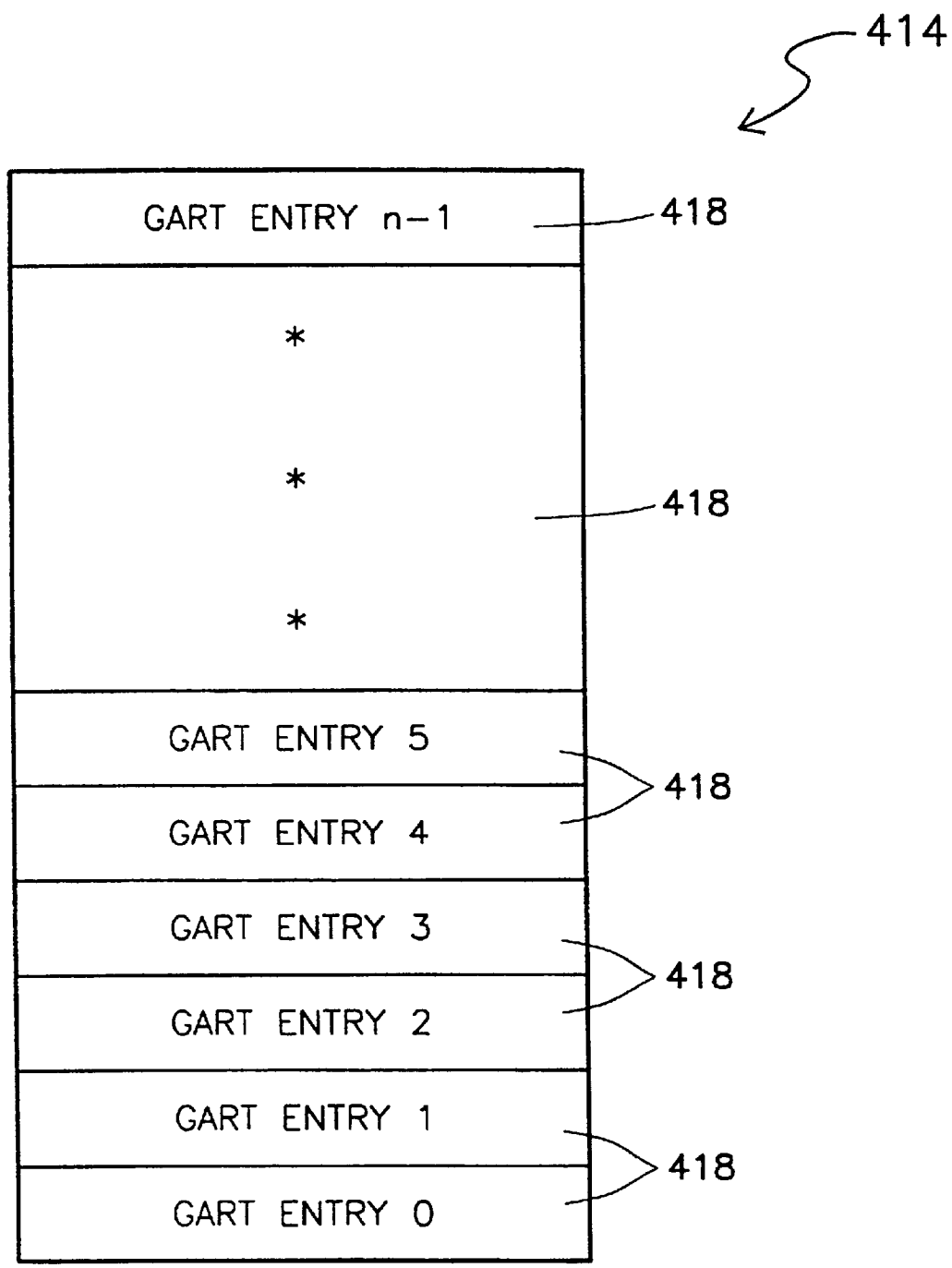
Figure 6:
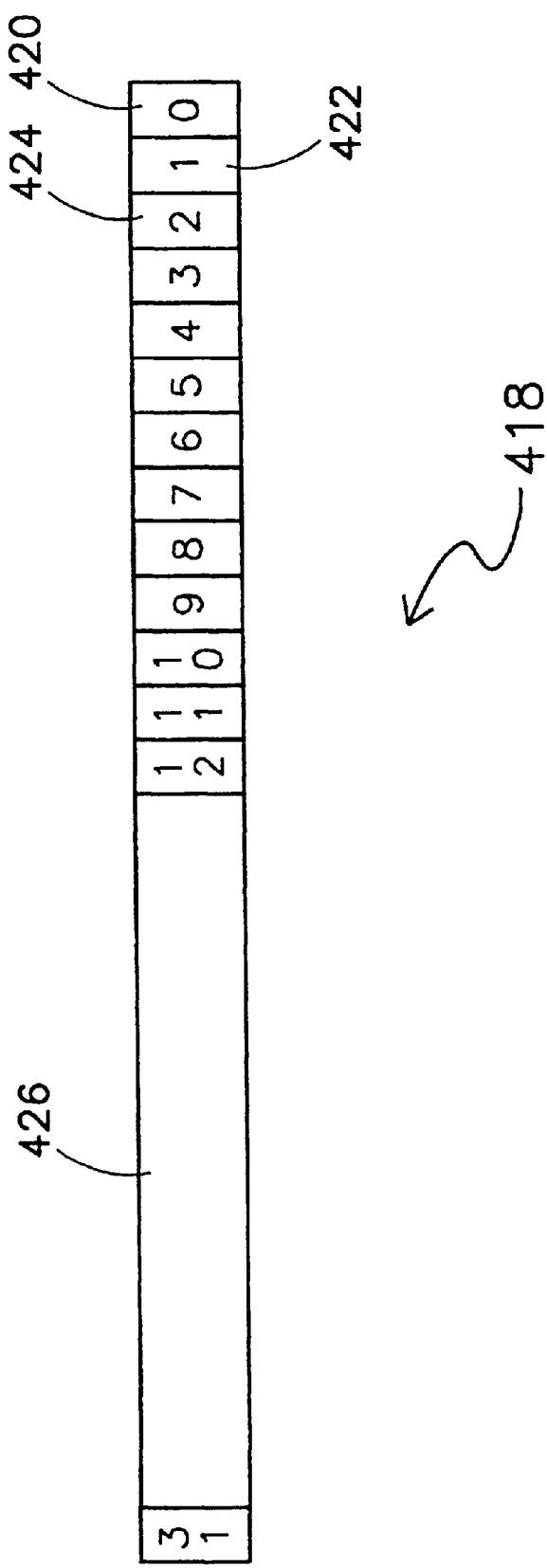

Referring now to FIGS. 4, 5, and 6 (also see FIGS. 13 and 13A), schematic diagrams of a computer system memory map, a GART table in the computer system memory, and a GART table entry are illustrated. A logical memory map of the computer system memory 106 is generally indicated by the numeral 402, the graphics controller physical address space by the numeral 404, and the AGP device address space (virtual memory) by the numeral 406. The computer system 200 may address up to 4 gigabytes ("GB") of memory with a 32 bit address, however, some of this 4 GB of memory address space may be used for local memory associated with various devices such as the AGP video graphics controller's 210 memory which may include the local frame buffer 208, texture cache, alpha buffers, Z-buffers, etc., all being addressed within the graphics controller physical address space 404. In addition, according to the present invention, some of the memory address space 402 is used for the AGP device address space 406. In FIG. 4, the bottom (lowest address) of the computer system memory 106 is represented by the numeral 408 and the top (highest address) is represented by the numeral 410. In between the bottom 408 and the top 410 are various blocks or "pages" of AGP memory represented by the numeral 412. Each page 412 has a contiguous set of memory addresses.

In the present invention, some of these AGP memory pages (indicated by 412a, 412b and 412c) are used to store AGP information, such as textures, lists and the like, and at least one page (indicated by 414) is used to store entries in the GART table 414. The GART table 414 comprises a plurality of entries 418 (FIG. 5). Enough GART table entries 418 are stored to represent all of the associated AGP device address space 406 being used in the computer system 200. Each GART table entry 418 represents the base address 416 of the respective page 412 of the AGP memory. Another memory page may also be used to store a GART directory (not illustrated). The GART directory is used for two-level address remapping as more fully described herein below. Each GART table entry 418 stores 32 binary bits of information (FIG. 6). The GART table 414 is used to remap AGP device address space 406 to addresses of the pages 412, by using the upper bits (31:12) to store a base address 416 for each of the corresponding 4 KB pages 412. The lower 12 bits of the AGP device address 406 is the same as the lower 12 bits of the address of the page 412, as more fully described hereinbelow. See also FIGS. 9 and 12A and the specification relating thereto. Thus the lower 12 bits (11:0), when using a 4 KB size page 412 addressed by each GART table entry 418, are free for other uses besides addressing AGP texture data. For other memory page sizes, different numbers of bits are available in the GART table entry 418 for the other uses and are contemplated herein.

The embodiment of the present invention contemplates using the lower unused bits of each GART table entry 418 to customize its associated referenced page 412. For example, the page 412 in the physical memory 106 may contain 4,096 bytes (4 KB) of data such as textures, command lists and the like. Each GART table entry 418 may comprise four eight bit bytes for a total of 32 bits of binary information. If the twenty most significant bits 426 (31:12) (FIG. 6) in the GART table entry 418 are used for the base address 416 of the corresponding 4 KB page 412, the twelve least significant bits (11:0) are available for use by the systems designer in defining and/or customizing certain features and attributes associated with the memory page 412. These least significant bits are hereinafter referred to as "feature bits" or "feature flags." For example: a present bit 420 may indicate whether a page 414 whose base address 416 is referenced by the GART table entry 418 (bits 31:12) has been reserved by the GART miniport driver. A link bit 422 may indicate whether the next GART table entry 418 is associated with the current GART table entry 418. A dirty bit 424 may indicate whether the page 412 has been modified. Many other combinations of these feature bits may be utilized and are contemplated herein for the present invention. These feature bits (11:0) are typically managed by the GART miniport driver, but may be accessed by any other device driver of the computer system (i.e., ROM BIOS, etc.) because the GART table 414, typically, is located in the computer system memory 106. Thus, any number of features and attributes may be associated with each page 412 and the page's features and attributes are easily and quickly determined by reading the feature bits of the associated GART table entry 418. Just as easily, the page's features and attributes may be changed for each page 412 by writing to the lower bits of the associated GART table entries 418 located in the main computer system memory 106. Thus, any system software may easily and quickly determine the features and attributes of any AGP page 412 stored in the memory 106 by simply reading from and/or writing to the feature bits of the associated GART table entry 418.

AGP1.0 and AGP2.0 Specifications

The Intel AGP1.0 and AGP2.0 Specifications provide signal, protocol, electrical, and mechanical specifications for the AGP bus. However, further design must be implemented before a fully function computer system with AGP capabilities is realized. As noted above, for ease of reference, the following disclosure defines the implementation specific parts of an AGP interface according to the present invention with reference in particular to the AGP1.0 Specification. It is intended that the following disclosure also be extended to an AGP interface which follows the AGP2.0 Specification with appropriate changes as dictated therein. The following disclosure includes the GART table, buffer depths, latencies, registers, and driver functionality and interfaces.

Figure 1A:
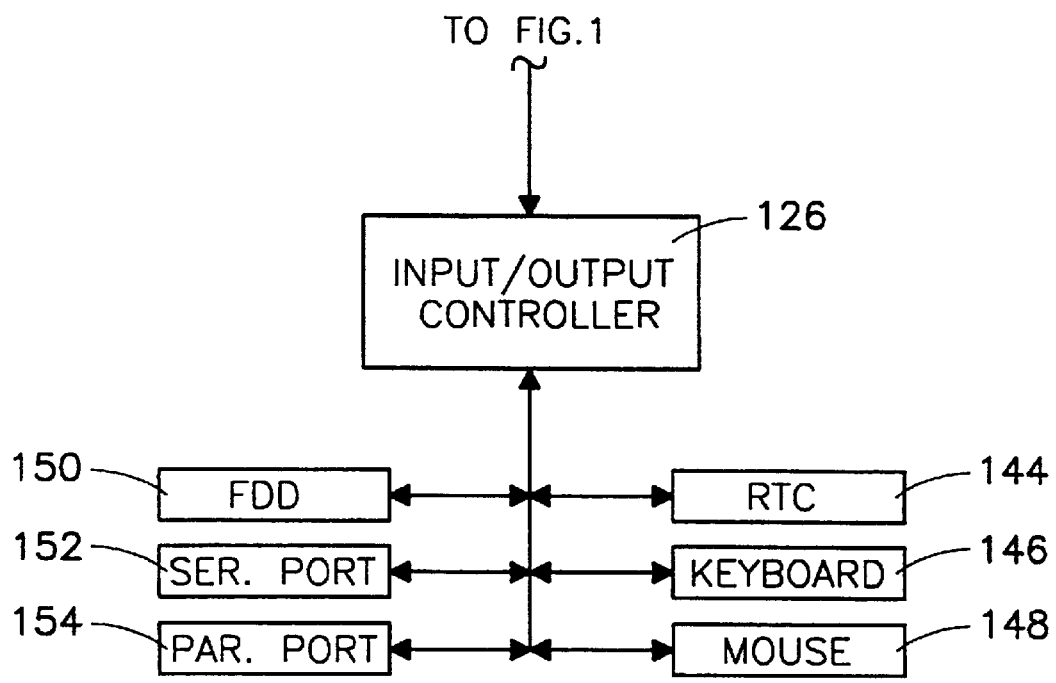

Moving textures and other information required by the graphics controller, such as command lists, out of the local frame buffer into system memory creates a problem: the presently implemented prior art computer system architecture, illustrated in FIGS. 1 and 1A, cannot support the bandwidth requirements of tomorrow's 3-D graphics enhanced applications. The standard PCI bus 109 (33 MHz, 32 bit) bandwidth is 132 MB/s peak and 50 MB/s typical. Microsoft Corporation estimates that future graphics applications will require in excess of 200 MB/s. This means that the PCI bus 109 in the computer system architecture illustrated in FIGS. 1 and 1A will likely starve the graphics controller 110 as well as other PCI devices (122, 124, 114, 116 and 118) also trying to access the PCI bus 109.

AGP Architecture

To remedy this situation, Intel developed the AGP architecture illustrated in FIGS. 2 and 2A and 3. In the Intel AGP architecture, a graphics controller 210 is removed from the existing PCI bus 109 and placed on a higher bandwidth AGP bus 207. This AGP bus 207 has a peak bandwidth of 532 megabytes per second ("MB/s"). The bandwidth bottleneck now exists in the core logic chipset 204 and the memory bus 105, which have to handle requests from the host bus 103, the PCI bus 109, and the AGP bus 207 (FIGS. 2 and 2A), as well as memory 106 refreshing by the memory interface and control 304. However, with the introduction of faster memory 106 and highly integrated, faster chipsets, this problem becomes manageable.

Figure 7:
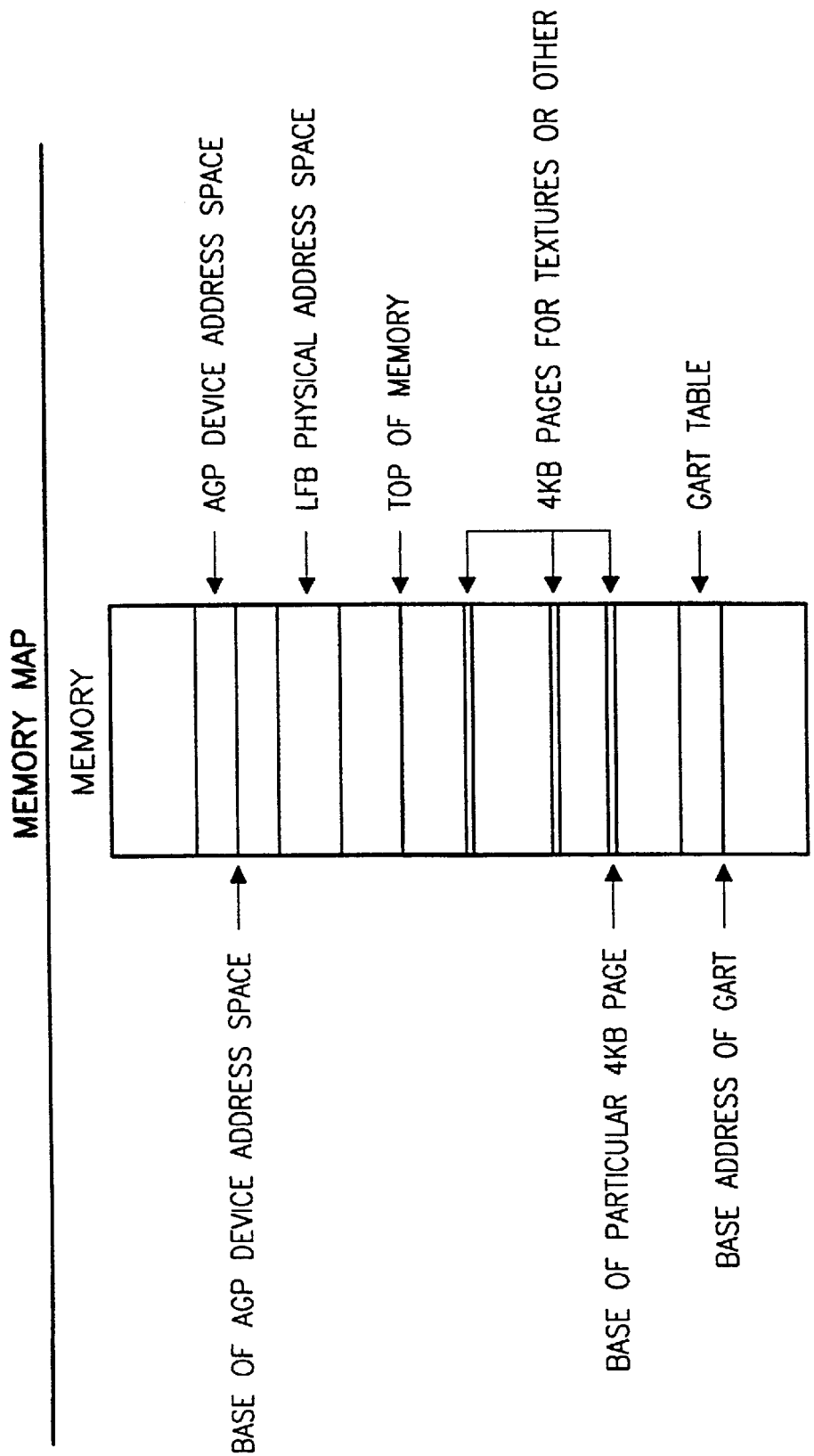
FIG. 7 is a schematic diagram of a memory map of an AGP single-level address translation.
Figure 8:
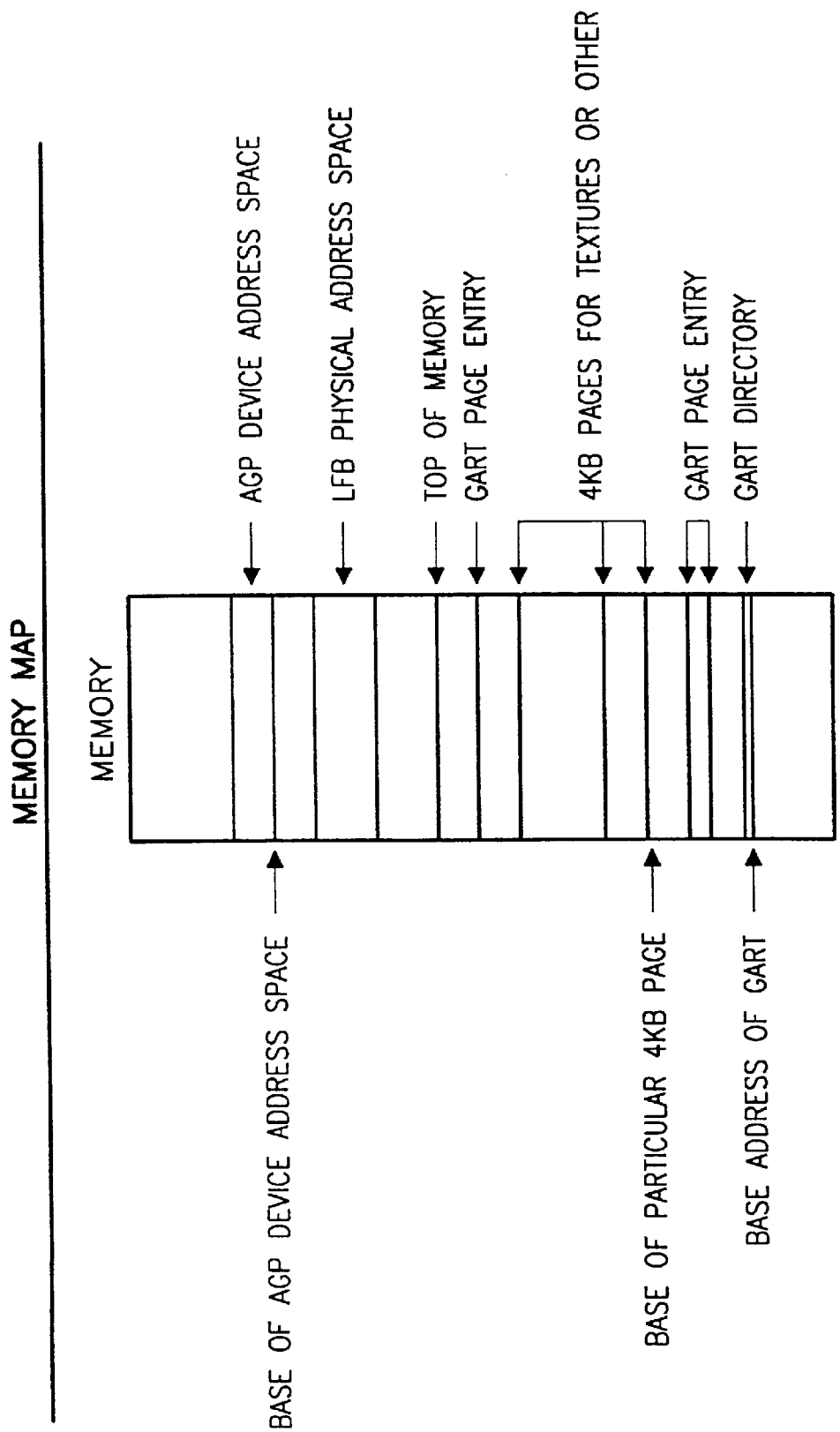
FIG. 8 is a schematic diagram of a memory map of an AGP two-level address translation.

Understanding the necessity for the Graphics Address Remapping Table ("GART table") requires a full understanding of the AGP addressing scheme. Referring now to FIGS. 7 and 8, schematic memory maps of an AGP single-level address translation and an AGP two-level address translation, respectively, are illustrated. In the prior art computer system architecture illustrated in FIGS. 1 and 1A, the graphics controller's physical address space resides above the top 410 of system memory 106. The graphics controller 110 used this physical address space for the local frame buffer 108, texture cache, alpha buffers, Z-buffers, etc. In the AGP system, information still resides in the graphics controller memory (alpha, z-buffer, local frame buffer 108, etc.), but some data which previously resided in the prior art local frame buffer 108 is moved to system memory 106 (primarily textures, but also command lists, etc.). The address space employed by the graphics controller 210 to access these textures becomes virtual, meaning that the physical memory corresponding to this address space doesn't actually exist above the top of memory. In reality, each of these virtual addresses correspond to a physical address in the system memory 106. The graphics controller 210 addresses this virtual address space, referenced hereinabove and hereinafter as "AGP device address space" as one contiguous block of memory 406, but the corresponding physical addresses are allocated in 4 KB, non-contiguous pages 412 throughout the computer system memory 106.

A system, method and apparatus is needed to remap the graphics controller's contiguous, AGP device addresses into their corresponding physical addresses that reside in the system memory 106. This is the function of the GART table. The GART table resides in the physical memory 106 (FIGS. 1 and 1A), and is used by the core logic chipset 204 to remap AGP device addresses that can originate from either the AGP bus 207, host bus 103, or PCI bus(es) 109. The GART table is managed by a GART miniport driver. In the present invention, the GART table implementation supports two options for remapping AGP addresses: single-level address translation and two-level address translation. Further, as will be discussed in the alternative embodiment described below with respect to FIGS. 27–30, the GART table may be configured in any of multiple modes, including a standard mode which supports 32-bit memory addressing and a compatible mode which supports greater that 32-bit memory addressing based on the capability of the AGP device and the amount of available system memory.

Single-Level GART Table Translation

A single-level address translation may improve overall AGP performance by reducing the number of GART table entry lookups required by the chipset. Single-level means that the chipset need only perform one GART table lookup to get the physical address of the desired page (table→page). This is possible because the GART table is allocated by the operating system into one single, contiguous block of uncachable memory. Allocation of this memory is typically performed early in the initialization process to ensure that contiguous memory is available. However, defragmentation of the computer system memory to obtain the necessary contiguous memory space at any time during operation of the computer system is contemplated herein.

Figure 9:
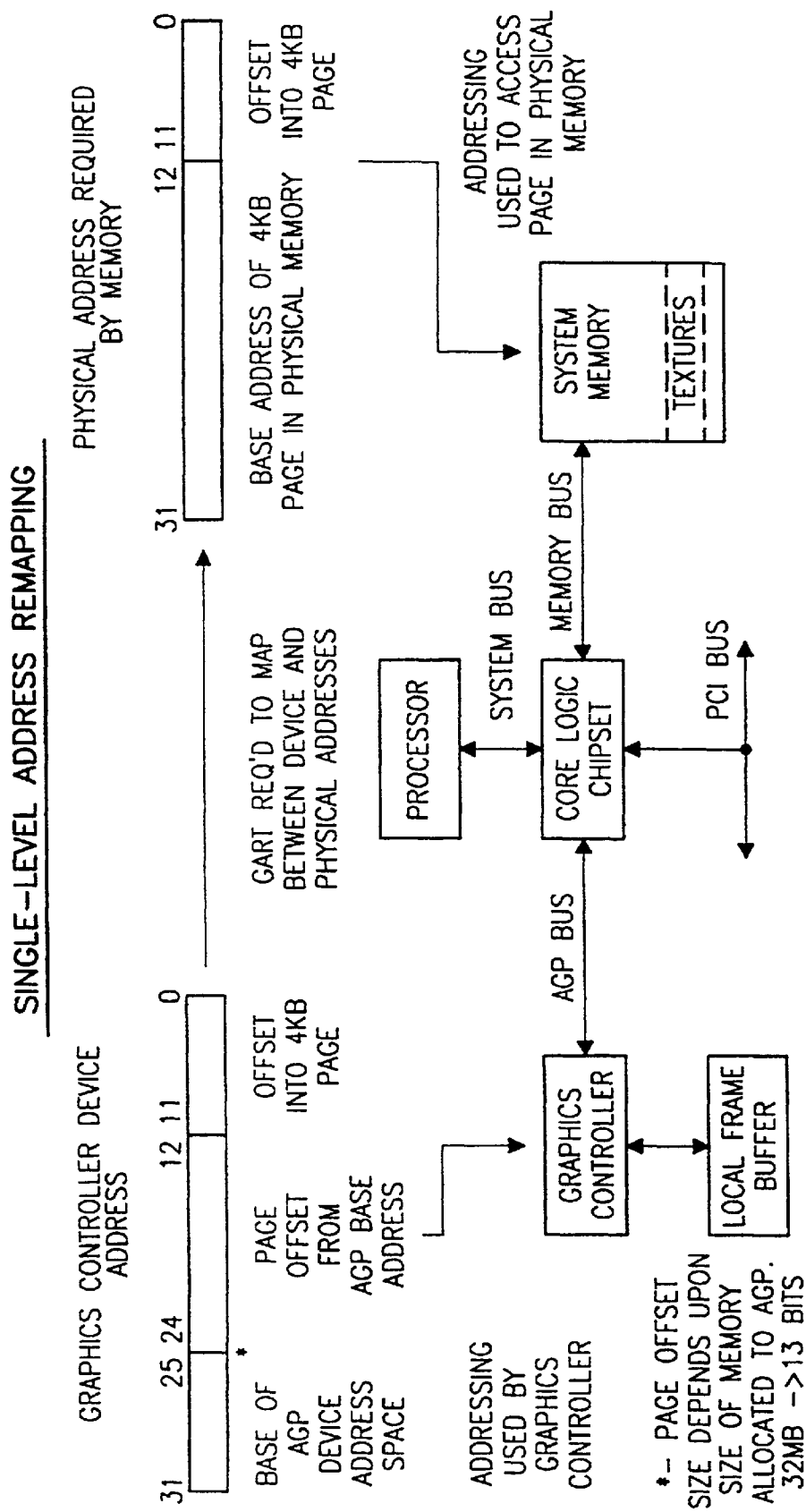
FIG. 9 is a schematic functional block diagram of the AGP single-level address translation according to FIG. 7.

In a computer system using single-level address translation and 32-bit addressing, the AGP device addresses used by the graphics controller can be viewed as consisting of three parts as illustrated in FIG. 9: the base address of device address space (bits 31:x), the page offset into AGP device address space (bits x:12), and the offset into the 4 KB page (bits 11:0). Note that the page offset into AGP device address space can also be used as an entry index into the GART table. Also note that the number of bits comprising the page offset into AGP device address space depends upon the size of virtual (and physical) memory allocated to AGP. For instance, it takes 13 bits to represent all of the pages in a system with 32 MB of AGP memory. The table of FIG. 10 illustrates the number of bits required to represent each 4 KB page in AGP memory versus the size of the AGP memory.

System memory requires an address with the format illustrated in FIG. 9. This address consists of the base address of the 4 KB page (bits 31:12) and the offset into the 4 KB page (bits 11:0). The base address of each 4 KB page is information required by the GART table to remap corresponding device addresses. The offset into the 4 KB page is the same offset that exists in the AGP device address.

Figure 11:
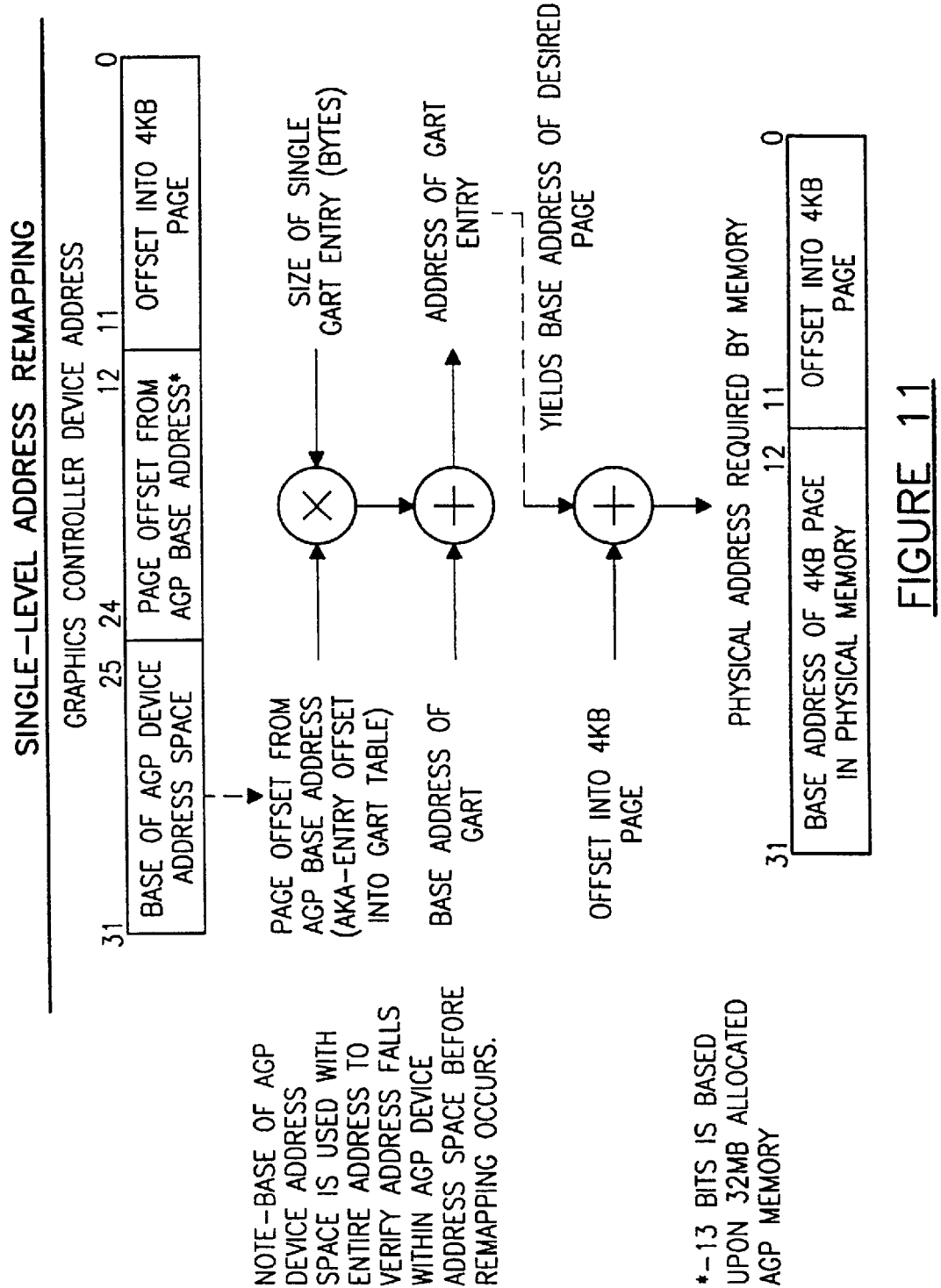
FIG. 11 is a schematic flow diagram of single-level address remapping.

Referring now to FIG. 11, a schematic flow diagram for converting device addresses into physical addresses in a single-level address translation is illustrated. The base address of AGP device address space, along with the size of AGP memory can optionally be used by the chipset to determine if the address in the request falls within AGP device address space before remapping occurs. To remap the address, the page offset from the AGP base address is multiplied by the size of a single GART table entry (4) and added to the base address of the GART table. This provides the physical address of the required GART table entry. This entry is retrieved from the GART table, which resides in system memory. Within this GART table entry is the base address of the desired 4 KB page; a page which resides somewhere in system memory. Adding the offset into the 4 KB page to this base address yields the required physical address. Note that the offset into the 4 KB page in virtual AGP memory (bits 11:0) is equivalent to the offset into the 4 KB page in physical (system) memory.

Two-Level GART Table Translation

Two-level address translation requires two GART table lookups to remap an AGP device address to a physical address in memory (directory→page→table). The first lookup reads the GART directory entry from system memory. The GART directory entry contains the physical address of a corresponding page of GART table entries, also residing in physical memory. A second lookup is required to retrieve the appropriate GART table entry which then points to the base address of the desired 4 KB page of AGP data in the computer system physical memory.

In some designs, two-level address translation may be preferred over the single-level address translation because it is not necessary for the GART directory and 4 KB pages comprising the GART table to be contiguous. The operating system may be more likely to successfully allocate physical memory for the GART table using two-level address translation since a large block of contiguous memory is not needed. Dynamic allocation of the GART table using either single-level or two-level address translation is contemplated in the present invention.

Figure 12A:
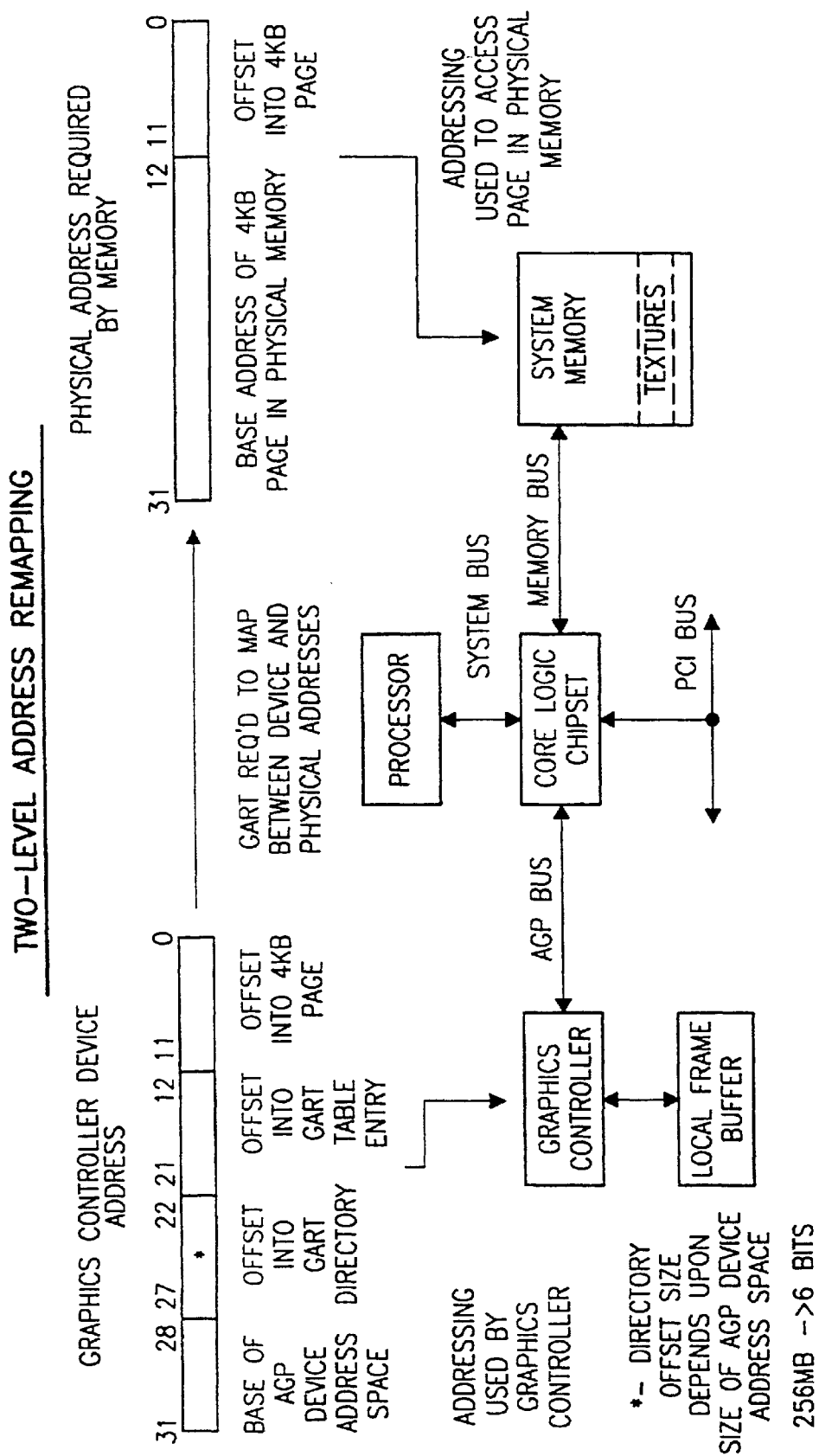
FIG. 12A is a schematic functional block diagram of the AGP two-level address translation according to FIG. 8.

In a system using two-level address translation and 32-bit addressing, the device addresses used by the graphics controller can be viewed as consisting of four parts as illustrated in FIG. 12A: the base address of AGP device address space (bits 31:x), the directory offset into AGP device address space (bits x:22), the page offset into a table entry (bits 21:12), and the offset into the 4 KB page (bits 11:0). Note that the number of bits comprising the directory offset into AGP device address space depends upon the size of AGP device address space. For instance, it takes 6 bits to represent all of the GART directory entries (64) in a system with 256 MB of AGP memory. Since each GART directory entry corresponds to 4 MB of address space (i.e. 1024 pages), each page offset can be addressed using 10 bits. The table of FIG. 12B illustrates the number of bits required to represent the GART directory and page in AGP memory versus the size of AGP memory.

Figure 12C:
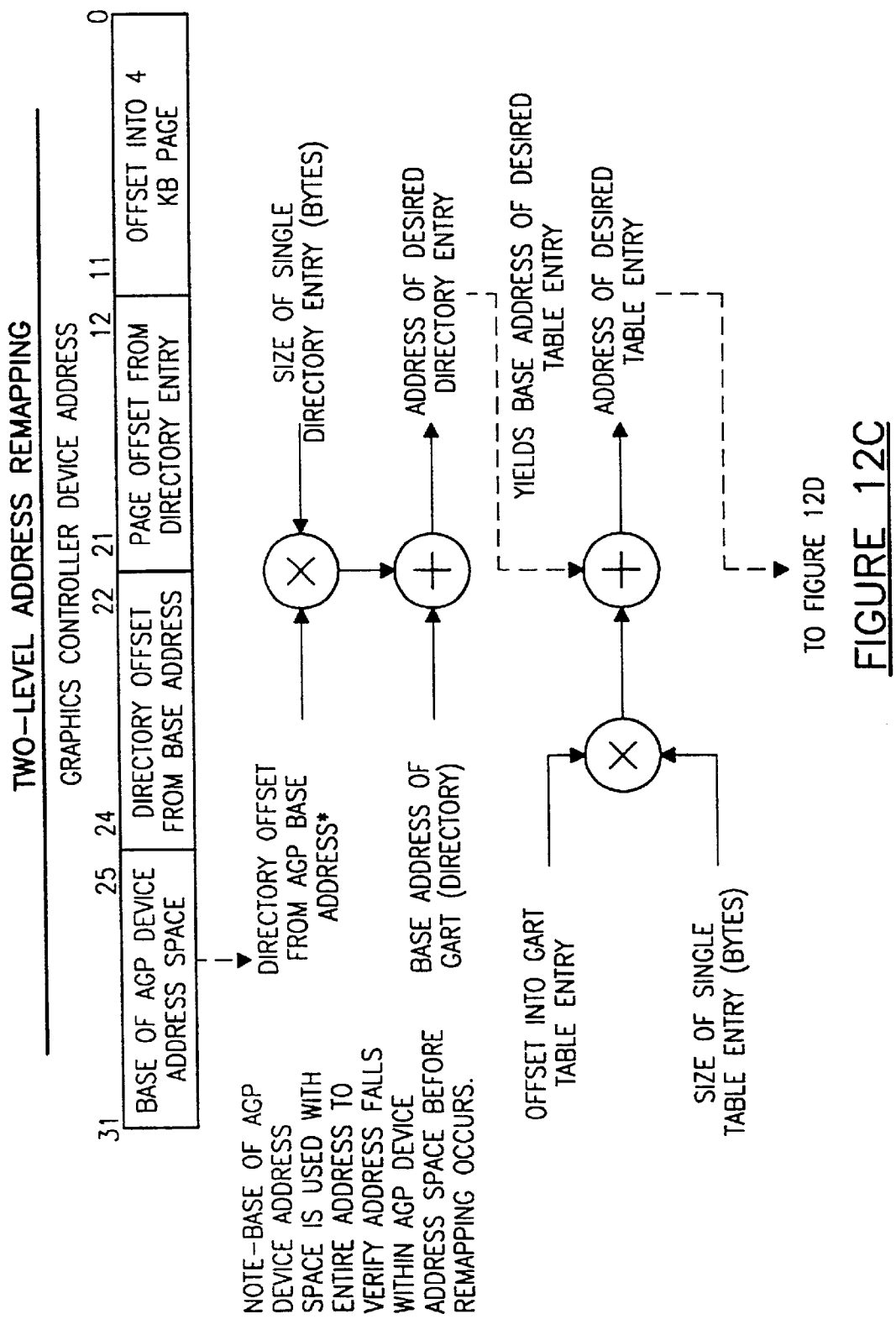
FIGS. 12C and 12D are a schematic flow diagram of two-level address remapping.
Figure 12D:
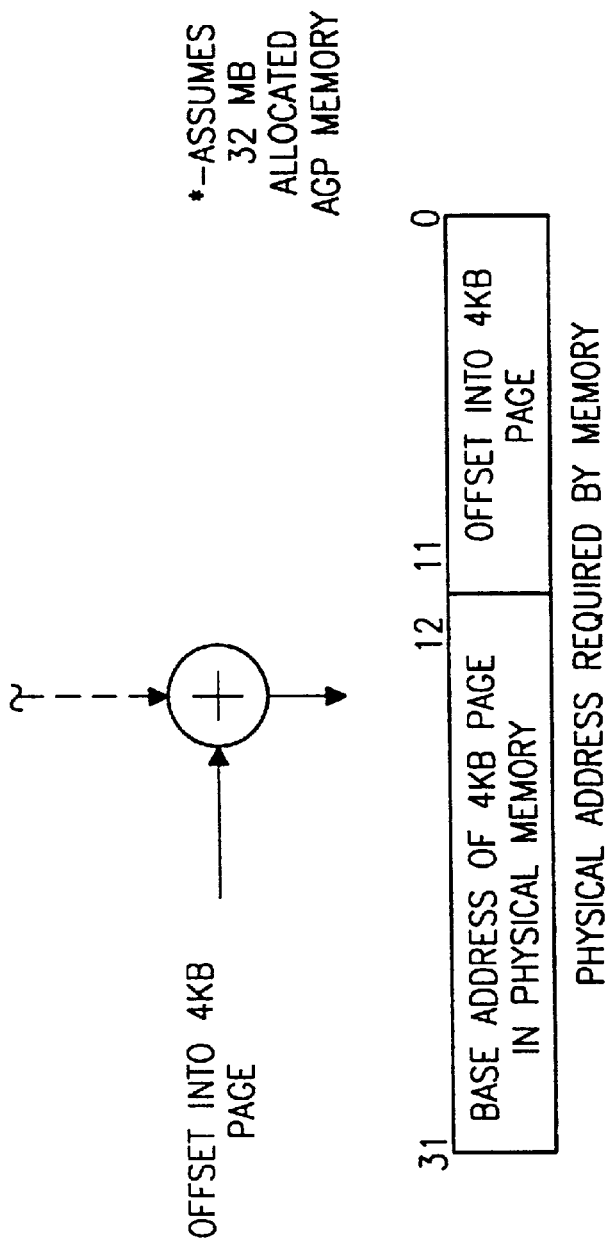

Referring now to FIGS. 12C and 12D, a schematic flow diagram for converting device addresses into physical addresses in a two-level address translation is illustrated. The base address of AGP device address space (bits 31:x), along with the size of AGP memory can optionally be used by the chipset 204 to determine if the address in the request falls within AGP device address space before remapping occurs. To remap the address, the directory offset (bits x:22) is multiplied by the size of a single GART directory entry (4 bytes) and added to the base address of the GART directory (a.k.a.—base address of 4 KB page containing the directory). This provides the physical address of the required GART directory entry. The GART directory entry is retrieved from physical memory, and within this GART directory entry is the physical address to the base of the 4 KB page holding the GART table entry corresponding to the request. To get the GART table entry, the page offset (bits 21:12) is multiplied by the size of a single GART table entry (4 bytes) and added to the base address of the retrieved page of the GART table. This GART table entry is then fetched from memory, and within this GART table entry is the base address of the desired 4 KB page of AGP graphics data, The AGP graphics data page resides in system memory. Adding the offset into the AGP data 4 KB page (bits 11:0) base address yields the required physical address. Note that the offset into the 4 KB page in AGP device address space (bits 11:0) is equivalent to the offset into the AGP data 4 KB page in physical (system) memory.

In a two-level address translation, both a GART table and a GART directory are required. In a single-level address translation, only the GART table is necessary. The format for the GART table and use thereof are identical for both the single and the two-level address translations.

GART Table

Figure 13:
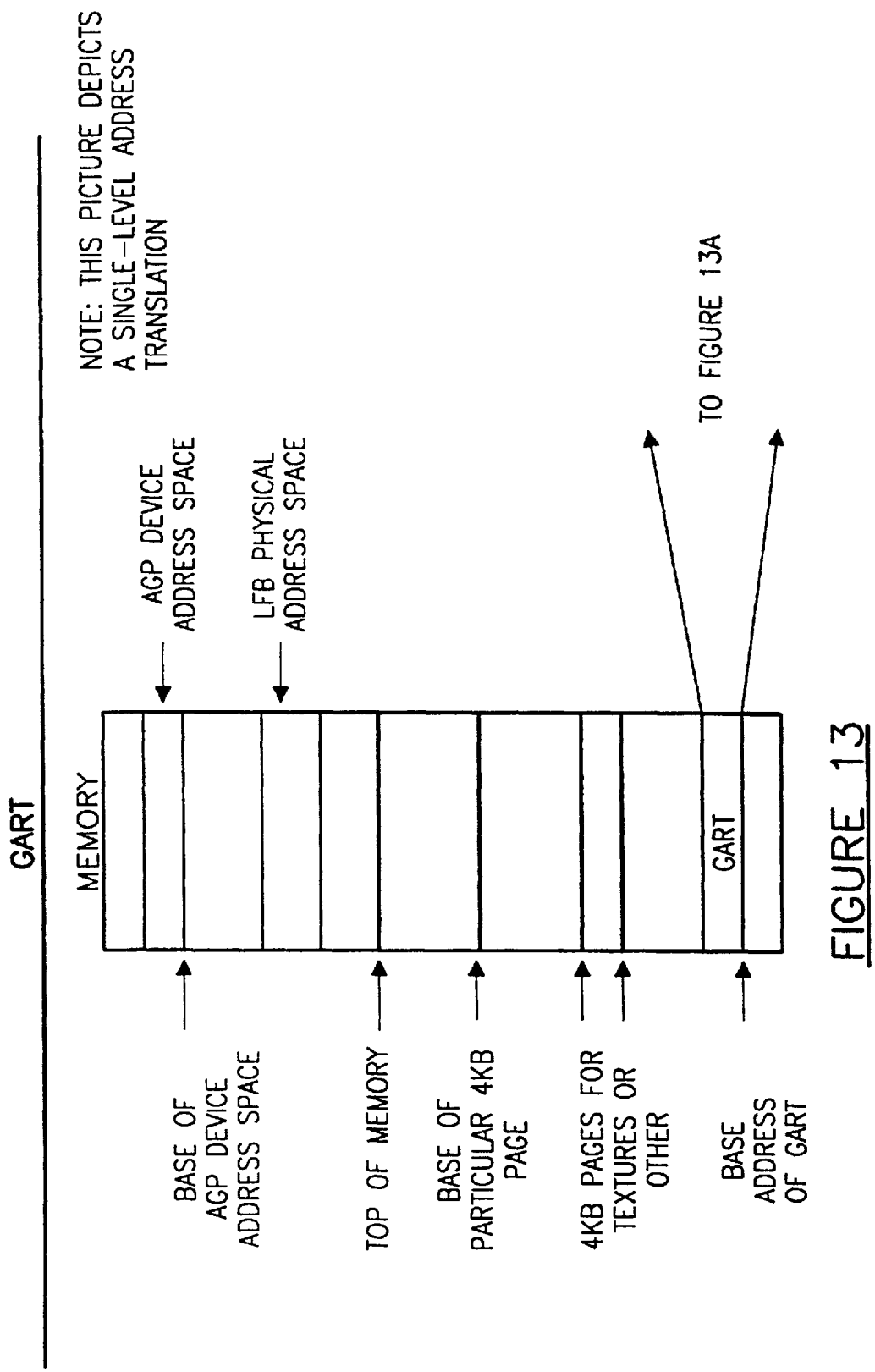
FIGS. 13 and 13A are a schematic diagram of a memory map of the GART table, according to the present invention.
Figure 13A:
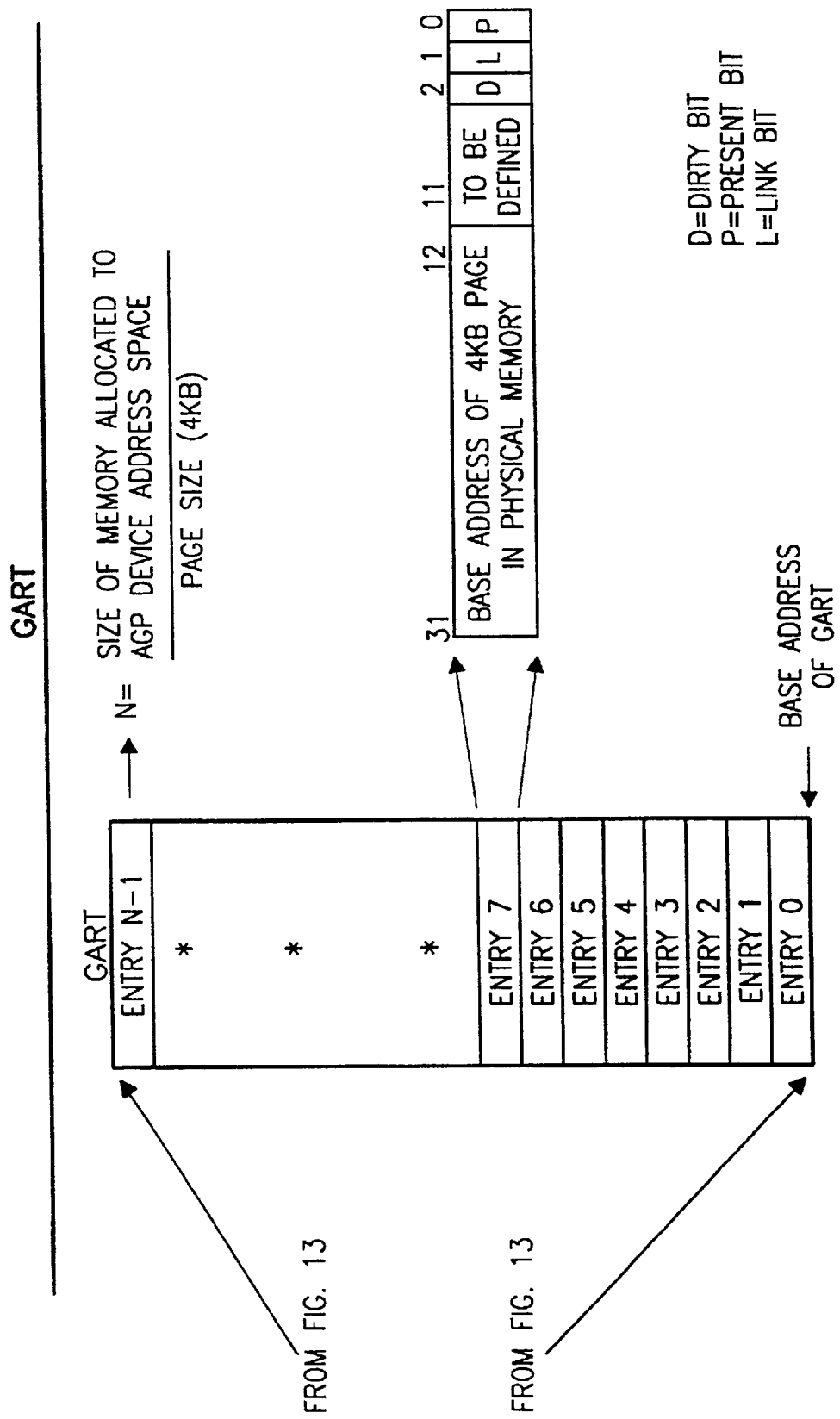

Referring now to FIGS. 13 and 13A, a schematic memory map of a GART table using 32-bit addressing is illustrated. Each entry in the GART table is four bytes long and may comprise the following information: page base address (bits 31:12), dirty bit (bit 2), link bit (bit 1), and valid bit (bit 0). The page base address (bits 31:12) specifies the physical address of the first byte of the corresponding 4 KB page in physical memory. The bits in this field (bits 31:12) are interpreted as the twenty most significant bits of the physical address and align the associated page on a 4 KB boundary. The page base address is initialized and managed by the GART miniport driver.

Bits 11:0 may be used as flag bits to customize and characterize each associated page. The present invention allows future enhancements to the AGP Specification by utilizing these flag bits. For example, a cacheability flag bit may indicate whether the 4 KB page is cacheable, and a write combinable bit may indicate whether the 4 KB page is write combinable. More specific examples of the present invention are as follows:

Bit 2 may be used as a dirty bit. The dirty bit may indicate when the page referenced by this GART table entry has been modified.

Bit 1 may be used as a link bit. The link bit may be set and managed by the GART miniport driver. It indicates that the next GART table entry is associated with the current GART table entry. The link bit can be used by the chipset when prefetching GART table entries as part of a GART table lookup. If the link bit is set in the first GART table entry, the chipset may cache the second entry. If the link bit in the second entry is set, then the third entry may get cached. This may continue until the link bit is not set in one of the entries and can be utilized when doing a normal cache read so that no more than the necessary number of GART table entries are cached, i.e., a full cache line read is not needed. The link bit is also useful when textures overlap into contiguous 4 KB pages within AGP device address space.

Bit 0 may be used as a present flag. This present flag indicates whether the AGP data page being pointed to by the GART table entry has been reserved by the GART miniport driver. When the present flag is set, the AGP data page has been reserved in physical memory and address translation may be carried out. When the present flag is clear, the AGP data page has not been reserved in memory and the chipset must determine whether to perform the translation or generate an error (SERR#). The present flag does not necessarily indicate whether the entry actually maps to an AGP data page, but that the GART table entry has been reserved for an application by the GART miniport driver.

GART Directory

Figure 14:
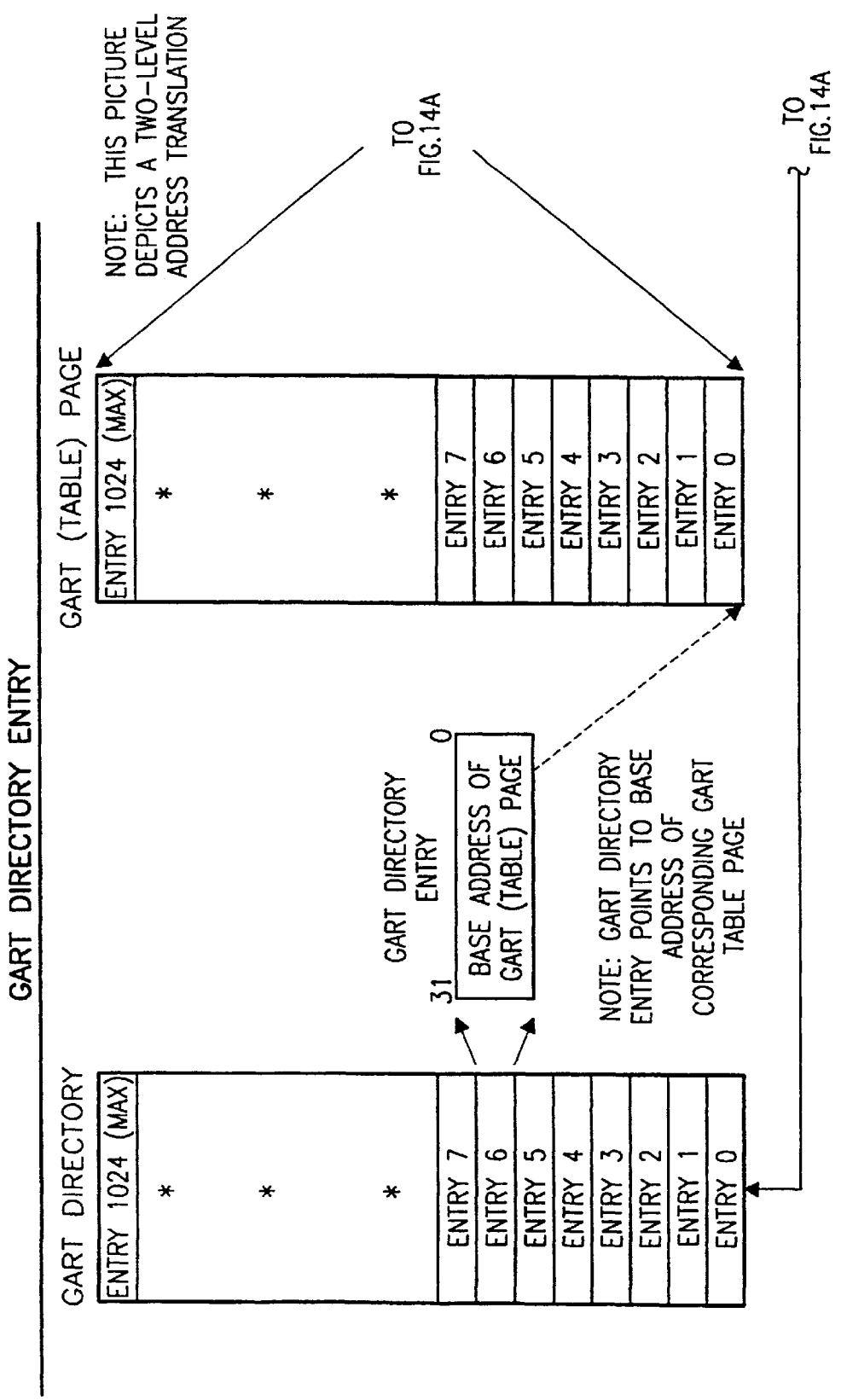
FIGS. 14 and 14A are a schematic diagram of a memory map of entries in a GART directory, a page of GART table entries and an AGP memory, according to the present invention.
Figure 14A:
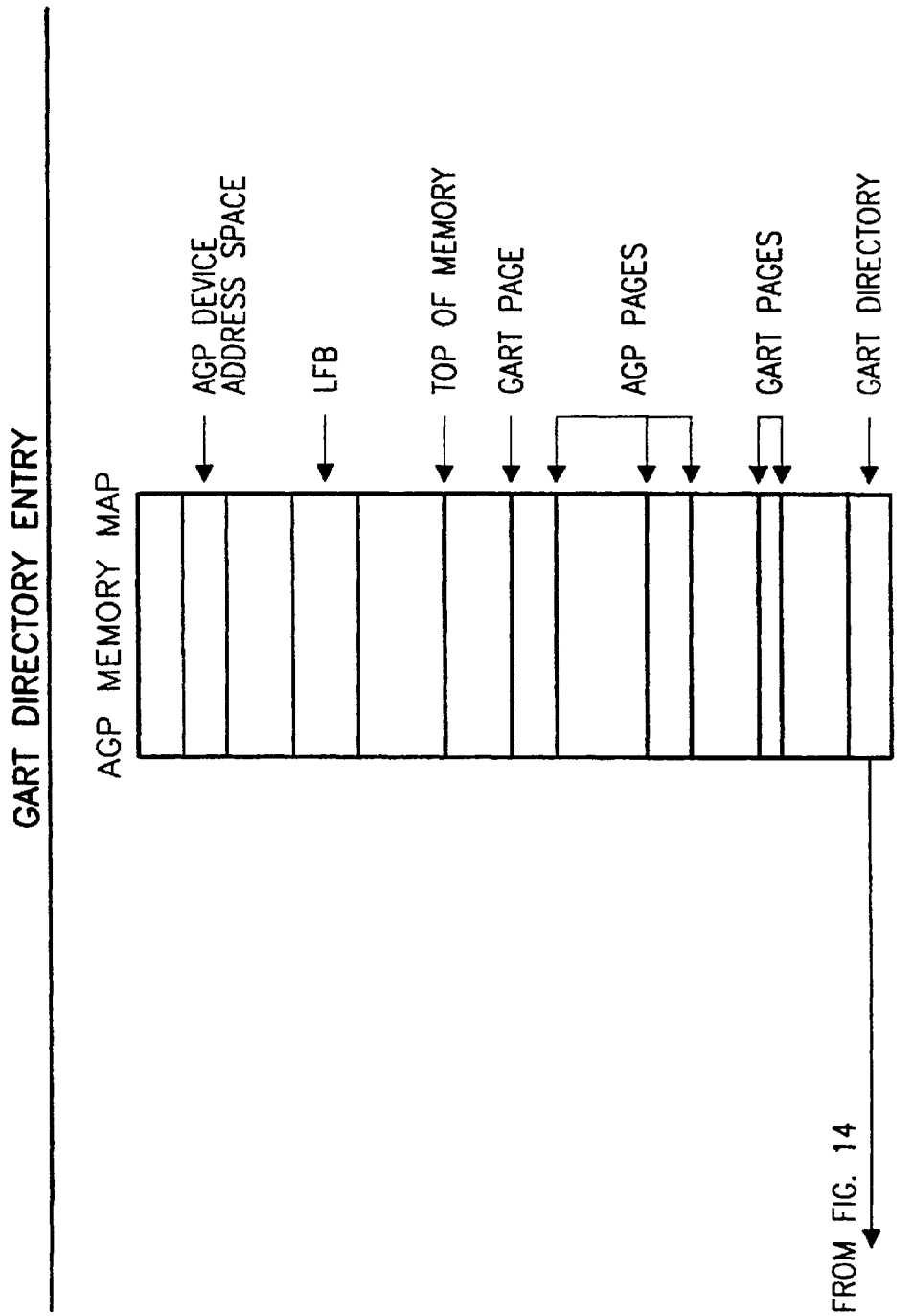

Referring now to FIGS. 14 and 14A, a schematic memory map of entries in a GART directory, a page of GART table entries, and the AGP memory is illustrated. The GART directory may be contained a single 4 KB page residing in uncacheable physical memory. Since each GART directory entry may be 4 bytes long, 1024 GART directory entries can exist within a single 4 KB page in the computer system memory. Thus, up to 4 GB of physical memory may be addressed with a single 4 KB page size for the GART directory. To support up to 2 GB of AGP device address space only 512 GART directory entries are required. Bits 31:0 contain the base address (offset=0) of the GART directory entry's corresponding page of the GART table, which may also reside in physical memory.

GART table size is a function of the amount of AGP memory required by the system. In a system using a single-level address translation, size is computed using the following equation:

$$\text{GART Size (Bytes)} = \frac{\text{AGP Memory Required (Bytes)}}{\text{Page Size (4096 Bytes)}} * \text{GART Entry Size (4 Bytes)}$$

Where:

AGP Memory Required=The amount of system memory dedicated to AGP

Page Size=Standard page size in system memory

GART Entry Size=The size of a single entry in the GART table

Note that this equation computes maximum GART table size based upon the amount of AGP device address space reserved. The amount of actual GART table memory reserved may depend upon the operating system.

In a two-level address translation, an additional 4 KB page (4096 bytes) is required for the GART directory. In a system using the two-level address translation, size is computed using the following equation:

$$\text{GART Size (Bytes)} = \frac{\text{AGP Memory Required}}{\text{Page Size}} * \text{GART Entry Size} + \text{Page Size}$$

Referring to FIG. 15, a table showing the correlation between allocated AGP memory and the maximum size of the GART table is illustrated. For clarity only, implementations of GART tables based upon AGP memory requirements of 32 MB, 64 MB, 128 MB, 256 MB, 512 MB, 1 GB, and 2 GB are illustrated, however, any AGP memory size may be accommodated and is contemplated to be within the scope of the present invention. Note that the two-level translation requires one additional 4 KB page for its directory.

AGP Logical Architecture

Figure 16:
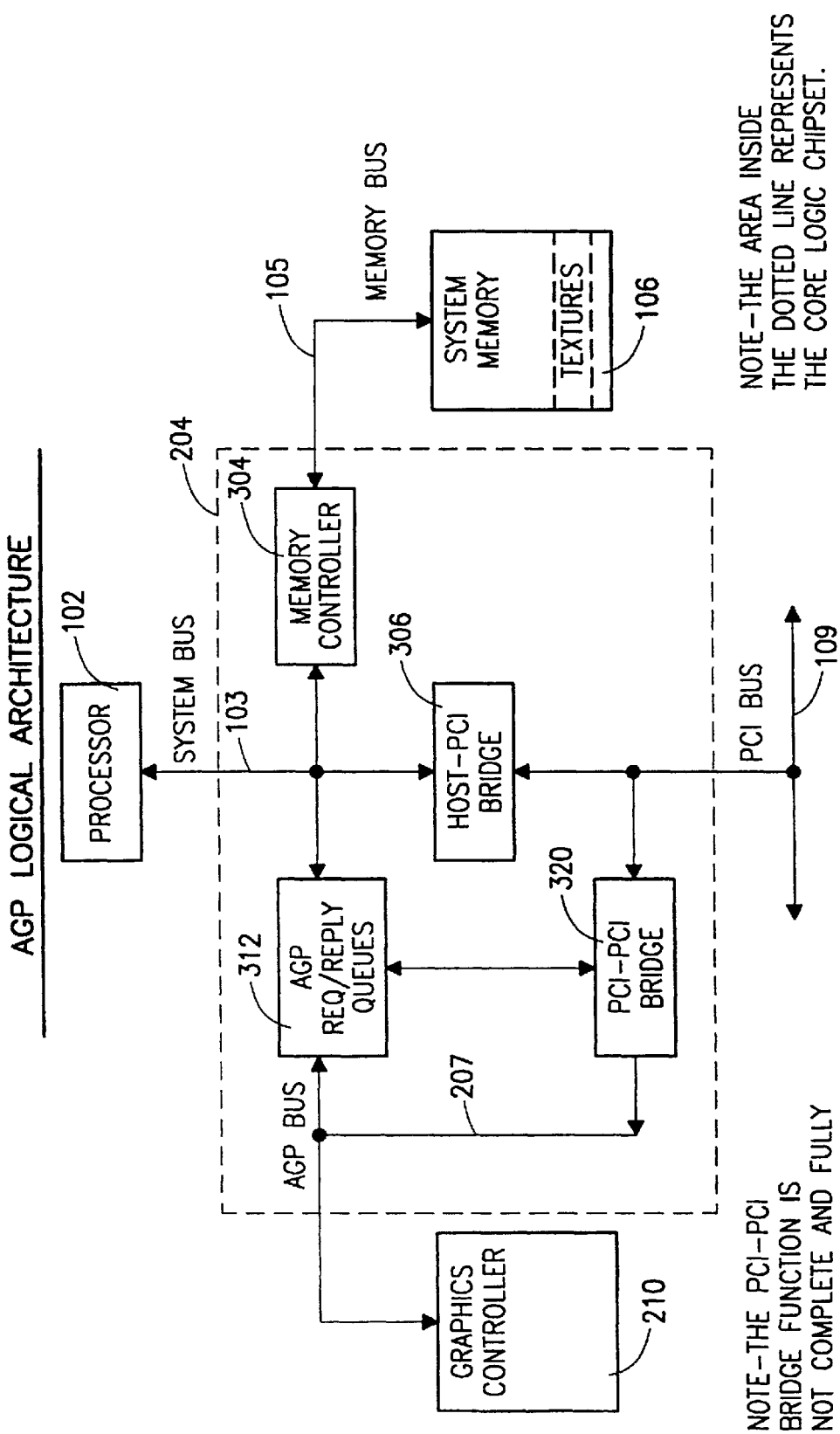
FIG. 16 is a schematic functional block diagram of the AGP logical architecture.

Referring now to FIG. 16, a functional block diagram of the AGP chipset 204 according to the present invention is illustrated. The AGP chipset 204 performs two main functions: Host-to-PCI Bridge functions (function 0) and PCI-to-PCI bridge functions (function 1). The Host-to-PCI bridge is the standard interface generally found in a PCI-based core logic. The PCI-to-PCI bridge is used to facilitate the configuration of the AGP port without changing existing bus enumeration code. Each of these functions has its own configuration registers, which reside in its own PCI configuration header type as required by the PCI 2.1 Specification. These configuration registers are listed in FIGS. 17A and 18Aa, respectively, and more detailed register bit information for the AGP specific registers are listed in FIGS. 17Ba, 17C and 18B–18M. Note that the AGP chipset implements the New Capabilities mechanism as more fully described in the Engineering Change Notice ("ECN") entitled "Addition of 'New Capabilities' Structure," dated May 20, 1996, and is herein incorporated by reference. The New Capabilities structure is implemented as a linked list of registers containing information for each function supported by the device. The AGP registers are included in the linked list.

The PCI-PCI bridge 320 function need not be a fully functional PCI-PCI bridge. It need only allow memory write transactions that originate on the PCI bus 109 to be forwarded to the AGP bus 207. It does not have to do AGP to PCI memory write transactions. Nor does it have to do other PCI commands such as, for example, I/O (read and write), configuration (read and write), and memory read (memory read, memory read line, memory read multiple), special cycles and interrupt acknowledge to cross the interface. These limitations only apply to the PCI-AGP and AGP-PCI interface. All Host to AGP and Host to PCI commands are supported by the present invention.

AGP compliant masters have certain memory requirements that must be placed in the system memory map using the Memory Base, Memory Limit, Prefetchable Memory Base, and Prefetchable Memory Limit registers found at offsets 20h, 22h, 24h, and 26h respectively. Host-to-PCI (Function 0) and PCI-to-PCI (function 1) device ID's also may be different to accommodate Microsoft's policy regarding device drivers for multifunction devices. The following set of registers, described below, preferably are registers that may be required to implement an AGP1.0 compliant core logic chipset according to the present invention.

Host-to-PCI Bridge

Referring to FIG. 17A, a schematic table of registers for the host to PCI bridge 306 function, according to an embodiment of the present invention, is illustrated. A Base Address Register 0 (BAR0) 1702 is used by system BIOS memory mapping software to allocate AGP device address space for the AGP compliant master. FIGS. 17B and 17Ba illustrates the functional description of the bits used in this register. System BIOS determines the size and type of address space required for AGP implementation by writing all ones to BAR0 1702 and then reading from the register. By scanning the returned value from the least-significant bit of BAR0 1702 upwards, BIOS can determine the size of the required address space. The binary-weighted value of the first one bit found indicates the required amount of space. Once the memory has been allocated by BIOS, the base address of the AGP device address space is placed in bits 31:4 of this register. This register also contains information hard-wired to indicate that this is prefetchable memory range that can be located anywhere in 32-bit address space. Any other means for determining the required AGP device address space may also be used and is contemplated herein.

Accesses to a PCI device's configuration space are relatively slow. In the Intel x86 based computer systems, one PCI register access requires two I/O cycles: one to the PCI address register (address CF8h) and the other to the PCI data register (address CFCh). Processor related I/O cycles are also slower than memory cycles. Therefore, in the present invention, a Base Address Register 1 (BAR1) 1704 may be used by the GART miniport driver to access memory-mapped AGP control registers. FIG. 17C illustrates the functional description of the bits used in this register. System BIOS determines the size and type of address space required by the AGP memory-mapped control registers by writing all ones to BAR1 1704 and then reading from the register. By scanning the returned value from the least-significant bit of BAR1 1704 upwards, BIOS can determine the size of the required memory address space. The binary-weighted value of the first one bit found indicates the required amount of space. Once the memory has been allocated by BIOS, the base address of the AGP memory address space is placed in bits 31:4 of this register. This register also contains information hard-wired to indicate that this is non-prefetchable memory range that can be located anywhere in 32-bit address space. Any other means for determining the required memory address space may also be used and is contemplated herein.

PCI-to-PCI Bridge

Referring to FIGS. 18A and 18Aa, a schematic table of registers for the PCI-to-PCI bridge 320 (function 1), according to an embodiment of the present invention, is illustrated. A Command Register 1806 provides coarse control over the PCI-to-PCI bridge 320 function within the core logic chipset 204. This register controls the ability to generate and respond to PCI cycles on both the AGP bus 207 and PCI bus 109. FIG. 18B illustrates the functional description of the bits used in the Command Register 1806.

A Status Register 1808 provides course status of the PCI-to-PCI bridge 320 function within the core logic chipset 204. FIG. 18C illustrates the functional description of the bits used in the status register 1808. The Status Register 1808 is included in this specification to emphasis that the Capabilities Pointer Supported bit (bit 4) should be set to 1 in a host bridge compliant with implementation of the present invention. When a status bit is set, the bit is cleared using standard procedures as specified by the PCI Specification (i.e.—write a "1 " to the bit).

A Secondary Status Register 1810 is similar in function and bit definition to the status register 1808 (Offset 06h) however its bits reflect status conditions of the secondary side of the PCI-to-PCI bridge 320 interface connected to the AGP bus 207. FIG. 18D illustrates the functional description of the bits used in the Secondary Status Register 1810. Aside from the redefinition of bit 14 as defined in the PCI-to-PCI bridge specification, the 66 Mhz capable bit (bit 5) has been redefined for AGP. When a status bit is set, the bit is cleared using standard procedures as specified by the PCI Specification (i.e.—write a "1" to the bit).

A Memory Base Register 1812 is used by the computer system BIOS memory mapping software to store the base address of the non-prefetchable address range used by the AGP master (graphics controller). FIG. 18E illustrates the functional description of the bits used in the Memory Base Register 1812. System BIOS bus enumeration software allocates a block of physical memory above the top of memory (TOM) based upon the requirements found in the AGP master's base address register (BAR). The BIOS places the base address of the block of memory in this register. It also places the address of the top of the address range in a Memory Limit Register 1814. Given this information, the core logic chipset 204 can use these two addresses to decode cycles to the AGP master's non-prefetchable memory space. This non-prefetchable memory is where the master's control registers and FIFO-like communication interfaces are mapped. The memory address range may reside on 1 MB boundaries.

The Memory Limit Register 1814 is used by the computer system BIOS memory mapping software to store the top address of the non-prefetchable address range used by the AGP master (graphics controller). FIG. 18F illustrates the functional description of the bits used in the Memory Limit Register 1814. System BIOS bus enumeration software allocates a block of physical memory above the top of memory (TOM) based upon the requirements found in the master's base address register (BAR). BIOS places the top address of the block of memory in this register. It also places the address of the base of the address range in the Memory Base Register 1812.

A Prefetchable Memory Base Register 1816 is used by the computer system BIOS memory mapping software to store the base address of the prefetchable address range used by the AGP master (graphics controller). FIG. 18G illustrates the functional description of the bits used in the Prefetchable Memory Base Register 1816. System BIOS bus enumeration software may allocate a block of memory addresses above the top of memory (TOM) based upon the requirements found in a master's base address register (BAR), or may use a look-up table to determined the block of memory addresses based upon the type of AGP device indicated in its configuration registers (see FIG. 22A). BIOS places the base address of the block of memory in the Prefetchable Memory Base Register 1816. It also places the address of the top of the address range in a Prefetchable Memory Limit Register 1818. Given this information, the core logic chipset 204 can use these two addresses to decode cycles to the AGP master's prefetchable memory space. This prefetchable memory is where the graphics controller's Local Frame Buffer 208 is mapped. The memory address range may reside on 1 MB boundaries.

The Prefetchable Memory Limit Register 1818 is used by the computer system BIOS memory mapping software to store the top address of the prefetchable address range used by the AGP master (graphics controller). FIG. 18H illustrates the functional description of the bits used in the Prefetchable Memory Limit Register 1818. System BIOS bus enumeration software allocates a block of memory addresses above the top of memory (TOM) based upon the requirements found in the AGP master's base address register (BAR), or may use a look-up table to determined the block of memory addresses based upon the type of AGP device indicated in its configuration registers (see FIG. 22A). BIOS places the top address of the block of memory in this register. It also places the address of the base of the address range in the Prefetchable Memory Base Register 1816. Given this information, the core logic chipset 204 can use these two addresses to decode cycles to the AGP master's prefetchable memory space. This prefetchable memory is where the graphics controller's Local Frame Buffer is mapped. The memory address range may reside on 1 MB boundaries.

A Capabilities Pointer Register 1820 provides an offset pointer to the first function supported by this device, in accordance with the New Capabilities mechanism as described by PCI 2.1 Specification (reference: ECN defining "New Capabilities"). FIG. 18I illustrates the functional description of the bits used in the Capabilities Pointer Register 1820. AGP is a function supported by the New Capabilities ECN specification.

An AGP Capability Identifier Register 1822 identifies this function in the capabilities list to be the AGP function. FIG. 18J illustrates the functional description of the bits used in the AGP Capabilities Capability Register 1822. It also provides a pointer to the next function in the capabilities list and cites the AGP Specification revision number conformed to by the AGP device.

An AGP Status Register 1824 provides status of AGP functionality for the AGP device. FIG. 18K illustrates the functional description of the bits used in the AGP Status Register 1824. Information reported includes maximum request queue depth, sideband addressing capabilities, and transfer rates. The AGP Status Register 1824 is a read only register. Writes have no affect and reserved or unimplemented fields return zero when read.

An AGP Command Register 1826 allows software to enable sideband addressing, enable AGP, and set the AGP transfer rate. FIG. 18L illustrates the functional description of the bits used in the AGP Command Register 1826.

An AGP Device Address Space Size Register 1828 determines the size of AGP Device Address Space to be allocated by system BIOS. FIGS. 18M and 18Ma illustrate the functional description of the bits used in the AGP Device Address Space Size Register 1828. The AGP Device Address Space Size Register 1828 also may determine whether an AGP device is valid in the computer system.

Referring now to FIG. 19A, a schematic table of memory-mapped registers, according to an embodiment of the present invention, is illustrated. The chipset's memory-mapped control registers illustrated in FIG. 19A are accessed via the address residing in BAR1 1704 (FIG. 17A) in the Host-to-PCI bridge 306 (function 0) configuration header (offset 14h). This address is determined and written to the BAR1 1704 by system BIOS. The registers within this system memory 106 space may be used by the GART miniport driver to control AGP functionality within the chipset 204 during run-time. An advantage of storing information in the system memory-mapped registers is that the processor 102 accesses these memory mapped registers with memory accesses, its fastest mechanism for data retrieval. This may be important for the run-time accessible registers like the cache control registers (not illustrated).

A Revision ID Register 1902 is provided so that the GART miniport driver can identify the format and features provided by the chipset specific AGP control registers. FIG. 19B illustrates the functional description of the bits used in the Revision ID Register 1902.

A GART Capabilities Register 1904 defines the GART features supported by the core logic chipset. FIG. 19C illustrates the functional description of the bits used in the GART Capabilities Register 1904.

An AGP Feature Control Register 1906 enables the GART features supported by the chipset 204. FIG. 19D illustrates the functional description of the bits used in the AGP Feature Control Register 1906.

An AGP Feature Status Register 1908 is used to record status information for AGP and GART related events. FIG. 19E illustrates the functional description of the bits used in the AGP Feature Status Register 1908. A bit is reset whenever a logic "1" is written to that bit.

A GART Table/Directory Base Address Register 1910 provides the physical address for the GART table/directory in system memory. FIG. 19F illustrates the functional description of the bits used in the GART Table/Directory Base Address Register 1910. In systems using single-level address translation, this register corresponds to the base address of the GART table. In systems using two-level address translation, this register corresponds to the base address of the GART directory. This register is initialized by the GART miniport driver whenever memory for the GART table/directory is allocated. Refer to the Software Specification description hereinbelow for a more detailed description of GART table memory allocation.

A GART Directory/Table Cache Size Register 1912 identifies the maximum number of entries which can be cached by the core logic chipset in the GART directory and the GART table caches. FIG. 19G illustrates the functional description of the bits used in the GART Directory/Table Cache Size Register 1912.

A GART Directory/Table Cache Control Register 1914 provides software with a mechanism to invalidate the entire GART directory and table caches, therefore maintaining coherency with the GART directory and table in system memory. FIG. 19H illustrates the functional description of the bits used in the GART Directory/Table Cache Control Register 1914. In systems using a single-level address translation, this register only applies to the GART table cache. In systems using two-level address translation, this register applies to both the GART directory cache and the GART table cache.

A GART Table Cache Entry Control Register 1916 is used by software to update/invalidate a specific GART table cache entry. FIG. 19I illustrates the functional description of the bits used in the GART Table Cache Entry Control Register 1916. When the GART miniport driver receives a call to update/invalidate entries in the GART table, it is required to maintain coherency of the GART table cache. If the updated/invalidated entry is not present in the GART cache, the invalidate function will have no effect. The GART miniport driver must perform 32 bit write accesses to this register only.

A Posted Write Buffer Control Register 1918 gets set by the GART miniport driver to flush the chipset's processor to memory posted write buffers. FIG. 19J illustrates the functional description of the bits used in the Posted Write Buffer Control Register 1918. This is necessary during mapping of a GART table entry. When the processor writes a valid entry to the GART table, the data can get placed in the chipset's posted write buffers. If the graphics controller tries to access the GART table entry that is posted, the entry will not be valid and an error occurs. A similar problem occurs when the processor clears a GART table entry. If the data gets posted and the graphics controller tries to access that GART table entry, the returned data may be corrupt.

An AGP Bus Utilization/Bandwidth/Latency Command Register 1920, illustrated in FIG. 19K, controls the AGP bus utilization, bandwidth, and latency counters in the core logic chipset 204. There may be three 32-bit counters provided to measure the AGP bus utilization, bandwidth, and latency. Each base 32-bit counter is clocked (incremented) using the 66 MHz AGP clock, which will count for 60 seconds. To measure utilization, bandwidth, or latency, the value in the utilization counters after the base counter expires should be multiplied by 15 ns and divided by 60. The utilization, bandwidth, and latency counters can be initialized and enabled using this register. A clear utilization register bit clears all the counters. AGP Bus Utilization, Bandwidth, and Latency Registers 1922, 1924 and 1926, respectively, illustrated in FIGS. 19L–19N, are counters which may be independently started by setting the corresponding portion bits in the AGP Bus Utilization/Bandwidth/Latency Command Register 1920. The counting continues in the counters of the AGP Bus Utilization, Bandwidth, and Latency Registers 1922, 1924 and 1926, until the corresponding bits in the AGP Bus Utilization/Bandwidth/Latency Command Register 1920 are cleared to a logic "0".

The AGP Bus Utilization Register 1922 holds the AGP bus utilization counter value which is incremented every AGP bus clock when the AGP AD[31:0] bus is active with either one of the transactions illustrated in FIG. 19L.

The AGP Bus Bandwidth Register 1924 holds the AGP bus bandwidth counter value which is incremented in every AGP bus clock when the AGP AD[31:0] bus is active as illustrated in FIG. 19M.

The AGP Bus Latency Register 1926 holds the AGP bus latency counter value which is incremented for every AGP bus clock that expires while the chipset is processing a particular AGP read request. The AGP bus latency counter value represents the time it takes to process an AGP transaction starting at the time the read request is enqueued and completing when the first quad word is data is returned to the master. Preferably, the core logic chipset 204 tracks a particular AGP read request starting from the time it is enqueued and ending when the first quad word of data is returned to the AGP master.

GART Table Caching and Prefetching

Figure 20:
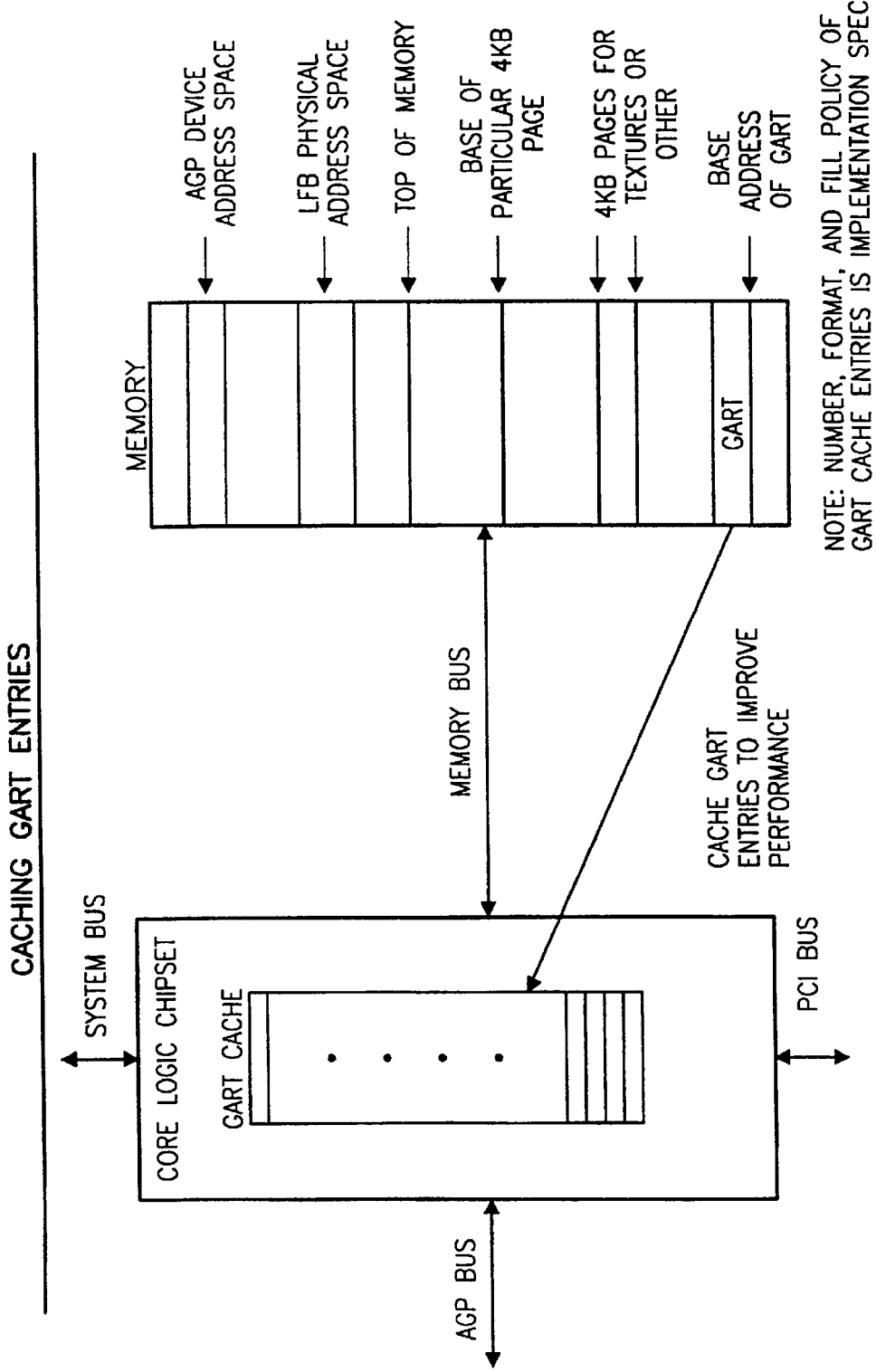
FIG. 20 is a schematic memory map of caching GART table entries, according to an embodiment of the present invention.

Latency of AGP cycles would suffer greatly if each AGP request required a GART table/directory lookup. In a system using single-level address translation, a GART table entry fetch from memory adds a minimum of 16 AGP clocks (66 MHz) to an AGP request. This gets worse when the additional time required to arbitrate for the memory bus and time for refresh cycles is taken into account. It is preferred to cache (save) GART table entries to prevent this problem and improve performance. This is illustrated in FIG. 20. Likewise, it is also preferred to cache both GART table and GART directory entries in systems using two-level address translation. Since each GART directory entry covers 4 MB of address space, the GART directory cache need not be as big as the GART table cache.

The need for GART caching becomes more evident when it is understood that the minimum AGP request size is 8 bytes of data. As a worst case, 512 AGP requests could access the same 4 KB page in physical memory. By fetching and caching the necessary GART table and directory entries to service the first request, the next 511 requests would not require a GART table or directory lookup. Thus, caching a single entry greatly improves performance. Note, this assumes textures reside contiguously in physical memory and span 4 KB pages. Increasing the cache size will further improve system performance.

Graphics controllers typically will identify four streams, at minimum, that will be accessing AGP memory via the GART table: CPU, video, textures, and command lists. Given this, a preferred embodiment of an AGP graphics controller 204 will have, at minimum, a four-way set associative GART table cache to prevent thrashing. In systems with two-level address translation, the GART directory cache should preferably have at least four entries, one for each stream.

Figure 21:
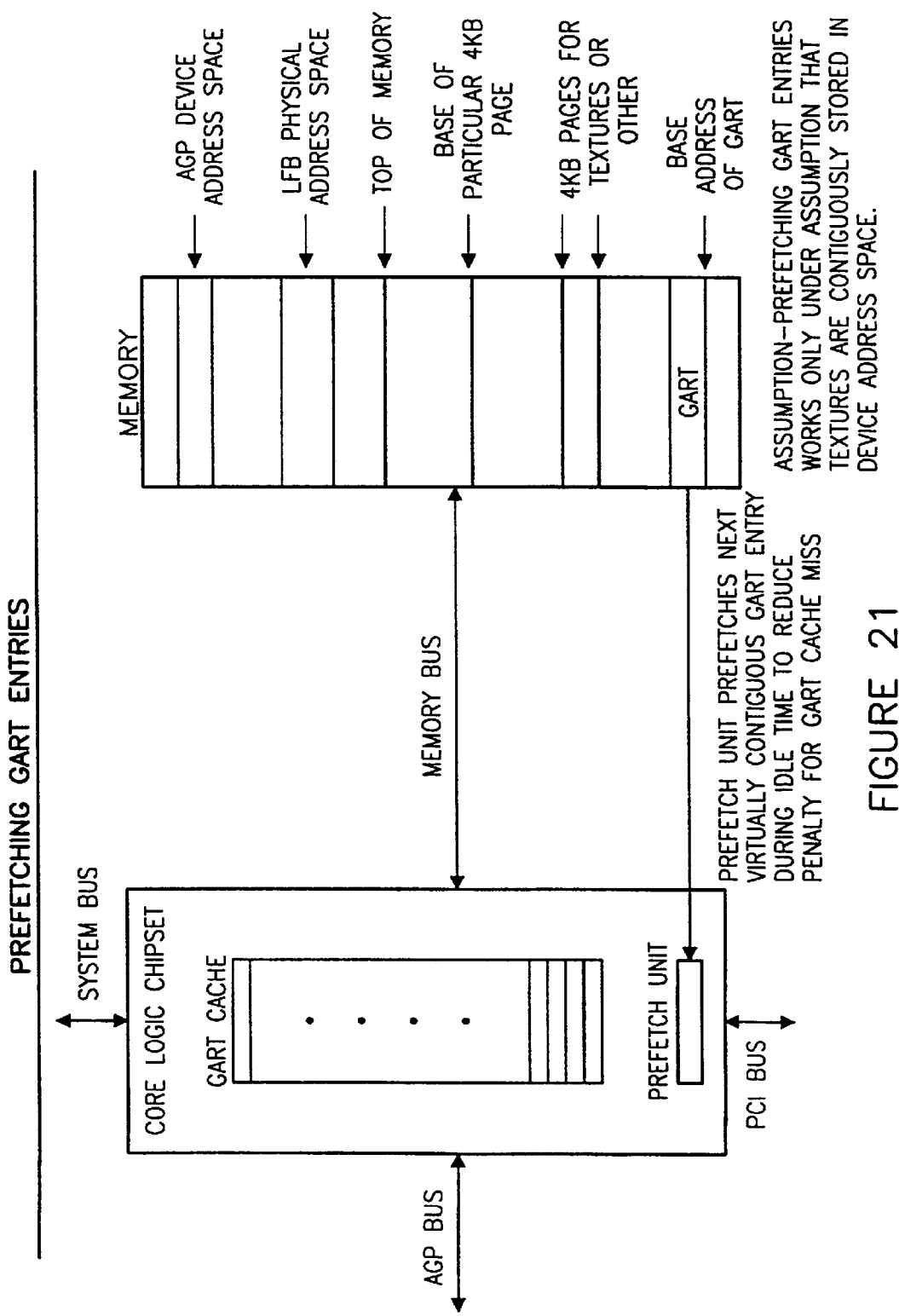
FIG. 21 is a schematic memory map of prefetching GART table entries, according to an embodiment of the present invention.
Figure 24:
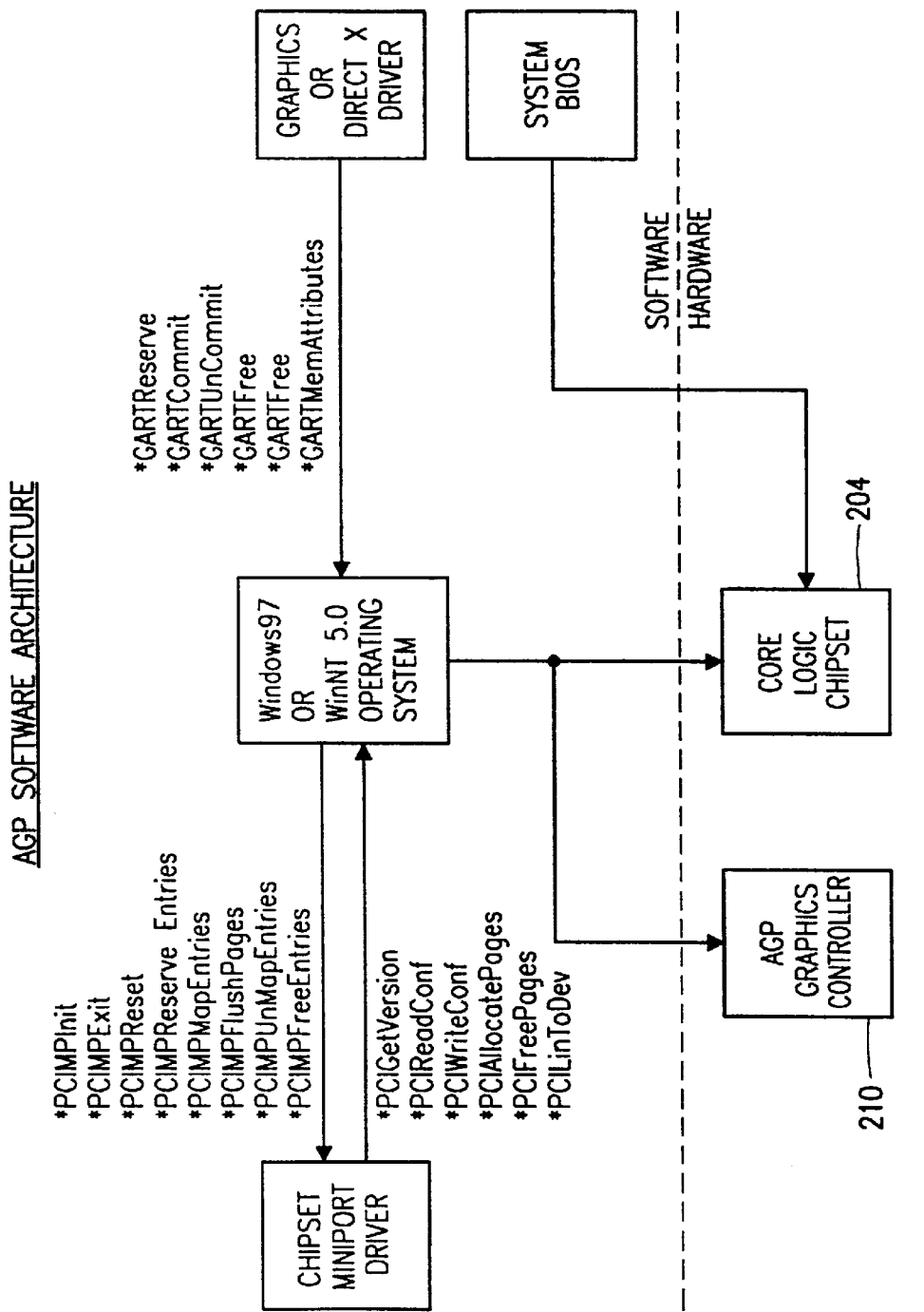
FIG. 24 is a schematic functional block diagram of the AGP software architecture.

Prefetching GART table entries also may improve performance. Prefetching occurs when the chipset retrieves the next GART table entry while fetching the GART table entry required to service the current AGP request. This entry is cached along with past GART table entries. Overhead for prefetching this extra entry is negligible considering that each GART table entry is 4 bytes wide while the typical memory data bus is 8 bytes wide; meaning that two GART table entries are retrieved with a single request. In addition, some chipsets burst an entire cache line (eight bytes) when reading data from memory. In this case seven GART table entries could easily be prefetched. Prefetching GART table entries is illustrated in FIG. 21.

Core Logic Chipset Data Coherency

The core logic chipset 204 will preferably ensure that read accesses from the AGP bus 207 are coherent with write accesses from the host processor bus 103, so long as both devices are accessing AGP memory through the AGP device address range. For example: a read request from the AGP bus 207 will pull out the most recently written data from the host bus 103, provided both data transfers use the AGP device address space (GART table translation). The device address range should preferably be marked uncacheable in the host processor 102. This ensures that the core logic chipset 204 does not need to snoop the host processor 102 cache(s) for each AGP stream access on the AGP bus 207. If the host processor accesses AGP memory directly, outside the virtual graphics address range, the host processor will most likely have this region marked as writeback cacheable, and will cache these accesses. Since the core logic chipset does not snoop the host processor caches for AGP stream accesses on the AGP bus, coherency problems may occur.

The core logic chipset 204 preferably ensures that read accesses from the host bus 103 and the PCI bus 109 are coherent with AGP stream write accesses on the AGP bus 207 by use of the AGP Flush Command only. Once an AGP Flush Command is retired on the AGP bus 207, all previously retired AGP write data will become available to devices on the host and PCI buses 103 and 109, respectively. Without the use of the AGP Flush Command, coherency problems may occur.

AGP Graphics Controller

In conjunction with the preferred embodiments of the present invention, an AGP graphics controller may preferably be implemented in accordance with the following specification:

Issue AGP requests on cache line boundaries to improve performance. The core logic chipset is typically optimized for cache line transfers in and out of memory. If the AGP master requests read data and the transaction size crosses a cache line boundary, two cache line memory reads are required to fetch the data. This is inefficient; particularly when the master runs back-to-back cache line reads off cache line boundaries. The inefficiency due to non-cache line aligned transactions is minimized as the size of the request increases.

AGP requests may range in size from 8 bytes to 32 quad words (QW) for reads and up to 8 QW for writes. This means it is impossible for the graphics controller to issue all requests on cache line boundaries. It is preferred that the chipset perform combined reordering of reads to minimize the performance impact of requests less than 4 QW in size.

Issue cache line or multiple cache line sized AGP requests to improve performance. The core logic chipset is typically optimized for 32 byte (cache line) accesses to main system memory. Whenever possible, an AGP compliant master preferably may perform 32 byte address aligned accesses with data transfer lengths, which are multiples of 32 bytes. This may maximize bandwidth between main system memory and the AGP bus.

Use SBA request queuing mechanism instead of PIPE. A preferred host bridge AGP target request queue is capable of holding multiple requests. In order to maximize target efficiency, the request queue should preferably be kept as full as possible. This is preferably accomplished using sideband request enqueueing in order to take advantage of the speed of the AGP 2.times. mode and also to avoid AD bus arbitration overhead.

If the graphics controller 210 can generate PCI cycles, implement the PCI Cache Line Size register (configuration space offset 0Ch) and use the most efficient PCI write and read commands possible. Pentium and Pentium Pro systems use a cache line size of 32 bytes, so preferably at least this size should be supported.

The Memory Write and Invalidate (MWI) command helps write burst performance, especially on Pentium Pro-based systems where the CPU cache snoop overhead is high. It allows the host bridge to ignore CPU cache writeback data; once the CPU recognizes the snoop address, the host bridge can write data from the PCI stream into memory. This command is preferred so as to burst multiple cache lines without disconnects.

The Memory Read Line (MRL) and Memory Read Multiple (MRM) commands cause the host bridge to prefetch additional cache lines from memory. This speeds up read bursts, allowing bursts to continue without disconnects in a larger number of situations. Without these commands, CPU cache snoops hold up bursts. Prefetching hides the snoop time during the previous cache line data transfers.

Referring now to FIG. 22A, a schematic table of the AGP graphics controller 210 configuration registers, according to an embodiment of the present invention, is illustrated. The AGP configuration registers in the graphics controller 210 contain information needed to configure AGP bus parameters for the AGP master. A Capabilities Pointer Register 2202 provides an offset pointer to the first function supported by this device in accordance with the New Capabilities mechanism as described by the PCI 2.1 Specification (reference: ECN defining "New Capabilities"). AGP is a function supported by the New Capabilities. FIG. 22B illustrates the functional description of the bits used in the Capabilities Pointer Register 2202.

An AGP Capability Identifier Register 2204 identifies this function in the capabilities list to be the AGP function. FIG. 22C illustrates the functional description of the bits used in the AGP Capability Identifier Register 2204. The AGP Capability Identifier Register 2204 also provides a pointer to the next function in the capabilities list and cites the AGP Specification revision number conformed to by this device.

An AGP Status Register 2206 provides status of AGP functionality for this device. FIG. 22D illustrates the functional description of the bits used in the AGP Status Register 2206. Information reported includes maximum request queue depth, sideband addressing capabilities, and transfer rates. This AGP status register is preferably a read only register. Writes have no affect and reserved or unimplemented fields return zero when read.

An AGP Command Register 2208 allows software to enable sideband addressing, enable AGP, and set the AGP transfer rate. FIG. 22E illustrates the functional description of the bits used in the AGP Command Register 2208. These bits are set by the operating system during initialization.

AGP Latency

Intel's AGP Specification version 1.0 does not specify latency for AGP cycles. For the purpose of disclosing the present invention, AGP latency is defined as the number of AGP bus clocks (66 MHz) occurring from the time a single request is enqueued until the first double word of data (for the corresponding request) is presented to the AGP master. Latency begins when the request gets placed by the AGP master on either the AD or the SBA buses (depending upon which AGP addressing scheme is being used) and PIPE# or SBA (respectively) is active. Latency terminates when TRDY# is active and the first double word of data for the corresponding request is placed on the AD bus. Latency is defined only in terms of AGP read cycles because write cycles get posted in the core logic chipset 204. FIG. 23 illustrates expected latencies for best, typical, and worst cases.

Best case latency may be computed by assuming a GART cache hit and a memory subsystem page hit while retrieving the targeted data (i.e.—no precharge). It also assumes that the AD bus is available, the request is aligned on a cache line, and the core logic chipset memory bus arbiter grants the AGP request access to the memory bus immediately. CAS# latency used in the computation is 2 clocks.

Typical latency assumes the AD bus is available immediately, the request is aligned on a cache line, a GART cache hit, and a memory subsystem page miss (i.e.—precharge and activate required). In this case, the AGP request must wait for a pending processor to memory or PCI bus to memory cycle to complete before being granted the memory bus by the arbiter. Precharge and activate penalties are included. CAS# latency used in the computation is 2 clocks.

Worst case latency assumes the AD bus is available immediately, the request is aligned on a cache line boundary, a GART cache miss (i.e., GART table entry lookup required), and a page miss (i.e., precharge and activate required). In this case, the GART table entry lookup must wait for a pending processor to memory or PCI to memory cycle to complete before being granted the memory bus. Once the memory bus is available, the chipset performs the GART table entry read. The AGP request must then wait for another processor or PCI to memory cycle and a refresh cycle to complete before being granted the memory bus. Once access to the memory bus is granted, the AGP data is read from memory. Precharge and activate penalties are included. CAS# latency used in the computation is 2 clocks.

Software Description

Key components of the AGP software architecture include System BIOS, the chipset miniport driver, the operating system, and the graphics or Direct Draw driver. These components are required to initialize and control the AGP and GART table functions within the chipset and graphics controller as illustrated in FIGS. 18A and 18Aa. The disclosure hereinafter discusses the principal AGP software components. It primarily examines both the system BIOS and the GART miniport driver. It briefly describes the operating system/API and the graphics controller driver as applied to AGP.

System BIOS

During boot, System BIOS power-on self-test (POST) performs the following AGP functions: 1) enables the core logic chipset's AGP error reporting, and 2) may configure the core logic chipset with size of AGP device address space (optional). Each of these functions is described in more detail below.

Enabling Error Reporting

When the graphics controller attempts to access a page in AGP memory that is not valid, the chipset can either ignore the failure and continue processing or generate SERR#. Because this feature is platform specific, system BIOS is responsible for setting the appropriate registers (as opposed to GART miniport driver). It configures the system to generate SERR# upon AGP failure using the following algorithm:

1. System BIOS first determines if AGP error reporting is supported by reading the chipset's Valid Bit Error Reporting Supported bit (bit 0) in the AGP Capabilities register 1904 (see FIGS. 19A and 19C). When this bit is set to 1, the chipset is capable of generating SERR# when the graphics controller attempts to access an invalid page in AGP memory.
2. If generating SERR# is supported, the chipset can enable SERR# generation by setting the Valid Bit Error Reporting Enable bit (bit 0) in the AGP Feature Control register 1906 to 1 (see FIGS. 19A and 19D). Setting this bit to 0 will cause the system to ignore the failure and continue processing the request.

Configuring Size of AGP Device Address Space

To reuse existing bus enumeration code and to optimize the amount of virtual and physical memory allocated to AGP, system BIOS can configure the read/write attributes in Base Address Register 0 (BAR0) 1702 in the chipset's Host-PCI bridge configuration header (function 0) (see FIG. 17A) prior to execution of the bus enumeration code; assuming the core logic chipset supports this feature. System BIOS uses the following algorithm to do this:

1. Prior to bus enumeration/memory mapping software, determine the make and model of the AGP graphics controller installed in the system. Based upon the graphics controller, BIOS can determine the amount of memory required by AGP.
2. Using size obtained in step 1, set appropriate size in VAS Size bits (bits 2:1) of AGP Device Address Space Size register 1828 accessed in the chipset's PCI-PCI bridge configuration header (function 1) (see FIGS. 18A, 18M and 18Ma). When bits 2:1 are modified, the chipset will automatically adjust the read/write attributes in BAR0 1702 of the Host-PCI bridge configuration header (function 1) to reflect the amount of desired memory (see FIGS. 17A and 17C).
3. If no AGP device was found then set the AGP Valid bit in AGP Device Address Space Size register to 0 to indicate AGP is invalid. The chipset will automatically update BAR0 1702 of the Host-PCI bridge configuration header to indicate no memory is required for AGP. The PCI-PCI bridge (function 1) capabilities pointer will be set to point to the next item in the linked list or null if there is no other item.
4. Bus enumeration code will find the requested size in BAR0 1702 and allocate (as required) this memory in the memory map. The base address of the block of AGP device address space will be placed in BAR0 1702 and will reside on a 32-MB boundary.

Implementation of the AGP Device Address Space Size register is chipset specific. BIOS must know if its core logic chipset supports configuration of AGP device address space size. If not, then the AGP device address space size is hard coded in BAR0 1702 of the Host-PCI bridge configuration header and no action is required by BIOS.

GART Miniport Driver

The GART miniport driver (hereinafter "GART MPD" or "MPD") of the present invention is used by the operating system software to perform the following functions:

Initializes GART capabilities within the chipset.

Creates and initializes the GART table. Reserves GART table entries.

Maps GART table entries with allocated 4 KB pages in physical memory.

Flushes pages in the L1/L2 cache.

Unmaps GART table entries and maintains GART cache and link bit coherency.

Frees GART table entries.

Terminates GART translation upon exit.

Each of these functions is described in more detail below. Services provided by the GART miniport driver are illustrated in FIGS. 25A–25F. Services available to the GART miniport driver are illustrated in FIGS. 26A and 26B. For more information on these services reference is made to Microsoft's AGP Software Functional Specification. The Microsoft AGP Software Functional Specification is available from Microsoft Corporation, Redmond, Wash., and is hereby incorporated by reference.

Initializing GART Capabilities

Upon receipt of the PCIMPInit( ) call from the operating system, the GART miniport driver (MPD) performs the following functions to initialize GART functionality in the chipset:

1. MPD reads the pointer to AGP Device Address Space from BAR 0 in the chipset's Host-PCI bridge configuration header. This pointer points to the base of AGP Device Address Space. The MPD stores this pointer.

2. MPD reads the Device Address Space Size field (bits 2:1) from the chipset's AGP Device Address Space Size register located in the chipset's PCI-PCI bridge configuration header. This field provides the MPD with the amount of device address space allocated to AGP. The MPD stores this value for later use. In a preferred embodiment of the present invention, this value may be 32 MB, 64 MB, 128 MB, 256 MB, 512 MB, 1 GB, or 2 GB.

3. MPD gets pointer to AGP memory mapped control registers from Base Address Register 1 (BAR1 —offset 14h) in the chipset's Host to PCI bridge configuration header. This pointer is stored for later use. The MPD also stores the location of the GART table Base Address Register. This register resides at offset 04h in the GART tablets memory mapped space.

4. MPD gets pointer to AGP memory mapped control registers from Base Address Register 1 (BAR1—offset 14h) in the chipset's Host to PCI bridge configuration header. Using this pointer, MPD enables the GART table cache by setting the GART Cache Enable bit (bit 3) in the AGP Feature Control Register (offset 02h from pointer) to a 1. It is now up to the GART MPD to maintain GART cache coherency.

5. MPD gets pointer to AGP memory mapped control registers from Base Address Register 1 (BAR1—offset 14h) in the chipset's Host to PCI bridge configuration header. Using this pointer, MPD reads the GART Entry Linking Supported bit (bit 1) in the AGP Capabilities register (offset 01h from pointer) to determine if this chipset supports linking. If the chipset supports linking, the MPD sets the GART Entry Linking Enable bit (bit 1) in the AGP Feature Control register (offset 02h from pointer) to a 1 to enable the linking/prefetching function. It is now up to the MPD to set link bits as required.

Allocating and Initializing the GART Directory/Table

Following AGP initialization and upon receipt of the PCIMPReset( ) call from the operating system, the chipset miniport driver (MPD) performs the following functions to (re)create and initialize the GART directory/table:

1. MPD allocates "n" 4 KB pages of system memory for the GART table by calling the operating system using the PCIAllocatePages( ) command. The MPD must determine "n", how many pages to allocate based upon the number of pages of system memory available (provided by the operating system in the PCIMPReset call) and the amount of AGP device address space allocated by system BIOS (reference BAR0 in the chipset's Host-PCI bridge configuration header). Note that systems using two-level address translation must have an additional entry allocated for the GART directory.

As disclosed above, the AGP implementation of the present invention supports two types of address translation: one-level address translation and two-level translation. In systems using a single-level address translation, the GART must be allocated as a single, contiguous block of memory. When using the PCIAllocatePages( ) service, the MPD must set the PageContig flag to request contiguous pages from the operating system. Preferably, the GART table memory allocation will be performed immediately following operating system startup to ensure that the required contiguous memory will be available. In systems using two-level address translation, the GART table need not be contiguous.

The MPD sets the PageZeroInit flag in the PCLAllocatePages( ) service so the operating system will fill the allocated pages with zeros; thus initializing the GART directory/table.

To maintain L1/L2 cache coherency, the MPD sets the MP_FLUSHES_L2_CACHE flag to indicate the operating system should flush the L1 and L2 caches.

2. In response to the PCIAllocatePages( ) call, the operating system returns NULL if the request failed or the linear address of the GART table if the call was successful. This linear address is saved for future use by the MPD. The MPD must also convert this linear address to a physical address using the PCILinToDev( ) command. The MPD then gets the pointer to AGP memory mapped control registers from Base Address Register 1 (BAR1 —offset 14h) in the chipset's host to PCI bridge configuration header. Using this pointer, MPD writes the base (physical) address for the first 4 KB page allocated to the AGP GART Base Address register (offset 04h from pointer) in the chipset's AGP memory mapped space. In systems using single-level translation, this first entry represents the base of the GART table. In systems using two-level translation, this first entry is the base of the GART directory.

3. In systems using a two-level address translation, the MPD must "walk" the returned linear address range, determine the physical address of each 4 KB page just allocated, and write the physical address for the start of each 4 KB page to its corresponding GART directory entry. This fills in the GART directory.

Reserving GART Table Entries

During run-time and upon receipt of the PCIMPReserveEntries( ) call from the operating system, the chipset miniport driver (MPD) performs the following functions to reserve GART table entries for the operating system:

1. The MPD searches the GART table to find "n" available contiguous entries; where "n" is the number of 4 KB pages requested by the operating system in the PCIMPReserveEntries( ) call. Upon finding the contiguous entries, the MPD reserves these entries for the operating system by setting the valid bit (bit 0) in each GART table entry.
2. The MPD then returns a map handle, which is the linear address of the first GART table entry reserved. This map handle is used later by the MPD to map and maintain GART table entries. Note that the map handle corresponds to the base address of the corresponding page in AGP device address space.

Mapping GART Table Entries

After GART table entries have been reserved and upon receipt of the PCIMPMapEntries( ) call from the operating system, the chipset miniport driver (MPD) performs the following functions to map previously allocated 4 KB pages in physical memory with reserved GART table entries:

1. The MPD converts the system linear address provided by the PCIPMapEntries( ) call into a physical address using the PCILinToDev( ) command. The resulting address represents the base address of the particular 4 KB page in physical system memory. Note, the non-contiguous 4 KB pages in physical address space appear to the processor in system linear address space as contiguous.
2. The MPD writes the resulting physical address to the particular GART table entry indexed by the map handle. This map handle is obtained while reserving GART table entries and is passed to the MPD by the operating system. The map handle is a linear address to the respective GART table entry. Since the pages reside on 4 KB boundaries, bits 31:12 are written to bits 31:12 in the GART table entry.
3. If linking is supported in the system, the link bit (bit 1) is set as required in the corresponding entry by the MPD. The link bit indicates that the next GART table entry is associated with the current GART table entry. When mapping "n" entries with linking enabled, the link bit should be set in entries 1 through n−1. For example, when mapping 8 entries as a result of the PCIMPMapEntries( ) call, it is assumed that all 8 entries are associated. Setting the link bit for entries 1 through 7 will allow entries 2 through 8 to be prefetched and cached in the GART table cache. Note, this assumes chipset burst memory accesses during GART table lookups.
4. Repeat steps 1–3 "n" times; where "n" is the number of pages that need mapping. Note that the map handle and the system linear address must be incremented during each iteration.
5. Upon completion of steps 1–4, MPD gets a pointer to AGP memory mapped control registers from Base Address Register 1 (BAR1 —offset 14h) in the chipset's Host to PCI bridge configuration header. Using this pointer, MPD flushes the chipset's Host-Memory posted write buffers setting the Flush Posted Write Buffers bit (bit 0) in the Posted Write Buffer Control Register (offset 14h) to a 1. This bit gets reset to 0 by the chipset upon completion. The MPD does not have to poll this bit to verify completion of the flush. Instead, it performs a read-back of the last entry that was written to the CART table. Completion of the flush is guaranteed before the data is returned from the read-back.

Flushing L1/L2 Caches

Immediately following mapping GART table entries and upon receipt of the PCIMPFlushPages( ) call from the operating system, the chipset miniport driver (MPD) performs the following functions to flush specific pages in the L1/L2 caches:

1. MPD flushes the L1 cache using the processor's CR3 register.
2. MPD flushes the specific pages from L2 cache, if possible. If the MPD is incapable of flushing a specific L2 page, then it should not flush the entire L2 cache. Instead it should do nothing.

Unmapping GART Table Entries and Maintaining GART Cache and Link Bit Coherency

During run-time and upon receipt of the PCIMPUnMapEntries( ) call from the operating system, the chipset miniport driver (MPD) performs the following functions to unmap GART table entries while maintaining GART cache coherency:

1. Using the map handle provided by the PCIMPUnMapEntries( ) call as a linear address into the GART table, the MPD initializes the indexed GART table entry (excluding valid bit) to some invalid state. The valid bit remains valid to indicate that this entry is still reserved for the application.
2. If GART caching is enabled, the MPD must invalidate either the particular cached entry or the entire GART cache. To invalidate a particular GART cache line, the MPD writes the AGP device address to bits 31:12 of the GART Cache Entry Control register (offset 10h) and sets the GART Cache Entry Invalidate bit (bit 0) to a 1 in that same register. The single GART cache entry will be invalidated. Upon completion, bit 0 will be reset to zero by the chipset. If the entry does not exist, the request is ignored. To invalidate the entire GART cache, the MPD writes a 1 to the GART Cache Invalidate bit (bit 0) of the GART Cache Control register (offset 0Ch). The entire GART cache will be automatically invalidated. Upon completion, the Cache Invalidate bit will be reset to zero by the chipset.

Invalidation of the entire GART cache preferably may be performed after all "n" GART table entries have been invalidated; where "n" is the number of GART table entries to free provided by the PCIMPFreeEntries( ) call.

3. If linking is enabled, the MPD must ensure that link bit coherency is maintained. For example, if GART table entries 0, 1, 2, and 3 exist with the link bit is set in entries 0, 1, and 2, and entries 2 and 3 are freed, then the link bit in entry 1 must be disabled. Failure to maintain link bit coherency will result in unnecessary caching of GART table entries.
4. Repeat steps 1–3 "n" times; where "n" is the number of GART table entries to free. This value is provided as an input parameter by the PCMPFreeEntries( ) call. Note that the map handle must be incremented during each iteration.
5. Upon completion of steps 1–4, MPD gets a pointer to AGP memory mapped control registers from Base Address Register 1 (BAR1—offset 14h) in the chipset's Host to PCI bridge configuration header. Using this pointer, MPD flushes the chipset's Host-Memory posted write buffers setting the Flush Posted Write Buffers bit (bit 0) in the Posted Write Buffer Control Register (offset 14h) to a 1. This bit gets reset to 0 by the chipset upon completion. The MPD does not have to poll this bit to verify completion of the flush. Instead, it performs a read-back of the last entry that was written to the GART table. Completion of the flush is guaranteed before the data is returned for the read-back.

Freeing GART Table Entries

Upon receipt of the PCIMPFreeEntries( ) call from the operating system, the chipset miniport driver (MPD) performs the following functions to free GART table entries:

1. Using the map handle provided by the PCIMPFreeEntries( ) call as a linear address to the GART table entry, the MPD sets the GART table entry's valid bit to invalid (0). This step is performed "n" times where "n" is the number of pages passed in the PCIMPFreeEntries( ) call.

2. Upon completion of step 1, MPD gets pointer to AGP memory mapped control registers from Base Address Register 1 (BAR1 —offset 14h) in the chipset's Host to PCI bridge configuration header. Using this pointer, MPD flushes the chipset's Host-Memory posted write buffers setting the Flush Posted Write Buffers bit (bit 0) in the Posted Write Buffer Control Register (offset 14h) to a 1. This bit gets reset to 0 by the chipset upon completion. The MPD does not have to poll this bit to verify completion of the flush. Instead, it performs a read-back of the last entry that was written to the GART table. Completion of the flush is guaranteed before the data is returned for the read-back.

Terminating GART Table Functionality

Upon receipt of the PCIMPExit( ) call from the operating system, the chipset miniport driver (MPD) performs the following functions to disable GART functionality:

1. MPD flushes GART directory and table caches by writing a 1 to the GART Cache Invalidate bit (bit 0) of the GART Directory/Table Cache Control register (offset 0Ch). The entire GART cache will be automatically invalidated. Upon completion, the Cache Invalidate bit will be reset to zero by the chipset.

2. MPD calls PCIFreePages( ) to free pages allocated to GART table. The MPD must supply the linear address of the base of GART table and the number of pages to free.

3. MPD initializes the freed pages by writing 0's to all of the previously allocated GART table locations.

AGP functionality preferably is disabled before terminating GART functionality. AGP functionality is disabled in the master before disabling AGP functionality in the target.

Operating System

The operating system performs the following AGP functions:

Sets the data transfer rate in both master and target.

Enables sideband addressing in both master and target as required.

Sets request queue depth in master.

Enables AGP in target and master.

Allocates and frees physical memory as required.

Performs read/write services for GART miniport driver.

Reference is directed to Microsoft's AGP Software Functional Specification for more details regarding operating system functionality as applied to AGP.

Graphics Driver/Direct X

The graphics driver or Direct X performs the following AGP functions:

Reserves pages of AGP device memory for use by the application.

Commits pages of reserved device memory—thus allocating system memory.

Uncommits pages of reserved device memory—thus deallocating system memory.

Frees previously reserved pages of AGP device memory.

Obtains information committed memory.

Reference is directed to Microsoft's AGP Software Functional Specification for more details regarding graphics driver and the Direct X driver functionality as applied to AGP.

Alternative Embodiment

As discussed above, increasingly complex software applications are more memory intensive than ever. For example, present server-based systems that execute large, complex database applications already have maximum memory sizes of 32 GB to 64 GB. Further, it is expected that future computing systems which execute complex software applications will continue to incorporate larger and denser memory devices to satisfy the increased memory demands of such applications. However, the AGP-based core logic chipset based on the AGP1.0 Specification supports only 32-bit memory addressing which provides for addressing up to 2 GB of memory. Accordingly, to address memory space in larger and denser memory devices, it would be advantageous to provide an AGP-based core logic chipset for computing systems which has the capability to support greater than 32-bit memory addressing (e.g., 64-bit addressing). This capability would provide for mapping of greater than 2 GB of system memory to the AGP device address space, thus allowing the AGP device to take advantage of the larger amount of available memory.

As previously mentioned, the AGP2.0 Specification supports 64-bit addressing. As a result, it is possible to create a GART table which uses up to 64 bits to map the graphic controller's contiguous AGP device addresses into their corresponding physical addresses that reside in physical memory (e.g., physical memory 106), thus providing the capability to utilize a greater amount of available memory more efficiently. As with the GART table described above which utilizes 32-bit addressing, the GART table which implements 64-bit addressing resides in the physical memory 106, is managed by the GART miniport driver, and is used by the core logic chipset 204 to remap the AGP device addresses to physical memory. Similarly, the GART table implementation supports two options for remapping AGP addresses: single-level address translation and multi-level (e.g., two-level) address translation. In addition, in this alternative embodiment, the GART table may be configured in multiple modes, including the standard mode discussed above, which is based on a 32-bit addressing scheme, and a "compatible" mode, which supports greater than 32-bit addressing depending on the capabilities of the AGP device and the amount of allocated AGP memory.

Figure 27:
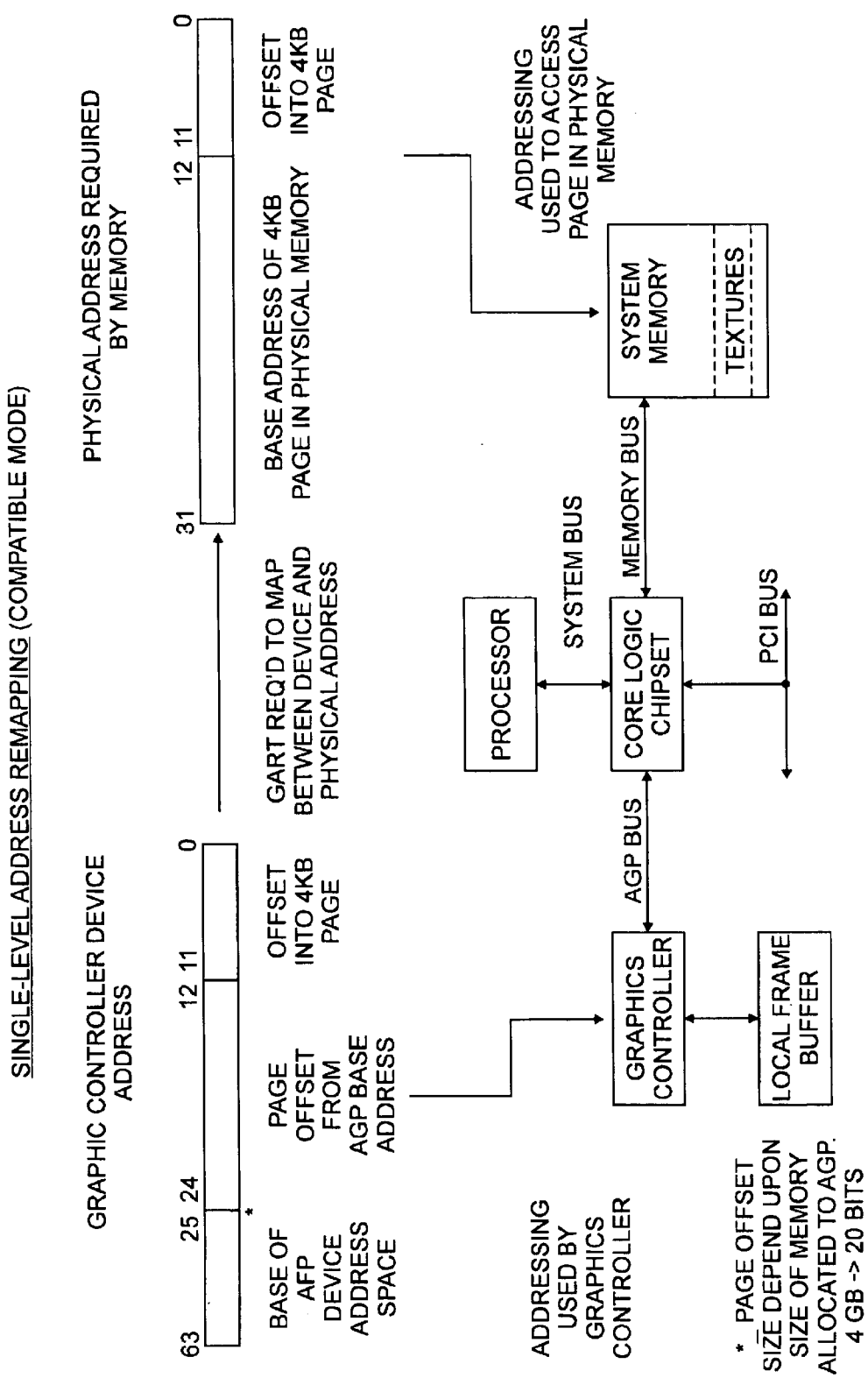
FIG. 27 is a schematic functional block diagram of the AGP single-level address translation in the compatible mode.

In the compatible mode, and when using single-level translation, the AGP device addresses used by the graphics controller can be viewed as having three parts, as illustrated in FIG. 27: the base address of device address space (bits 63:x), the page offset into AGP device address space (bits x:12), and the offset into the 4 KB page (bits 11:0). The number of bits comprising the page offset into AGP device address space depends upon the size of virtual (and physical) memory allocated to AGP. For example, if 64 GB of memory is allocated to the AGP device, then address bits [35:12] (i.e., 24 bits) are used to represent all of the pages in the system. The table of FIG. 28 illustrates the number of bits used to represent each 4 KB page in AGP memory versus the amount of allocated AGP memory in a compatible mode implementation which supports 64-bit addressing.

For a two-level address translation, two GART table lookups are performed to remap an AGP device address to a physical address in system memory. As discussed above with respect to the 32-bit addressing embodiment, the first lookup to system memory reads the GART directory entry, which contains the physical address of a corresponding page of GART table entries, also residing in physical memory. The second lookup retrieves the appropriate GART table entry which points to the base address of the desired 4 KB page of AGP data in the physical memory.

Figure 29:
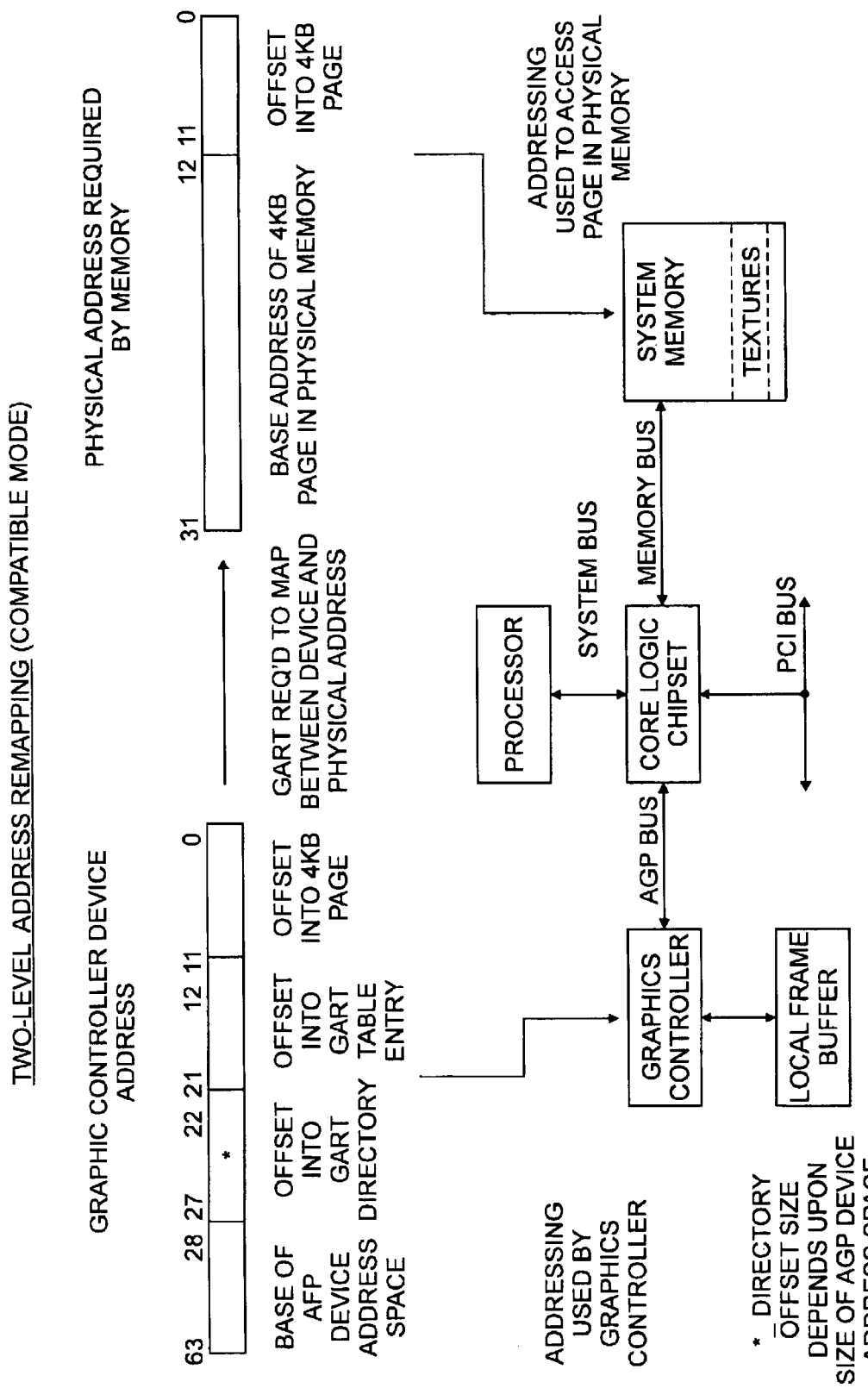
FIG. 29 is a schematic functional block diagram of the AGP two-level address translation in the compatible mode.

In a system using two-level address translation and 64-bit addressing, the device addresses used by the graphics controller include four parts as illustrated in FIG. 29: the base address of AGP device address space (bits 63:x), the directory offset into AGP device address 10. space (bits x:22), the page offset into a table entry (bits 21:12), and the offset into the 4 KB page (bits 11:0). The number of bits comprising the directory offset into AGP device address space depends upon the amount of memory allocated to the AGP device address space. The table of FIG. 30 illustrates the number of bits used to represent the GART directory and page in AGP memory versus the size of the allocated AGP memory.

The flow diagrams illustrated in FIGS. 11, 12C, and 12D above, which show the conversion of 32-bit AGP device addresses into physical addresses for the single-level and two-level address translations, may be extended to device addresses greater than 32-bits (e.g., 64-bits) by adjusting the number of bits used as the base address of the AGP device. Further, the equations expressed above for computing the size of the GART table for the 32-bit addressing embodiment, also apply to computing the size of the GART table for the greater-than-32-bit (e.g., 64-bit) addressing embodiment, with the appropriate adjustments made for the size of the GART table entry (e.g., 64 bits).

Initialization of the GART table in the compatible mode (which supports greater than 32-bit addressing) may occur during system boot. For example, as discussed above, during boot, the system BIOS performs a power-on self-test (POST) which includes configuring the core logic chipset with the size of the AGP device address space. While performing the POST, the BIOS may determine the size of the system physical memory, may locate any AGP graphics controller that is installed in the system, and may determine the controller's make and model. Based upon this information, the BIOS may determine the amount of memory to allocate to the AGP device and whether the AGP device supports greater than 32-bit addressing. Alternatively, this information may be found in a specified field of the AGP device's capabilities register. If BIOS determines that addressing greater than 32-bits is supported, then the BIOS may program the appropriate registers in the core logic chipset such that the GART miniport driver is notified of the number of bits that should be used in the GART table. The GART miniport driver then creates and initializes the GART table such that the GART table entries utilize the appropriate number of bits (e.g., 64 bits).

In one embodiment, the number of bits utilized for each GART entry may be dependent on a particular addressing parameter. For example, a system administrator may select or enable a particular addressing mode for the GART table, such as the standard mode (i.e., 32-bit addressing), the compatible mode (e.g., up to 64-bit addressing), or any other mode supporting a particular addressing scheme. In such an embodiment, the size of the entries in the GART table are dependent on the addressing mode selected. Thus, for example, if a 32-bit addressing mode is selected, the GART miniport driver will create and initialize the GART table such that the GART table entries have 32 bits, even if the connected AGP device supports greater than 32-bit addressing. On the other hand, if a 64-bit addressing mode is enable, the GART table entries may utilize up to 64 bits. In some embodiments, all 64 bits may be available regardless of the addressing capability of the attached AGP device and the upper unused bits may be ignored if not needed.

Alternatively, the addressing parameter which determines the number of bits used for each of the GART entries may be the addressing capability of the attached AGP device. In such an embodiment, the GART miniport driver may create a GART table in which the entries use only the number of bits corresponding to the addressing capability of the attached AGP device. Thus, if the AGP device supports 44-bit addressing, for example, then each GART entry utilizes 44 bits.

Similarly, the GART miniport driver may designate the number of bits used for each GART entry dependent on the amount of system memory to be allocated to the AGP device. Thus, for example, if only 2 GB of memory are available, the GART table may be configured such that only 32 bits are used for each entry, regardless of the addressing capability of the attached AGP device and/or the addressing mode selected by the system administrator.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A computer system, comprising:

a system processor to generate graphics data;

a system memory operably coupled to the system processor, the system memory comprising a plurality of addressable storage locations, wherein the graphics data are stored in some of the plurality of addressable storage locations in the system memory;

a graphics controller to generate video display data from the graphics data for display on a video display;

a core logic chipset operably coupled to the system processor, to the system memory, and to the graphics controller; and a graphics address remapping table (GART) comprising a plurality of GART entries, each of the plurality of GART entries comprising an address pointer to a corresponding addressable storage location of the graphics data in the system memory, wherein each of the plurality of GART entries comprises a plurality of bits, wherein the number of the plurality of bits of each of the plurality of GART entries is based on an addressing capability of the graphics controller, and wherein the core logic chipset uses the plurality of GART entries for remapping the graphics data into an graphics device address space for use by the graphics controller in generating the video display data.

2. The system as recited in claim 1, wherein the number of the plurality of bits of each of the plurality of GART entries is 64 bits.

3. The system as recited in claim 1, wherein the number of the plurality of bits is correlative to an amount of the system memory allocated to the graphics controller.

4. The system as recited in claim 1, wherein the number of the plurality of bits is dependent on selection of an addressing mode for the GART.

5. The system as recited in claim 1, wherein the core logic chip set is operably coupled to the system processor via a system bus, to the system memory via a memory bus, and to the graphics controller via a graphics bus.

6. The system as recited in claim 5, wherein the graphics bus comprises an accelerated graphics port (AGP) bus.

7. The system as recited in claim 1, wherein the plurality of addressable storage locations comprise a plurality of pages in the system memory.

8. The system as recited in claim 7, wherein the plurality of pages of graphics data are stored in the system memory in a non-contiguous and random order.

9. The system as recited in claim 1, wherein a first number of most significant bits of the plurality of bits corresponding to each of the plurality of GART entries comprises the address pointer, wherein the address pointer comprises a base address of the corresponding one of the plurality of addressable storage locations of graphics data.

10. The system as recited in claim 9, wherein a second number of least significant bits of the plurality of bits comprises a plurality of feature flags for the corresponding one of the plurality of addressable storage locations of graphics data, the plurality of feature flags for customizing the corresponding graphics data.

11. The system as recited in claim 1, wherein the plurality of GART entries are stored in the system memory.

12. The system as recited in claim 1, wherein the plurality of GART entries are stored in a plurality of pages of GART entries in the system memory.

13. The system as recited in claim 12, wherein the plurality of pages of GART entries are stored in the system memory in a non-contiguous and random order.

14. The system as recited in claim 13, comprising a GART directory comprising a plurality of directory entries, each of the plurality of directory entries comprising an address pointer to a corresponding one of the plurality of pages of GART entries, wherein the core logic chipset uses the plurality of directory entries for locating the plurality of pages of GART entries in the system memory.

15. The system as recited in claim 1, wherein the core logic chipset comprises at least one integrated circuit.

16. The system as recited in claim 15, wherein the at least one integrated circuit core logic chipset comprises at least one application specific integrated circuit.

17. The system as recited in claim 15, wherein the at least one integrated circuit core logic chipset comprises at least one programmable logic array integrated circuit.

18. The system as recited in claim 1, comprising a video display operably coupled to the graphics controller.

19. A core logic chipset for connecting a computer processor and a system memory to a graphics bus, the core logic chipset comprising:
   a memory interface and control logic configured to connect to a system memory;
   a processor interface configured to connect to at least one processor; and
   a graphics data and control logic configured to connect to a graphics device, the graphics data and control logic in communication with the memory interface and control logic and the processor interface, wherein,
      the graphics data and control logic is configured to use a graphics address remapping table (GART) having a plurality of GART entries, each of the plurality of GART entries comprising a plurality of bits, the plurality of bits of each of the plurality of GART entries comprising an address pointer to a corresponding one of a plurality of pages of graphics data in the system memory, wherein the number of the plurality of bits of each of the plurality of GART entries is dependent on an addressing parameter.

20. The core logic chipset as recited in claim 19, wherein the addressing parameter comprises the size of the system memory allocated to the graphics device.

21. The core logic chipset as recited in claim 19, wherein the addressing parameter comprises the addressing capability supported by the graphics device.

22. The core logic chipset as recited in claim 19, wherein the addressing parameter comprises a selected addressing mode.

23. The core logic chipset as recited in claim 19, wherein the plurality of bits of each of the plurality of GART entries comprises a plurality of feature flags for customizing the corresponding one of the plurality of pages of graphics data.

24. The core logic chipset as recited in claim 19, wherein the graphics data and control logic is configured to connect to a graphics bus having the graphics device connected thereto.

25. The core logic chipset as recited in claim 24, wherein the graphics bus comprises an accelerated graphics port (AGP) bus.

26. The core logic chipset as recited in claim 25, comprising:
   the processor interface configured to connect the at least one processor to a peripheral component interconnect (PCI) bus; and
   a PCI-to-PCI interface adapted for connecting the PCI bus to the AGP bus, wherein PCI transactions are transferred between the PCI bus and the AGP bus.

27. The core logic chipset as recited in claim 26, wherein the PCI bus comprises a PCI-X bus.

28. The core logic chipset as recited in claim 19, wherein the graphics device comprises an accelerated graphics port (AGP) controller.

29. A method of creating a graphics address remapping table (GART) for use in a computing system comprising a system memory for storing graphics data, and a graphics controller for generating video display data from the graphics data for display on a video display, the method comprising:
   determining an available amount of system memory, the system memory comprising a plurality of addressable storage locations for storing graphics data;
   determining a size of at least a portion of the available amount of system memory to allocate to the graphics controller;
   determining an addressing capability of the graphics controller; and
   creating a GART to map the plurality of addressable storage locations in the system memory to a graphics address space for use by the graphics controller, the GART comprising a plurality of GART entries, each of the plurality of GART entries corresponding to one of the plurality of addressable storage locations for storing graphics data, each of the plurality of GART entries comprising a plurality of bits, wherein the number of the plurality of bits of each of the plurality of GART entries is dependent on at least one of the size of the available system memory to allocate to the graphics controller and the addressing capability of the graphics controller.

* * * * *